(12) United States Patent
Hamabe et al.

(10) Patent No.: US 8,413,526 B2
(45) Date of Patent: Apr. 9, 2013

(54) IMPACT DETECTION STRUCTURE, IMPACT DETECTION SYSTEM AND METHOD, AND OCCUPANT PROTECTION SYSTEM AND METHOD

(75) Inventors: Tsutomu Hamabe, Nissin (JP); Koju Kurihara, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/934,859

(22) PCT Filed: Mar. 25, 2009

(86) PCT No.: PCT/IB2009/000589
§ 371 (c)(1),
(2), (4) Date: Sep. 27, 2010

(87) PCT Pub. No.: WO2009/118609
PCT Pub. Date: Oct. 1, 2009

(65) Prior Publication Data
US 2011/0023628 A1   Feb. 3, 2011

(30) Foreign Application Priority Data

Mar. 26, 2008 (JP) ................. 2008-081792
Mar. 26, 2008 (JP) ................. 2008-081793

(51) Int. Cl.
*G01L 1/00* (2006.01)
(52) U.S. Cl.
USPC .................................................. 73/862.381
(58) Field of Classification Search .............. 73/862.381
See application file for complete search history.

(56) References Cited

U.S. PATENT DOCUMENTS 5,281,780 A * 1/1994 Haland ..................... 200/52 R
5,566,974 A   10/1996 Mazur et al.

FOREIGN PATENT DOCUMENTS

| EP | 0 616 926 | 9/1994 |
| GB | 2289448 | * 11/1995 |
| GB | 2 311 964 | 10/1997 |
| JP | 48 101330 | 2/1947 |
| JP | 6 219237 | 8/1994 |
| JP | 7 172262 | 7/1995 |
| JP | 8 192715 | 7/1996 |
| JP | 10-29500 | 2/1998 |

(Continued)

OTHER PUBLICATIONS

Office Action issued Nov. 9, 2010, in Japanese Patent Application No. 2008-081792 with English translation.

(Continued)

*Primary Examiner* — Lisa Caputo
*Assistant Examiner* — Octavia Davis-Hollington
(74) *Attorney, Agent, or Firm* — Oblon, Spivak, McClelland, Maier & Neustadt, L.L.P.

(57) ABSTRACT

A side impact detection system includes a two-stage load transmitting structure that transmits to a floor tunnel, in which a side impact-detecting G sensor is provided, load caused by a side impact at a predetermined impact speed Vp in two stages having a predetermined time lag in such a manner that the load transmitted or the rate of change in the load differs between the first-stage load transmission and the second-stage load transmission.

29 Claims, 31 Drawing Sheets

FOREIGN PATENT DOCUMENTS

| | | |
|---|---|---|
| JP | 11 91499 | 4/1999 |
| JP | 2001 39264 | 2/2001 |
| JP | 2002-19573 | 1/2002 |
| JP | 2004 168141 | 6/2004 |
| JP | 2004 331018 | 11/2004 |
| JP | 2005 263145 | 9/2005 |
| JP | 2006 7821 | 1/2006 |
| JP | 2006 168535 | 6/2006 |
| JP | 2006 240441 | 9/2006 |
| JP | 2007 112375 | 5/2007 |
| JP | 2007 290689 | 11/2007 |

OTHER PUBLICATIONS

Office Action issued Feb. 23, 2010, in Japanese Patent Application No. 2008-081793 with English translation.

International Search Report issued Jul. 22, 2009 in PCT/IB09/00589 filed Mar. 25, 2009.

Office Action issued Feb. 23, 2010, in Japanese Patent Application No. 2008-081792 filed Mar. 26, 2008.

* cited by examiner

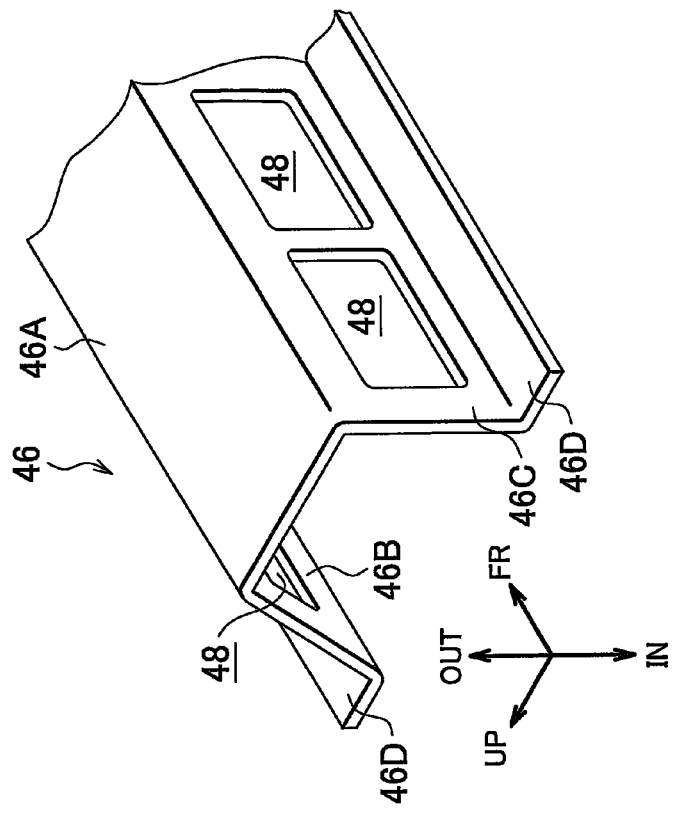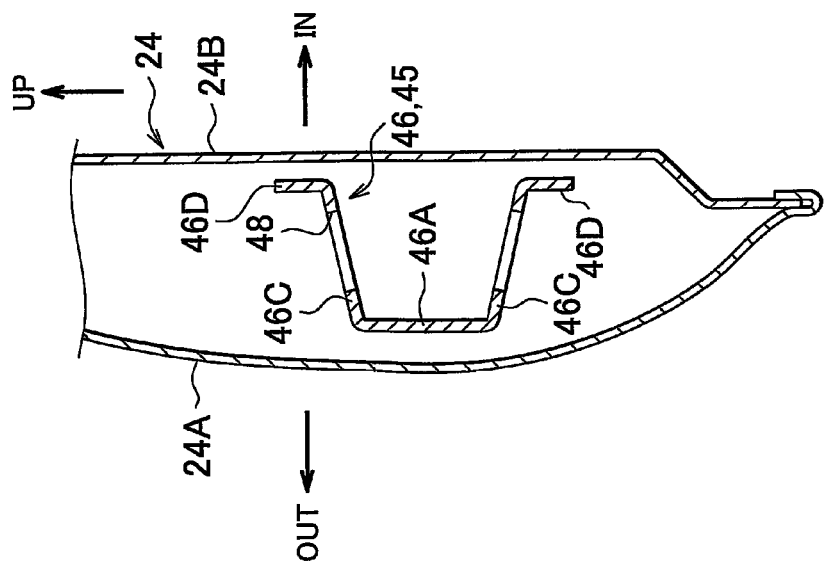

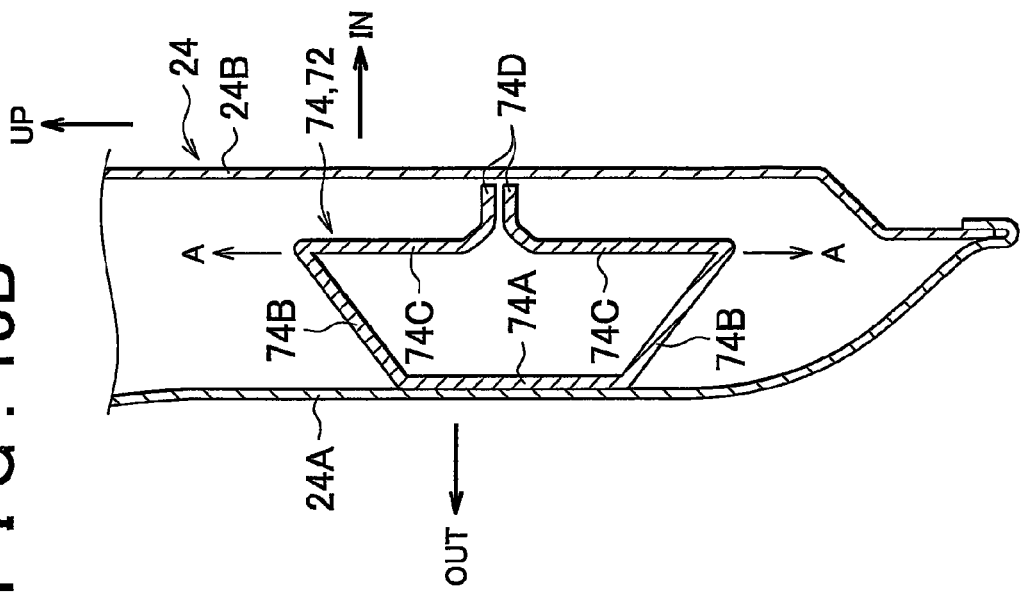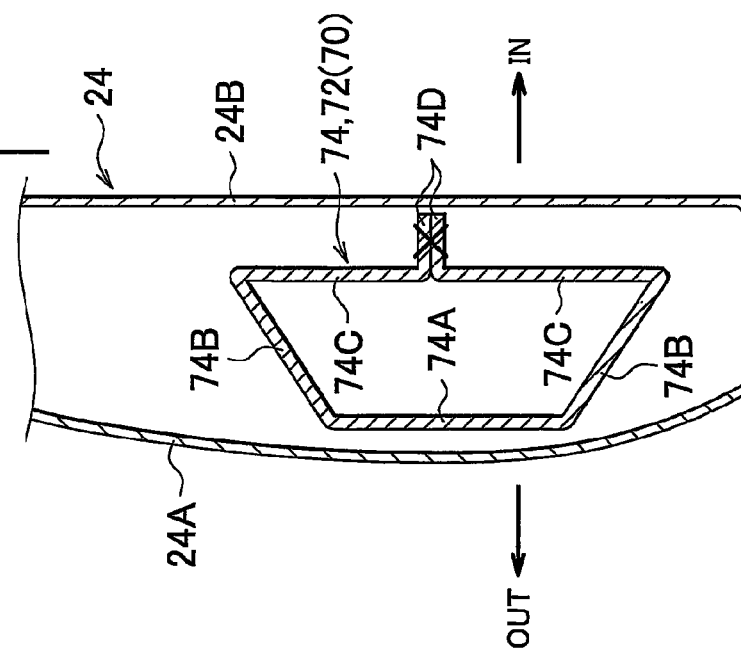

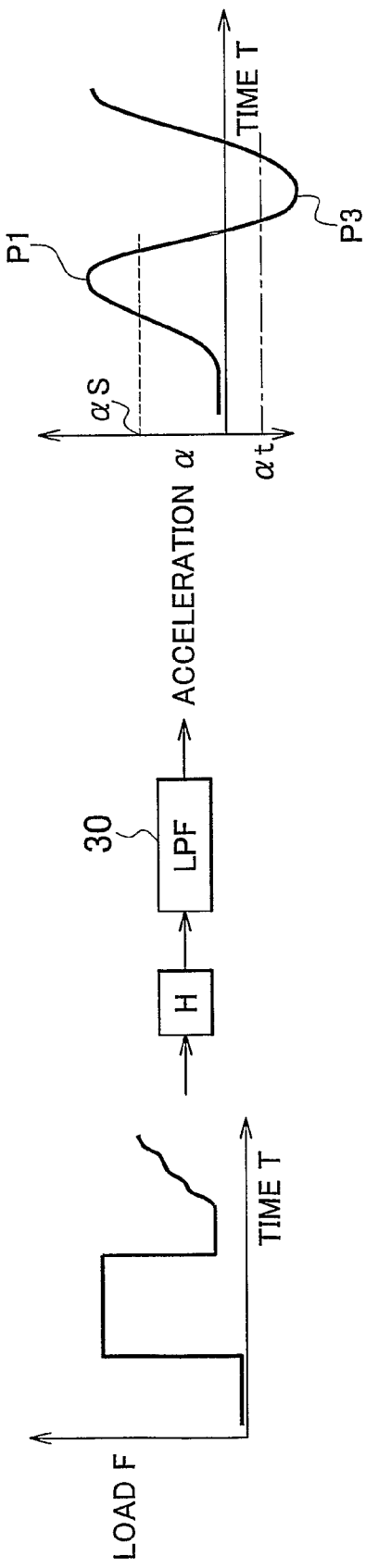

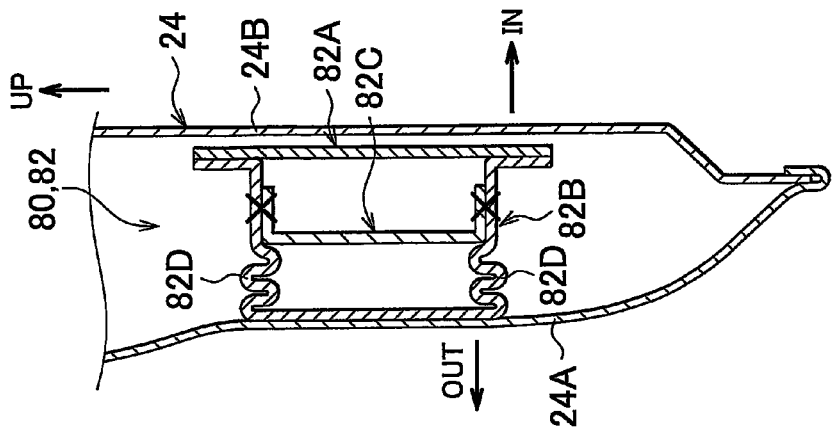
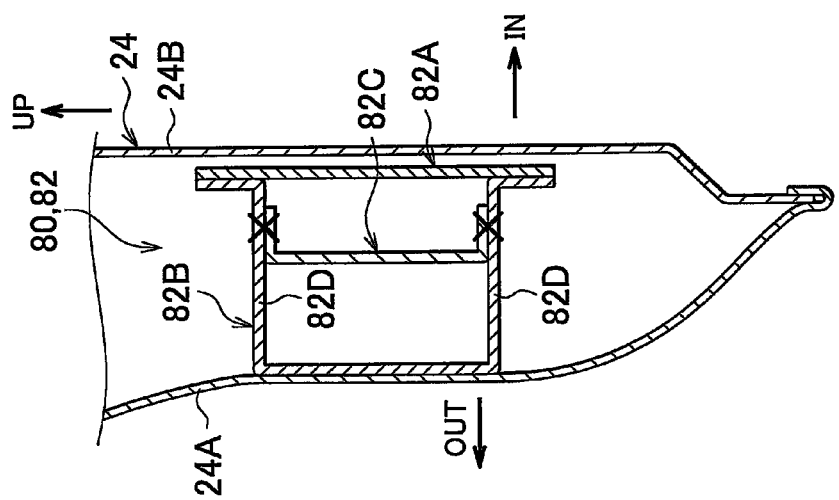
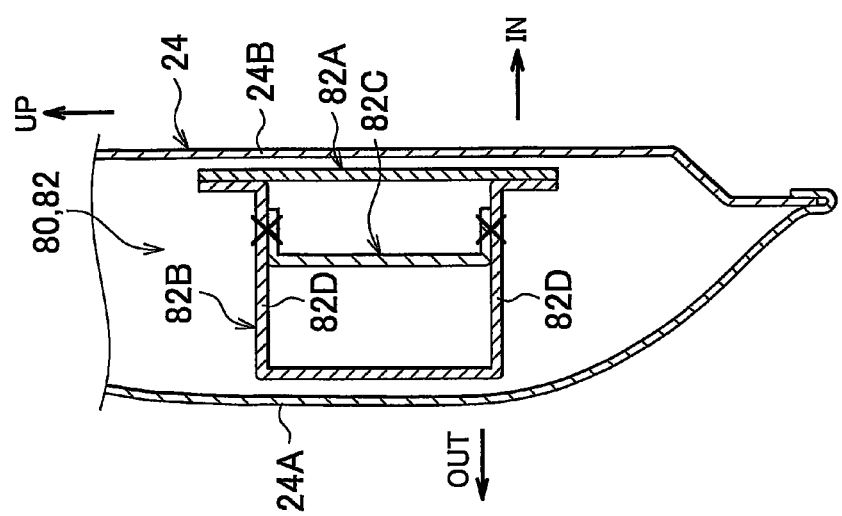

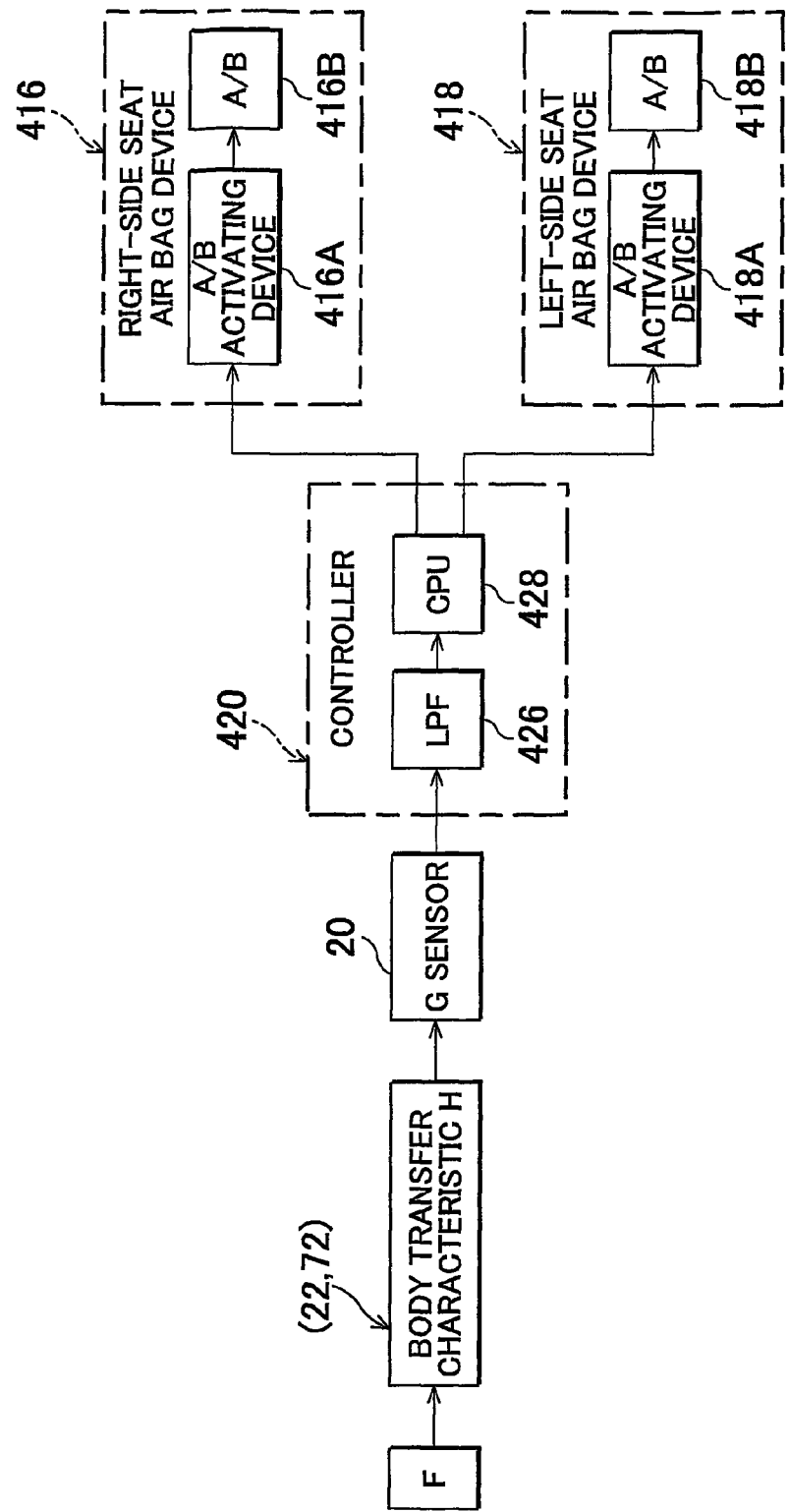

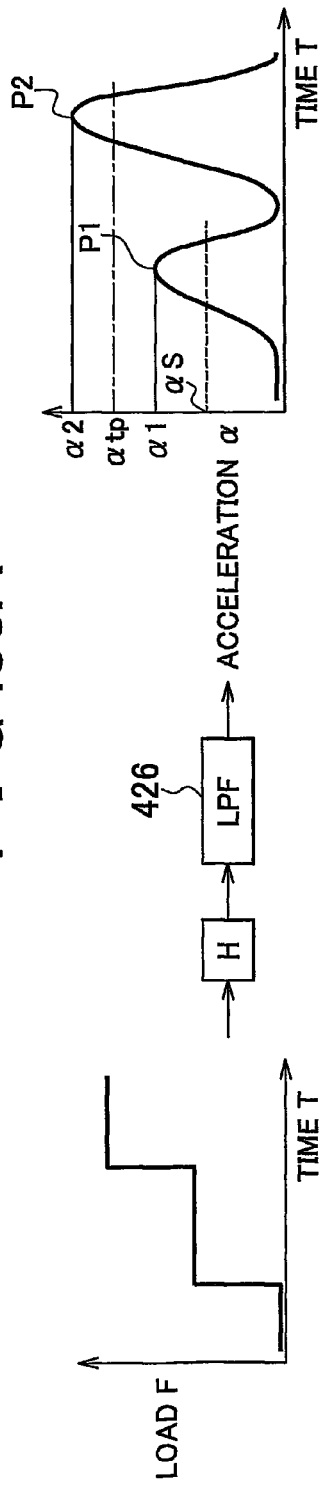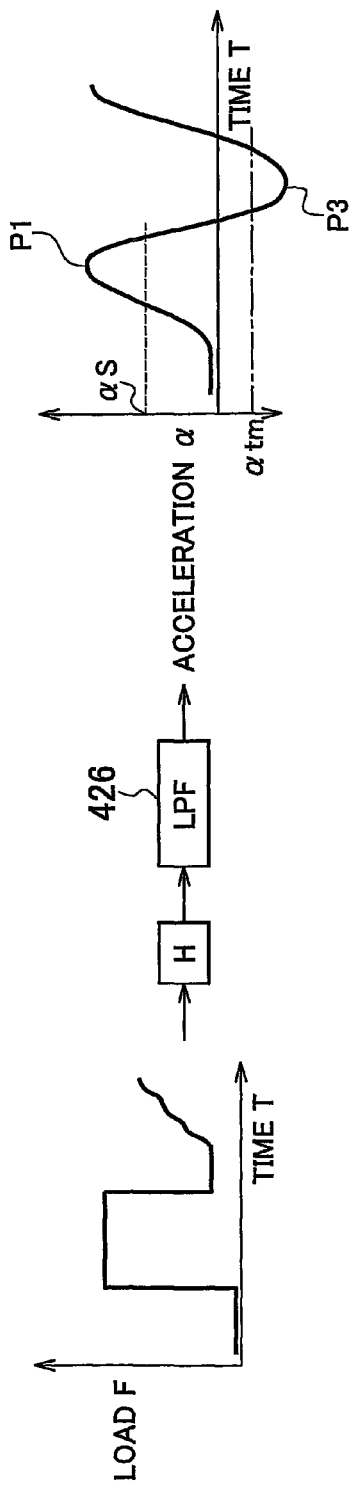

IMPACT DETECTION STRUCTURE, IMPACT DETECTION SYSTEM AND METHOD, AND OCCUPANT PROTECTION SYSTEM AND METHOD

BACKGROUND OF THE INVENTION

1. Field of the Invention

The invention relates to an impact detection structure for detecting an impact on a vehicle to which the invention applied, an impact detection system and method, and an occupant protection system and method.

2. Description of the Related Art

A technology is available that ensures the detection of an impact by providing a door with a plurality of acceleration sensors and performing the detection based on the signals from the plurality of acceleration sensors so as not to mix up the acceleration caused by an impact with the acceleration caused when the door is closed (see Japanese Patent Application Publication No. 6-219237 (JP-A-6-219237)).

Meanwhile, an occupant protection device for a vehicle is available that includes: a lateral acceleration sensor disposed in a center area with respect to the vehicle width direction and used to determine on which side the side impact has occurred; a left side sensor that is disposed in a left end portion of the vehicle body and used to determine whether a left side impact has occurred; a right side sensor that is disposed in a right end portion of the vehicle body and used to determine whether a right side impact has occurred; and an ECU that determines the occurrence of a side impact based on the signals from these sensors and controls the operation of an occupant protection unit (see Japanese Patent Application Publication No. 2005-263145, for example).

In conventional devices as described above, however, the number of parts required is large because, for example, it is necessary to provide each door with a plurality of acceleration sensors, or it is necessary to provide on both sides of the vehicle body a plurality of side sensors to determine on which side the side impact has occurred.

SUMMARY OF THE INVENTION

The invention provides an impact detection structure, and an impact detection system and method that make it possible to correctly detect an impact with the use of a single acceleration sensor, and also provides an occupant protection system and method. More specifically, the invention provides an impact detection structure that makes it possible to differentiate the mode of load transmission to an acceleration detection portion between the load caused by an impact and the load not caused by an impact. The invention also provides an occupant protection system and method using the impact detection structure, with which it is possible to properly protect an occupant.

An impact detection structure according to a first aspect of the invention includes: an acceleration detection portion for detecting acceleration; and a two-stage load transmitting portion that transmits load caused by an impact at a predetermined speed to the acceleration detection portion in two stages having a predetermined time lag in such a manner that the load transmitted or the rate of change in the load differs between a first-stage load transmission and a second-stage load transmission.

In the impact detection structure according to the first aspect, the impact load is transmitted to the acceleration detection portion in two stages by the two-stage load transmitting portion. Thus, the manner in which the load is transmitted by the load transmitting portion differs between the load caused by an impact and the load not caused by an impact (for example, a single stage load transmission such as that caused by closing a door).

Thus, with the impact detection structure according to the first aspect, it is possible to differentiate the manner in which the load is transmitted to the acceleration detection portion between the load caused by an impact and the load not caused by an impact. Thus, it is made possible to detect the impact while differentiating the impact from another event with the use of a single acceleration sensor, for example. Note that the predetermined time lag may be set in accordance with the transfer characteristic (frequency characteristic) that depends on control system and the vehicle body between the portion to which the impact load is input and the acceleration detection portion.

In the impact detection structure of the first aspect, the two-stage load transmitting portion may be constructed so that, in a second-stage load transmission, the load transmitted or the rate of change in the load increases relative to the load transmitted or the rate of change in the load in a first-stage load transmission. The two-stage load transmitting portion may include a deformed portion that is deformed while transmitting the load through a predetermined stroke when the impact occurs. The deformed portion may include an elastic member. The deformed portion may include a weakened portion. The impact detection structure may further include: a first directly load-transmitting member; and a second directly load-transmitting member that faces the first directly load-transmitting member with the deformed portion interposed therebetween, wherein after the impact occurs, the first directly load-transmitting member transmits the load to the second directly load-transmitting member through the deformed portion and when the predetermined stroke of the deformed portion is consumed, starts directly transmitting the load to the second directly load-transmitting member. The first directly load-transmitting member or the second directly load-transmitting member may have the deformed portion.

With this impact detection structure, the load transmitted or the rate of change in the load in the second-stage load transmission increases relative to the load transmitted or the rate of change in the load in the first-stage load transmission due to the occurrence of the impact, so that it is possible to amplify the acceleration caused by the first-stage load transmission, with the use of the second-stage load transmission. Thus, it is made possible to detect the impact while differentiating the impact from another event. In addition, by virtue of the amplification of the acceleration, it is made possible to improve the accuracy of the differentiation from a light impact.

In the impact detection structure of the first aspect, the two-stage load transmitting portion may be constructed so that when the impact at the predetermined speed occurs, a first local maximum peak of acceleration caused by the load transmitted by the second-stage load transmission substantially coincides with a second local maximum peak of acceleration caused by the load transmitted by the first-stage load transmission.

In this impact detection structure, when the impact at the first predetermined speed occurs on the one side, a first local maximum peak of acceleration caused by the load transmitted by the second-stage load transmission substantially coincides with a second local maximum peak of acceleration caused by the load transmitted by the first-stage load transmission. Thus, the second local maximum value is sufficiently greater than the first local maximum value in the waveform of the acceleration, so that it is possible to detect the impact while further effectively differentiating the impact from another event. In addition, there is no or small amplification of the acceleration in the case of a light impact at a lower speed as compared to the predetermined speed, so that it is possible to accurately differentiating the impact from a light impact.

In the impact detection structure of the first aspect, the two-stage load transmitting portion may be constructed so that, in a second stage load transmission, the load transmitted or the rate of change in the load is reduced relative to the load transmitted or the rate of change in the load in a first-stage load transmission. The two-stage load transmitting portion may have a joint portion, wherein when the impact occurs and the load exceeds a predetermined value after the first-stage load transmission is started, the joint portion is disconnected by the load, thereby reducing the load transmitted or the rate of change in the load. The two-stage load transmitting portion may have a buckling portion, wherein when the impact occurs and the load exceeds a predetermined value after the first-stage load transmission is started, the buckling portion buckles due to the load, thereby reducing the load transmitted or the rate of change in the load.

With this impact detection structure, the load transmitted or the rate of change in the load in the second-stage load transmission is reduced relative to the load transmitted or the rate of change in the load in the first-stage load transmission due to the occurrence of the impact, so that it is possible to reduce the acceleration caused by the first-stage load transmission, with the use of the second-stage load transmission. Thus, it is made possible to detect the impact while differentiating the impact from another event. In addition, by virtue of the reduction of the acceleration, it is made possible to improve the accuracy of the differentiation from a light impact.

In the impact detection structure of the first aspect, the two-stage load transmitting portion may be constructed so that when the impact at the predetermined speed occurs, a first local minimum peak of acceleration caused by the load transmitted by the second-stage load transmission substantially coincides with a first local minimum peak of acceleration caused by the load transmitted by the first-stage load transmission.

In this impact detection structure, when the impact at the second predetermined speed occurs, a first local minimum peak of acceleration caused by the load transmitted by the second-stage load transmission substantially coincides with a first local minimum peak of acceleration caused by the load transmitted by the first-stage load transmission. Thus, the first local minimum value is sufficiently small in the waveform of the acceleration, so that it is possible to detect the impact while further effectively differentiating the impact from another event.

Because the occurrence of the impact is determined about the time at which the first local minimum value of the acceleration caused by the load transmitted by the first-stage load transmission occurs, it is possible to determine the occurrence of the impact in a shorter time as compared to the case where the occurrence of the impact is determined about the time at which the second local maximum peak of the acceleration caused by the load transmitted by the first-stage load transmission occurs. In addition, there is no or small reduction of the acceleration in the case of a light impact at a lower speed as compared to the predetermined speed, so that it is possible to accurately differentiate the impact from a light impact.

In the impact detection structure of the first aspect, the acceleration detection portion may have a single acceleration sensor that outputs a signal indicative of acceleration, and the impact detection structure may further include an impact determination section that determines at least one of occurrence of an impact and an impact speed based on the signal output from the acceleration sensor after the start of the second-stage load transmission.

In this impact detection structure, the impact determination section determines at least one of the occurrence of the impact and the impact speed based on the output signal output from the single acceleration sensor of the acceleration detection portion after the start of the second-stage load transmission (for example, the output signal indicative of the fact that the local maximum or minimum peak of the acceleration caused by the first-stage load transmission and the local maximum or minimum peak of the acceleration caused by the second-stage load transmission substantially coincide with each other). In this way, it is made possible to detect the impact while differentiating the impact from another event with the use of a single acceleration sensor.

In the impact detection structure of the first aspect, the two-stage load transmitting portion may transmit the load caused by a side impact to the acceleration detection portion, and the impact determination section may determine at least one of occurrence of the side impact and a side impact speed based on the signal output from the acceleration sensor after the start of the second load transmission.

In this impact detection structure, when a side impact occurs, load is transmitted to the acceleration detection portion in two stages, and the impact determination section determines at least one of the occurrence of a side impact or the side impact speed based on the signal output from the acceleration sensor according to the variation of the acceleration caused by the two-stage load transmission. In this way, it is made possible to detect the impact while differentiating the impact from another event, such as closing of a side door, with the use of a single acceleration sensor.

An occupant protection system according to a second aspect of the invention includes: an occupant protection device capable of varying a mode of protection for an occupant; an impact detection structure in which the impact determination section determines the occurrence of the impact and the impact speed; and a controller that, when the impact determination section determines that the impact has occurred, activates the occupant protection device so as to effect the mode of protection of the occupant according to the impact speed determined by the impact determination section.

In this occupant protection system, when the impact determination section determines that an impact has occurred based on the signal from the single acceleration sensor of the acceleration detection portion, the controller activates the occupant protection device (controls the activation of the occupant protection device) so that an occupant(s) is protected in the mode of protection that is selected in accordance with the impact speed determined (detected) by the impact determination section. In this way, the occupant(s) is properly protected by the occupant protection device.

An impact detection system according to a third aspect of the invention includes: an acceleration sensor, provided on a vehicle body, that detects acceleration; a first two-stage load transmitting portion that transmits, to the acceleration sensor, load caused by an impact at a first predetermined speed on one side with respect to the acceleration sensor in two stages having a first predetermined time lag in such a manner that the load or the rate of change in the load differs between a first-stage load transmission and a second-stage load transmission; a second two-stage load transmitting portion that transmits, to the acceleration sensor, load caused by an impact at a second predetermined speed on the other side with respect to the acceleration sensor in two stages having a second predetermined time lag in such a manner that the load transmitted or the rate of change in the load differs between a first-stage load transmission and a second-stage load transmission and that the manner, in which the load transmitted or the rate of change in the load in the second-stage load transmission is changed from the load transmitted or the rate of change in the load in the first-stage load transmission in the second two-stage load transmitting portion, differs from the manner, in which the load transmitted or the rate of change in the load in the second-stage load transmission is changed from the load transmitted or the rate of change in the load in the first-stage load transmission in the first two-stage load transmitting portion; and an impact determination section that determines on which side the impact has occurred with respect to the acceleration sensor based on a signal from the acceleration sensor.

In the impact detection system of the third aspect, the impact load caused on one side with respect to the acceleration sensor is transmitted to the acceleration sensor in two stages by the first two-stage load transmitting portion. On the other hand, the impact load caused on the other side with respect to the acceleration sensor is transmitted to the acceleration sensor in two stages by the second two-stage load transmitting portion. In the impact detection system, the modes of the load transmission to the acceleration sensor by the first and second two-stage load transmitting portions, respectively (the manner in which the load transmitted or the rate of change in the load in the second-stage load transmission is changed from the load transmitted or the rate of change in the load in the first-stage load transmission) differ from each other. Thus, the impact determination section determines the difference in the caused acceleration due to such a difference between the modes of the load transmission, thereby detecting whether the side on which the impact has occurred is one side or the other side with respect to the acceleration sensor. In other words, it is possible to detect the impact while determining on which side the impact has occurred.

As described above, the impact detection system of the third aspect can determine on which side the impact has occurred with the use of a single acceleration sensor. The predetermined time lag may be set according to the transfer characteristic (frequency characteristic) that depends on control system and the vehicle body between the portion to which the impact load is input and the acceleration sensor, and may be mutually different time lags for the first and second two-stage load transmitting portions, respectively.

In the impact detection system of the third aspect, the first two-stage load transmitting portion may be constructed so that, in the second-stage load transmission to the acceleration sensor, the load transmitted or the rate of change in the load is increased relative to the load transmitted or the rate of change in the load in the first-stage load transmission, and the second two-stage load transmitting portion may be constructed so that, in the second-stage load transmission to the acceleration sensor, the load transmitted or the rate of change in the load is reduced relative to the load transmitted or the rate of change in the load in the first-stage load transmission. The first two-stage load transmitting portion may include a deformed portion that is deformed while transmitting the load through a predetermined stroke when the impact occurs. The deformed portion may include an elastic member. The deformed portion may include a weakened portion. The first two-stage load transmitting portion may further include: a first directly load-transmitting member; and a second directly load-transmitting member that faces the first directly load-transmitting member with the deformed portion interposed therebetween, wherein after the impact occurs, the first directly load-transmitting member transmits the load to the second directly load-transmitting member through the deformed portion and when the predetermined stroke of the deformed portion is consumed, starts directly transmitting the load to the second directly load-transmitting member. The first directly load-transmitting member or the second directly load-transmitting member may have the deformed portion. The second two-stage load transmitting portion may have a joint portion, wherein when the impact occurs and the load exceeds a predetermined value after the first-stage load transmission is started, the joint portion is disconnected by the load, thereby reducing the load transmitted or the rate of change in the load. The second two-stage load transmitting portion may have a joint portion, wherein when the impact occurs and the load exceeds a predetermined value after the first-stage load transmission is started, the joint portion is disconnected by the load, thereby reducing the load transmitted or the rate of change in the load.

In this impact detection system, in the first two-stage load transmitting structure, the load transmitted or the rate of change in the load in the second-stage load transmission increases relative to the load transmitted or the rate of change in the load in the first-stage load transmission due to the occurrence of the impact, so that it is possible to amplify the acceleration caused by the first-stage load transmission, with the use of the second-stage load transmission. On the other hand, in the second two-stage load transmitting structure, the load transmitted or the rate of change in the load in the second-stage load transmission is reduced relative to the load transmitted or the rate of change in the load in the first-stage load transmission due to the occurrence of the impact, so that it is possible to lower the acceleration caused by the first-stage load transmission, with the use of the second-stage load transmission. Based on the difference in the acceleration (the variation with time thereof), it is possible to determine on which side the impact has occurred with the use of a single acceleration sensor.

In the impact detection system of the third aspect, the first two-stage load transmitting portion may be constructed so that when the impact at the first predetermined speed occurs, a first local maximum peak of acceleration caused by the load transmitted by the second-stage load transmission substantially coincides with a second local maximum peak of acceleration caused by the load transmitted by the first-stage load transmission, and the second two-stage load transmitting portion may be constructed so that when the impact at the second predetermined speed occurs, a first local minimum peak of acceleration caused by the load transmitted by the second-stage load transmission substantially coincides with a first local minimum peak of acceleration caused by the load transmitted by the first-stage load transmission.

In this impact detection system, in the first two-stage load transmitting structure, when the impact at the first predetermined speed occurs on the one side, a first local maximum peak of acceleration caused by the load transmitted by the second-stage load transmission substantially coincides with a second local maximum peak of acceleration caused by the load transmitted by the first-stage load transmission. Thus, the second local maximum value is greater than the first local maximum value in the waveform of the acceleration. On the other hand, in the second two-stage load transmitting structure, when the impact at the second predetermined speed occurs, a first local minimum peak of acceleration caused by the load transmitted by the second-stage load transmission substantially coincides with a first local minimum peak of acceleration caused by the load transmitted by the first-stage load transmission. Thus, the first local minimum value is sufficiently small in the waveform of the acceleration (including the case where the acceleration becomes negative). Based on the difference in the acceleration (the waveform thereof), it is possible to determine on which side the impact has occurred with the use of a single acceleration sensor.

In the impact detection system of the third aspect, the acceleration sensor may be disposed in a center area, with respect to a vehicle width direction, of the vehicle body, the first two-stage load transmitting portion may be constructed so that the load caused by a side impact on one side, with respect to the vehicle width direction, of the vehicle body is transmitted to the acceleration sensor in two stages, and the second two-stage load transmitting portion may be constructed so that the load caused by a side impact on the other side, with respect to the vehicle width direction, of the vehicle body is transmitted to the acceleration sensor in two stages.

In this impact detection system, when a side impact has occurred on one side with respect to the vehicle width direction, load is transmitted to the acceleration sensor in two stages through the first two-stage load transmitting portion and when a side impact has occurred on the other side with respect to the vehicle width direction, load is transmitted in two stages through the second two-stage load transmitting portion. With this impact detection system, it is possible to detect on which side the a side impact has occurred based on the difference, between the first and second two-stage load transmitting portions, in the manner in which the load transmitted or the rate of change in the load in the second two-stage load transmission is changed from the load transmitted or the rate of change in the load in the first-stage load transmission.

In the impact detection system of the third aspect, the impact determination section may determine occurrence of the impact on the one side or on said the other side with respect to the acceleration sensor based on the signal from the acceleration sensor.

In this impact detection system, load is transmitted to the acceleration sensor in two stages through the first or second two-stage load transmitting portion when an impact has occurred, so that the mode of the load transmission to the acceleration sensor differs between the case of the load caused by an impact and the case of the load not caused by an impact (single stage load transmission, such as that caused by closing a door, for example). Thus, with this impact detection system, it is possible to detect the impact while differentiating the impact from another event with the use of a single acceleration sensor. In other words, with the impact detection system, it is possible to detect both the occurrence of an impact and the side on which the impact has occurred, with the use of a single acceleration sensor.

An occupant protection system according to a fourth aspect of the invention includes: the impact detection system of the third aspect; a first occupant protection device for protecting the occupant against the impact on the one side with respect to the acceleration sensor; a second occupant protection device for protecting the occupant against the impact on said the other side with respect to the acceleration sensor; and a controller that when occurrence of the impact is detected, activates one of the first and second occupant protection devices that protects the occupant on the side, on which the impact has occurred, determined by the impact determination section.

In the occupant protection system of the fourth aspect, the controller activates the occupant protection device on the side, on which the impact has occurred, based on the result of determination made by the impact determination section when the occurrence of an impact is detected. In this way, the occupant(s) is properly protected by the occupant protection device. In addition, it is possible to prevent the occupant protection device on the side opposite to the impact side from being unnecessarily activated.

As described above, the impact detection structure according to the first aspect of the invention has an advantageous effect that it is possible to differentiate the modes of the load transmission to the acceleration detection portion between the case of an impact and the case of another event. The occupant protection system and method according to the second and fifth aspect of the invention have an advantageous effect that it is possible to properly protect an occupant(s) according to the impact speed.

The impact detection system according to the third aspect of the invention has an advantageous effect that it is possible to determine the side on which the impact has occurred, with the use of a single acceleration sensor. The occupant protection system and method according to the fourth and sixth aspect of the invention have an advantageous effect that it is possible to properly protect an occupant(s) according to the impact speed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 11A is a sectional diagram showing a third modification of the two-stage load transmitting structure, which is a constituent element of the side impact detection system according to the first embodiment of the invention;

FIG. 11B is a perspective view of an impact beam, which is a constituent element of the two-stage load transmitting structure, showing the third modification of the two-stage load transmitting structure, which is a constituent element of the side impact detection system according to the first embodiment of the invention;

FIG. 15A is a sectional diagram showing a two-stage load transmitting structure, which is a constituent element of a side impact detection system according to a second embodiment of the invention, before a side impact;

FIG. 15B is a sectional diagram showing the two-stage load transmitting structure, which is a constituent element of the side impact detection system according to the second embodiment of the invention, at the time of the side impact;

FIG. 18 is an explanatory diagram schematically showing a relation between transmitted load and acceleration in the side impact detection system according to the second embodiment of the invention;

FIG. 21A is a sectional diagram showing a first modification of the two-stage load transmitting structure, which is a constituent element of the side impact detection system according to the second embodiment of the invention, before a side impact;

FIG. 21B is a sectional diagram showing the first modification of the two-stage load transmitting structure, which is a constituent element of the side impact detection system according to the second embodiment of the invention, in a first-stage load transmission;

FIG. 21C is a sectional diagram showing the first modification of the two-stage load transmitting structure, which is a constituent element of the side impact detection system according to the second embodiment of the invention, in a second-stage load transmission;

FIG. 29 is a block diagram showing an anti-side impact occupant protection system to which a side impact detection system according to the fourth embodiment of the invention is applied;

FIG. 30A is a diagram showing a relation between acceleration and load transmitted through right one of right and left two-stage load transmitting structures that are constituent elements of the side impact detection system according to the fourth embodiment of the invention;

FIG. 30B is a diagram showing a relation between acceleration and load transmitted through left one of the right and left two-stage load transmitting structures that are constituent elements of the side impact detection system according to the fourth embodiment of the invention.

DETAILED DESCRIPTION OF EMBODIMENTS (First Embodiment)

Figure 1:
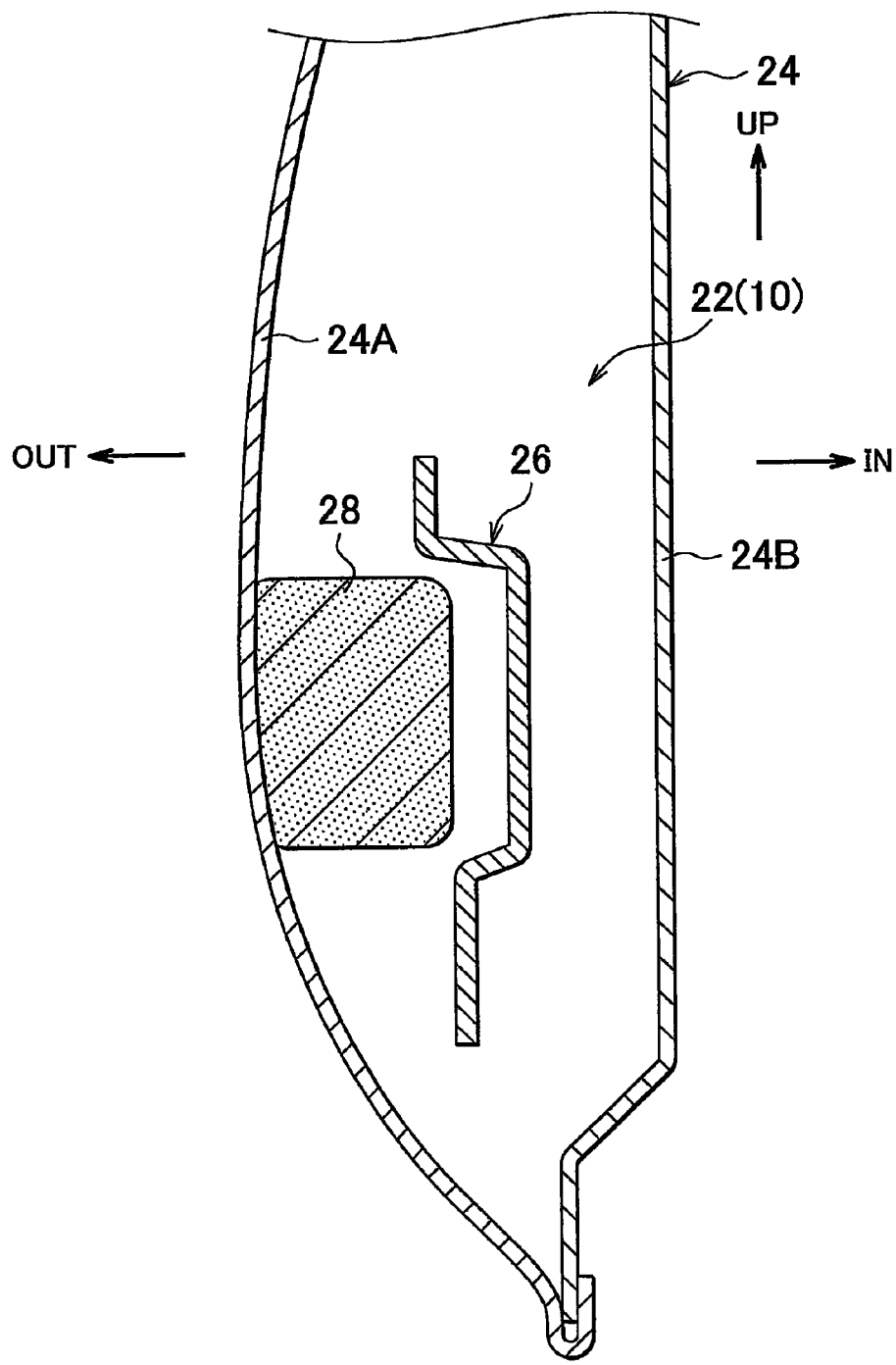
FIG. 1 is a sectional diagram showing a two-stage load transmitting structure, which is a constituent element of a side impact detection system according to a first embodiment of the invention.

A side impact detection system 10 that functions as the impact detection structure according to a first embodiment of the invention will be described with reference to FIGS. 1 to 7. First, a schematic configuration of an anti-side impact occupant protection system 12, for protecting an occupant(s), of an automobile 11, which is a vehicle to which the side impact detection system 10 is applied will be described, and then the side impact detection system 10 will be described. In the drawings, the arrows FR, UP, IN, and OUT indicate the forward direction with respect to the vehicle, the upward direction with respect to the vehicle, the laterally inward direction with respect to the vehicle, and the laterally outward direction with respect to the vehicle, respectively.

(Schematic Configuration of Side Impact Protection System)

Figure 7:
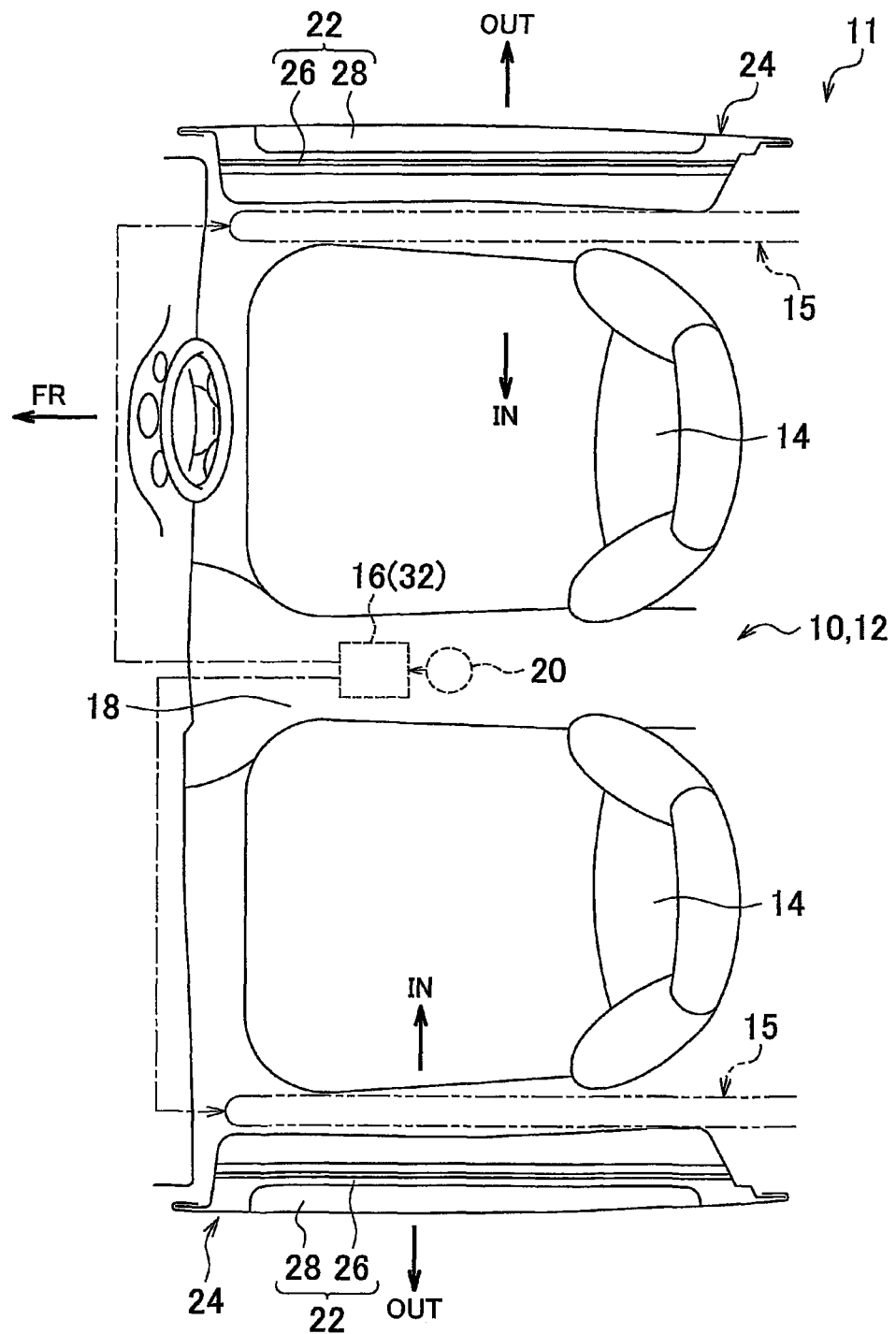
FIG. 7 is a plan view schematically showing part of an automobile to which the anti-side impact occupant protection system according to the first embodiment of the invention is applied.

FIG. 7 shows a schematic plan view of a front portion of the automobile 11. As shown in FIG. 7, the anti-side impact occupant protection system 12 includes side impact air bag devices 15 arranged on the outer sides of right and left seats 14 with respect to the vehicle width, or lateral, direction. The side impact air bag device 15 is designed to protect an occupant by activating an air bag activating device 15A, such as an inflator, to deploy an air bag 15B on the outer side, with respect to the vehicle width direction, of the occupant on the corresponding seat 14 when a side impact of the automobile 11 occurs. A curtain air bag, a side air bag, a combination thereof, for example, can be used as the side impact air bag device 15.

The activation of the right and left side impact air bag devices 15 is controlled by a controller (ECU) 16. The controller 16 is disposed in a center area, with respect to the vehicle width direction, of the automobile 11, such as a floor tunnel 18, and also controls the activation of other air bags, such as front impact air bags and rear impact air bags, and a seat belt device, in this embodiment.

The controller 16, which has a low-pass filter 30 and a central processing unit (CPU) 32, is a constituent element of the side impact detection system 10 including a side impact-detecting G sensor 20, which functions as an acceleration sensor, and the controller 16 controls the activation of the side impact air bag device 15 in accordance with the signal from the side impact-detecting G sensor 20. The side impact-detecting G sensor 20 is disposed in the center area, with respect to vehicle width direction, of the automobile 11, such as the floor tunnel 18, for example. Specifically, in this embodiment, the portion in which the side impact-detecting G sensor 20 is disposed in the floor tunnel 18 functions as the acceleration detection portion. The side impact-detecting G sensor 20 may be incorporated in the controller 16.

(Configuration of Side Impact Detection System)

Figure 2A:
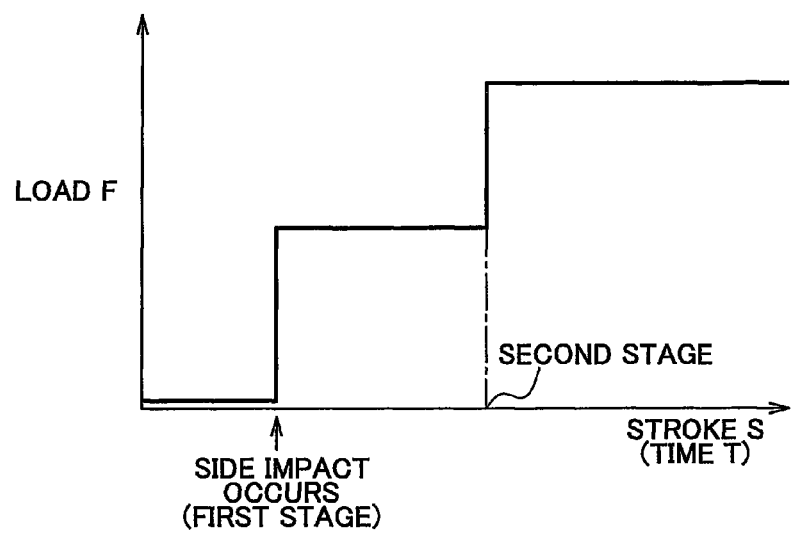
FIG. 2A is a diagram showing a first mode of load transfer characteristic of the two-stage load transmitting structure, which is a constituent element of the side impact detection system according to the first embodiment of the invention.
Figure 2B:
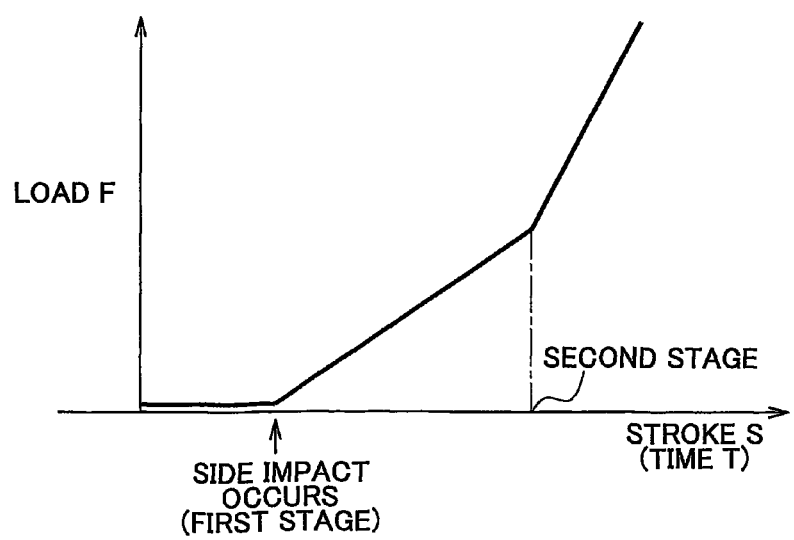
FIG. 2B is a diagram showing a second mode of load transfer characteristic of the two-stage load transmitting structure, which is a constituent element of the side impact detection system according to the first embodiment of the invention.

The side impact detection system 10 has a two-stage load transmitting structure 22, which functions as the two-stage load transmitting portion that transmits, in two stages, load caused by a side impact to the side impact-detecting G sensor 20 disposed in the floor tunnel 18. The two-stage load transmitting structure 22 may be configured so that, as shown in FIG. 2A, the first-stage load rises upon a side impact and then the second-stage load further rises, or as shown in FIG. 2B, the first-stage load gradually increases after a side impact and then the rate of change in the load is raised by the second-stage input.

As shown in FIG. 7, the two-stage load transmitting structure 22 is provided for each of side doors 24 located on the outer sides of the right and left seats 14 with respect to the vehicle width direction. Specifically, as shown in FIG. 1, the two-stage load transmitting structure 22 is constructed by providing a first load transmitting member 28 on the outer side, with respect to the vehicle width direction, of an impact beam 26 that is a constituent element of the side door 24. The first load transmitting member 28 is formed in a block shape using a foam material, such as polyurethane foam, for example. The first load transmitting member 28 is configured to secure a predetermined interval (stroke Sp (not shown) not including the section through which the first load transmitting member 28 freely moves until brought into contact with the impact beam 26) between an outer panel 24A (impact body), which is a constituent element of the side door 24, and the impact beam 26.

The two-stage load transmitting structure 22 is configured so that when a side impact on the side door 24 occurs, load is transmitted from the first load transmitting member 28 to the impact beam 26 in the first-stage load transmission, and after the first load transmitting member 28 is compressed and the stroke Sp is consumed, load is directly transmitted from the impact body (outer panel 24A) to the impact beam 26 in the second-stage load transmission. The two-stage load transmitting structure 22 according to this embodiment is configured to effect the two-stage load transmission as shown in FIG. 2A.

In the side impact detection system 10, the load input, or applied, to the impact beam 26 in the first stage or the second stage is transmitted, through the vehicle body (rocker, floor cross member, etc.) of the automobile 11, to the floor tunnel 18 that includes the area in which the side impact-detecting G sensor 20 is disposed. The stroke Sp is set depending on the transfer characteristic H of the vehicle body or on the characteristics of the low-pass filter 30 that is a constituent element of the controller 16 so that, when a side impact at a predetermined impact speed Vp occurs, there is a predetermined time lag $\Delta T$ between when the first-stage load transmission starts and when the second-stage load transmission starts.

Figure 4A:
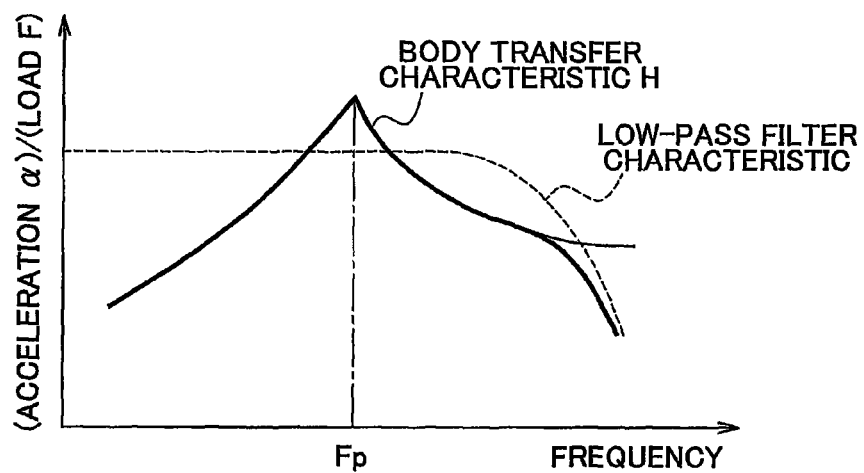
FIG. 4A is a diagram showing frequency characteristic of the acceleration caused by transmitted load in the side impact detection system according to the first embodiment of the invention in the case where resonance frequency of a body is within a predetermined range.
Figure 4B:
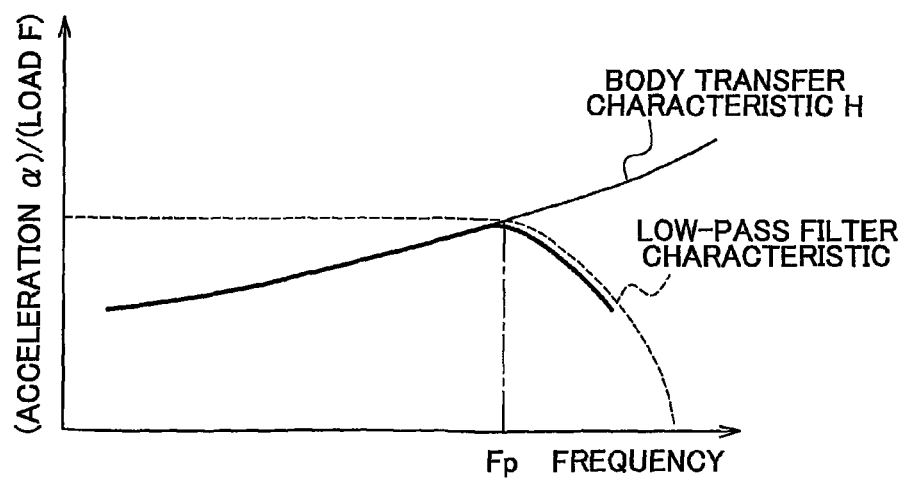
FIG. 4B is a diagram showing frequency characteristic of the acceleration caused by transmitted load in the side impact detection system according to the first embodiment of the invention in the case where resonance frequency of a body is out of the predetermined range.

Specifically, when the vehicle body exhibits relatively significant resonance (peak of acceleration in frequency characteristics), as shown in FIG. 4A, the resonance frequency is defined as a peak frequency Fp of the load transmission, and when the vehicle body exhibits no significant resonance, as shown in FIG. 4B, the peak frequency Fp is determined depending on the characteristics of the low-pass filter 30. The time lag $\Delta T$ is set using such a peak frequency Fp. In this embodiment, the time lag $\Delta T$ is set at the reciprocal of the peak frequency Fp, that is, the period of the vibration with the frequency Fp. In this embodiment, the time lag $\Delta T$ is approximately 5 msec.

Figure 5A:
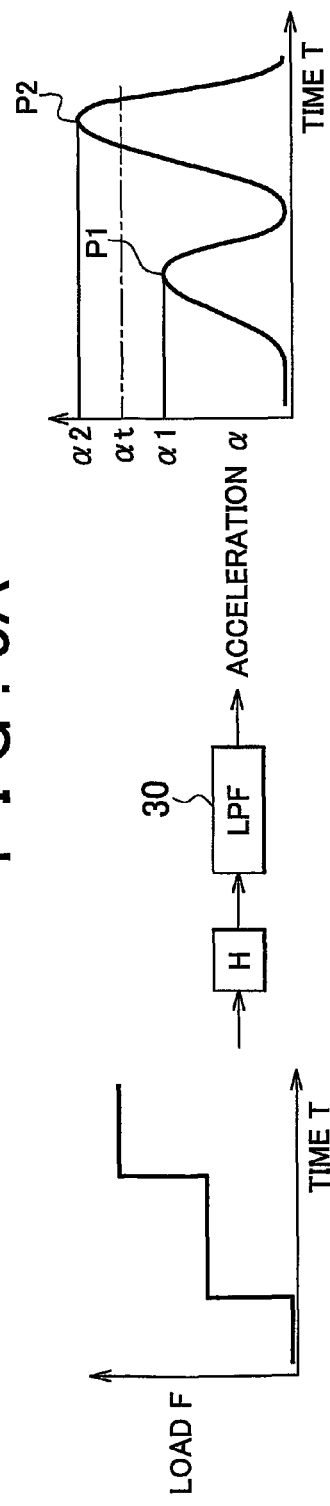
FIG. 5A is an explanatory diagram schematically showing a relation between transmitted load and acceleration in the side impact detection system according to the first embodiment of the invention.

Thus, the side impact detection system 10 is set so that there is a phase difference corresponding to one cycle of the vibration with the frequency Fp between the acceleration caused by the first-stage load transmission and the acceleration caused by the second-stage load transmission when a side impact at the impact speed Vp occurs. Specifically, the side impact detection system 10 is designed so that the first local maximum peak of the acceleration caused by the second-stage load transmission substantially coincides with the second local maximum peak of the acceleration caused by the first-stage load transmission. In other words, the second peak of the acceleration α is amplified as shown in FIG. 5A.

The impact speed Vp is set at a speed close to the lowest impact speed within the range in which the activation of the side impact air bag system 15 is required. Specifically, the impact speed Vp is set as described above in consideration of the fact that when the actual impact speed is lower than the impact speed Vp (so low that the amplification of acceleration described later cannot be expected), the activation of the side impact air bag system 15 is not required and when the actual impact speed is higher than the impact speed Vp (so high that the amplification of acceleration described later cannot be expected), the side impact can be detected based on the first peak of the acceleration α.

Figure 3:
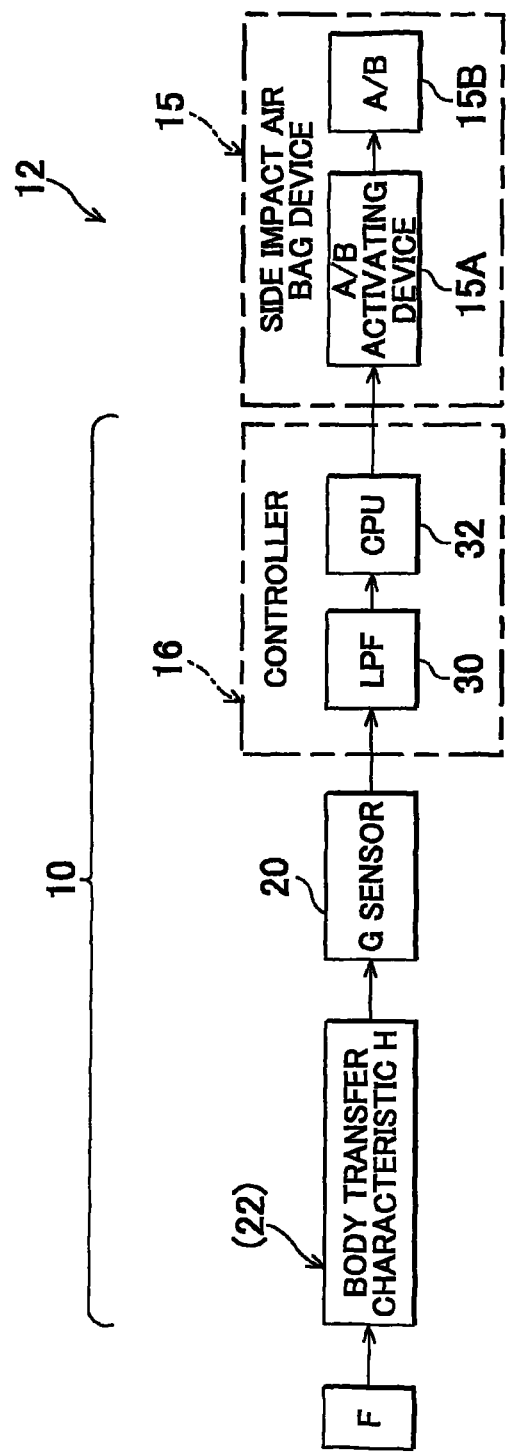
FIG. 3 is a block diagram showing an anti-side impact occupant protection system to which the side impact detection system according to the first embodiment of the invention is applied.

As described above, in the side impact detection system 10, as shown in FIG. 3, the load F caused by a side impact is transmitted to the side impact-detecting G sensor 20 through the vehicle body (transfer characteristic H) including the two-stage load transmitting structure 22, the output signal from the side impact-detecting G sensor 20 is input to the CPU 32 through the low-pass filter 30 of the controller 16, and the CPU 32 determines whether a side impact has occurred. Thus, the CPU 32 (controller 16) functions as the impact determination section of the invention. In the anti-side impact occupant protection system 12, the CPU 32 controls the activation of the side impact air bag system 15 based on the determination result.

The following is a supplementary explanation concerning the determination of the occurrence of an impact made by the CPU 32. In the side impact detection system 10 in which load is transmitted through the two-stage load transmitting structure 22 to the side impact-detecting G sensor 20 in two stages having the time lag ΔT, the first local maximum peak of the acceleration caused by the second-stage load transmission substantially coincides with the second local maximum peak of the acceleration caused by the first-stage load transmission as described above. Thus, in the output signal (acceleration α) from the side impact-detecting G sensor 20, the second peak P2 is higher than the first peak P1 as shown in FIG. 5A.

In the CPU 32, the acceleration value between the value of the first peak P1 and the value of the second peak P2 that are presumed to occur in the case of the impact speed Vp is set as a threshold value αt. In addition, αt is set so as to be higher than the acceleration caused by the maximum credible load due to closing the side door 24. Thus, in the CPU 32, it is the necessary condition for detection of the occurrence of a side impact that the CPU 32 receives from the side impact-detecting G sensor 20 a signal corresponding to the fact that the acceleration α exceeds the threshold value αt.

Figure 6:
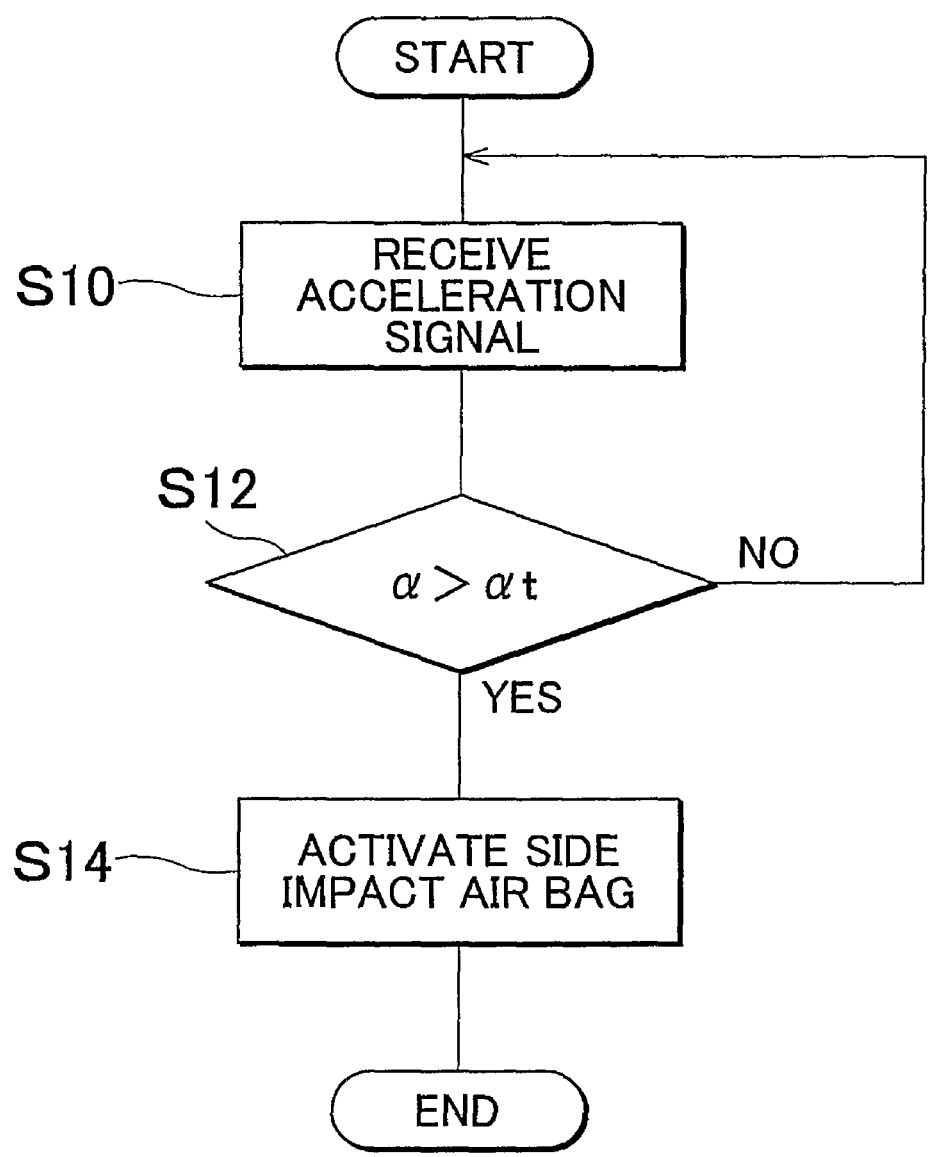
FIG. 6 is a flow chart showing a process flow of control performed by a controller, which is a constituent element of the side impact detection system according to the first embodiment of the invention.

Next, operations of the first embodiment will be described with reference to a flow chart shown in FIG. 6.

In the side impact detection system 10 with the above-described configuration, the CPU 32 reads in a signal from the side impact-detecting G sensor 20 in step S10 and determines whether the acceleration α corresponding to the signal received from the side impact-detecting G sensor 20 exceeds the threshold value αt in step S12. When the CPU 32 determines that the acceleration α does not exceed the threshold value αt, the CPU 32 returns to step S10.

Meanwhile, when the CPU 32 determines in step S12 that the acceleration α exceeds the threshold value αt, the CPU 32 proceeds to step S14 to activate the side impact air bag system 15. Specifically, when the CPU 32 determines that a side impact has occurred, the CPU 32 activates the side impact air bag system 15. In this way, an occupant(s) of the automobile 11 is protected against a side impact.

Because the side impact detection system 10 includes the two-stage load transmitting structure 22, when a side impact at a speed near the set impact speed Vp occurs, the acceleration detected by the side impact-detecting G sensor 20 exhibits the second peak P2 higher than the first peak P1 as shown in FIG. 5A. It is possible to detect a side impact (the side impact that requires the activation of the side impact air bag system 15) based on whether the acceleration α exceeds the threshold value αt on the way to the second peak P2.

Figure 5B:
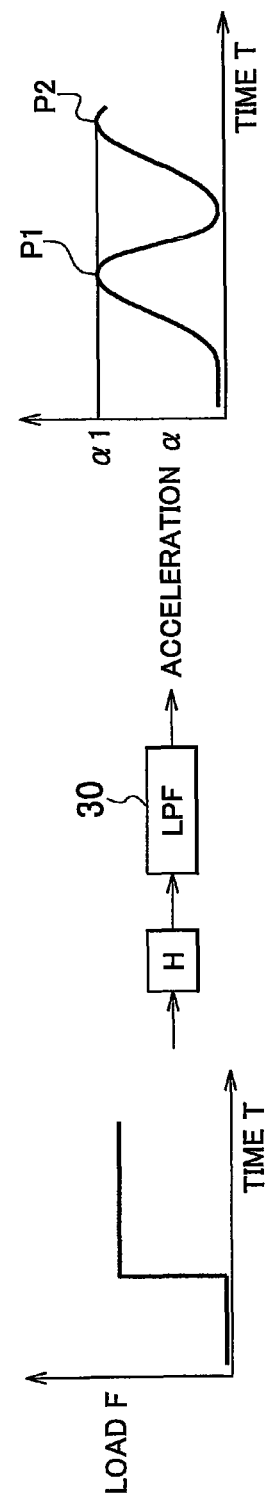
FIG. 5B is an explanatory diagram schematically showing a relation between transmitted load and acceleration in the case of a comparative example.

For example, in the case of closing the side door 24, when it is assumed that the mass m of the side door 24 is 20 kg, the door closing speed Vd is 50 km/h (≈14 m/s), and the load Fd caused when the side door 24 is closed is 10 kN, the momentum conservation law, m×Vd=∫(Fd×T)dt, gives T≈28 msec. The time T is sufficiently long relative to the time of T≈7.5 msec that is the time interval between the start of the impact and the occurrence of the second peak P2 when the impact speed is Vp in the side impact detection system 10 with ΔT≈5 msec as described above, and therefore, such application of load can be regarded as one stage load input. Thus, as shown in FIG. 5B, closing the side door 24 does not cause the second peak P2 that is higher than the first peak P1. In addition, in the case of closing the door, the load drops after the time of T≈28 msec has elapsed, and the acceleration higher than αt does not occur.

As described above, the side impact detection system 10 is provided with the two-stage load transmitting structure 22 that transmits only the load that is caused by a side impact to the side impact-detecting G sensor 20 in two stages having the predetermined time lag ΔT, so that the acceleration α that acts on the side impact-detecting G sensor 20 does not exceed the threshold value αt in the case of a simple, one stage load input, such as that caused by closing a door, and it is possible to selectively detect a side impact. Specifically, the side impact detection system 10 can distinguish, or differentiate, a side impact on laterally one side of the vehicle from door closing or the like with the use of a single side impact-detecting G sensor 20.

In addition, in the side impact detection system 10, when the side impact speed is significantly higher than the predetermined impact speed Vp, the acceleration higher than αt occurs at the first peak P1 and the side impact air bag system 15 is activated in a shorter time. On the other hand, when the side impact speed is significantly lower than the predetermined impact speed Vp, that is, in the case of a light impact, the peak of the acceleration caused by the load transmitted in the second stage is significantly apart from the second peak of the acceleration caused by the load transmitted in the first stage, and the second peak P2 does not exceed αt, so that the side impact air bag system 15 is not activated.

(Modification of Impact Determination Method)

The above-described first embodiment shows an example in which the CPU 32 determines whether a side impact has occurred (whether the side impact air bag system 15 should be activated) based on whether the acceleration α exceeds the threshold value αt. The invention, however, is not limited to this embodiment, and as shown in FIG. 8, for example, the CPU 32 may be configured to determine whether a side impact has occurred (whether the side impact air bag system 15 should be activated), based on whether the difference ($\alpha 2 - \alpha 1$) between the acceleration $\alpha 2$ on the way to the second peak P2 and the accelerational $\alpha 1$ the first peak P1 exceeds a threshold value $\Delta \alpha t$.

Figure 8:
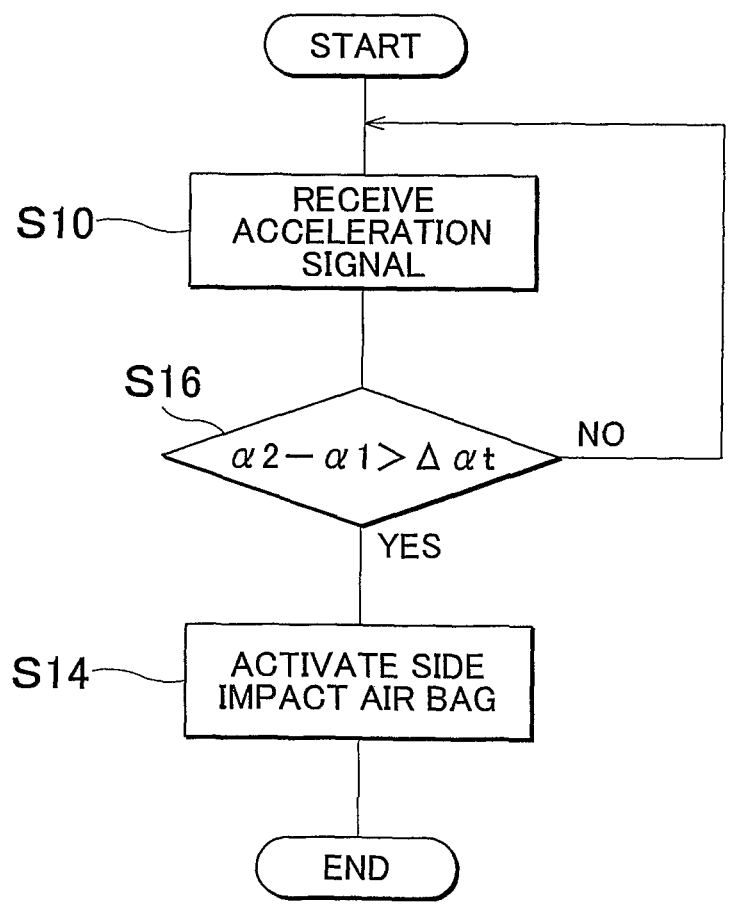
FIG. 8 is a flow chart showing a modification of the process flow of control performed by the controller, which is a constituent element of the side impact detection system according to the first embodiment of the invention.

In this case, the CPU 32, in step S16 shown in FIG. 8 instead of step S12, determines whether the difference, $\alpha 2 - \alpha 1$, exceeds the threshold value $\Delta \alpha t$. When it is determined that the difference does not exceed the threshold value $\Delta \alpha t$, the CPU 32 returns to step S10, or when it is determined that the difference exceeds the threshold value $\Delta \alpha t$, the CPU 32 proceeds to step S14. This configuration can be adopted when, for example, it is difficult to make the determination based on the absolute value of the acceleration $\alpha$ because the load transmitted to the side impact-detecting G sensor 20 is low.

(Modification of Two-Stage Load Transmitting Structure)

The above-described embodiment shows an example in which the two-stage load transmitting structure 22 is provided in the side door 24 by disposing the first load transmitting member 28 on the outer side, with respect to the vehicle width direction, of the impact beam 26. The invention, however, is not limited to this embodiment and various modifications may be used as shown in FIGS. 9 to 14, for example.

Figure 9:
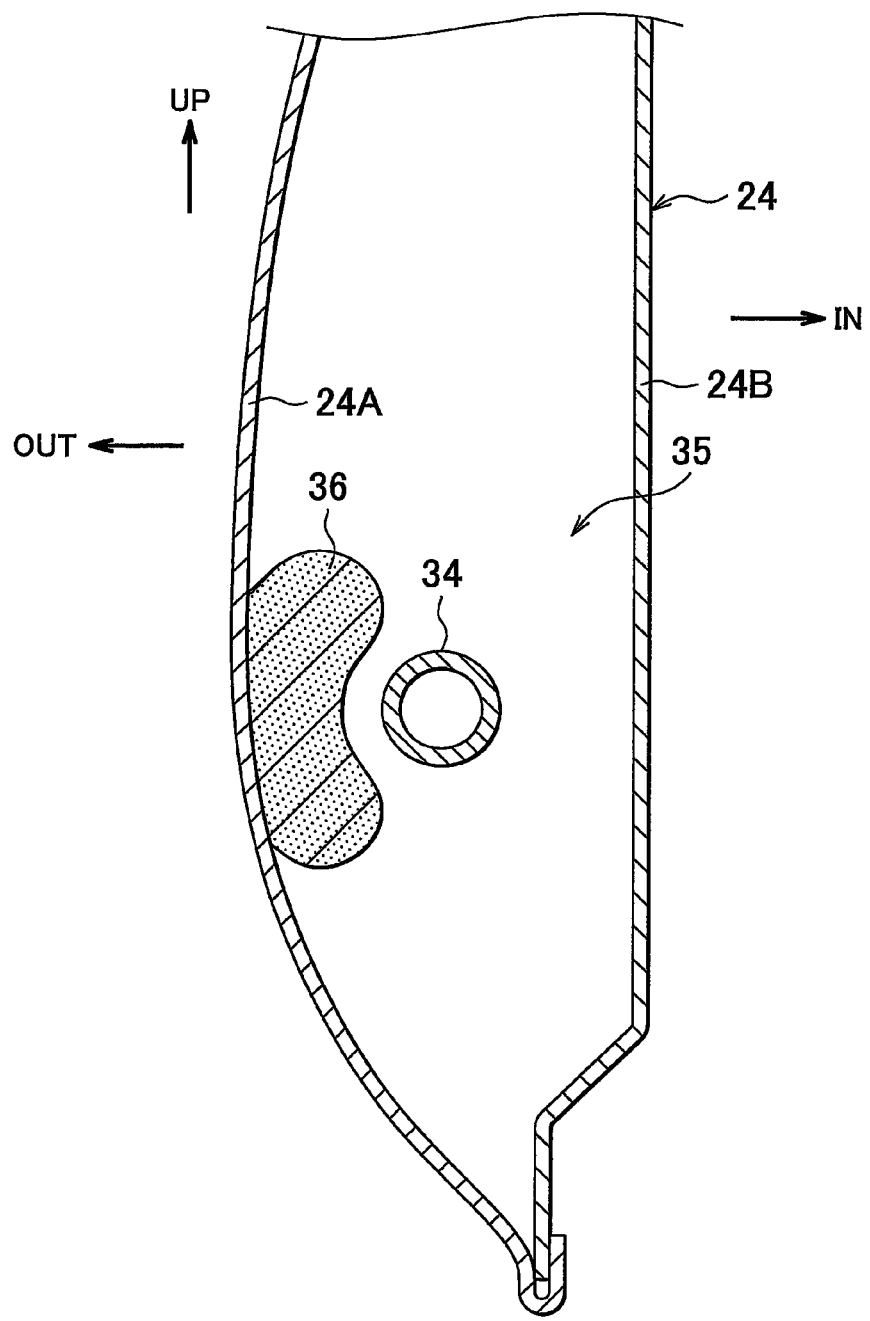
FIG. 9 is a sectional diagram showing a first modification of the two-stage load transmitting structure, which is a constituent element of the side impact detection system according to the first embodiment of the invention.

FIG. 9 shows a two-stage load transmitting structure 35 according to a first modification. The two-stage load transmitting structure 35 includes, as main components, a cylindrical (pipy) impact beam 34, instead of the impact beam 26, and a first load transmitting member 36 made of a foam material or the like and fixed to the outer panel 24A on the outer side, with respect to the vehicle width direction, of the impact beam 34. The two-stage load transmitting structure 35 is configured to effect the two-stage load transmission as shown in FIG. 2A. The side impact detection system 10 provided with the two-stage load transmitting structure 35 also brings about operations and effects similar to those achieved by the side impact detection system 10 provided with the two-stage load transmitting structure 22.

Figure 10:
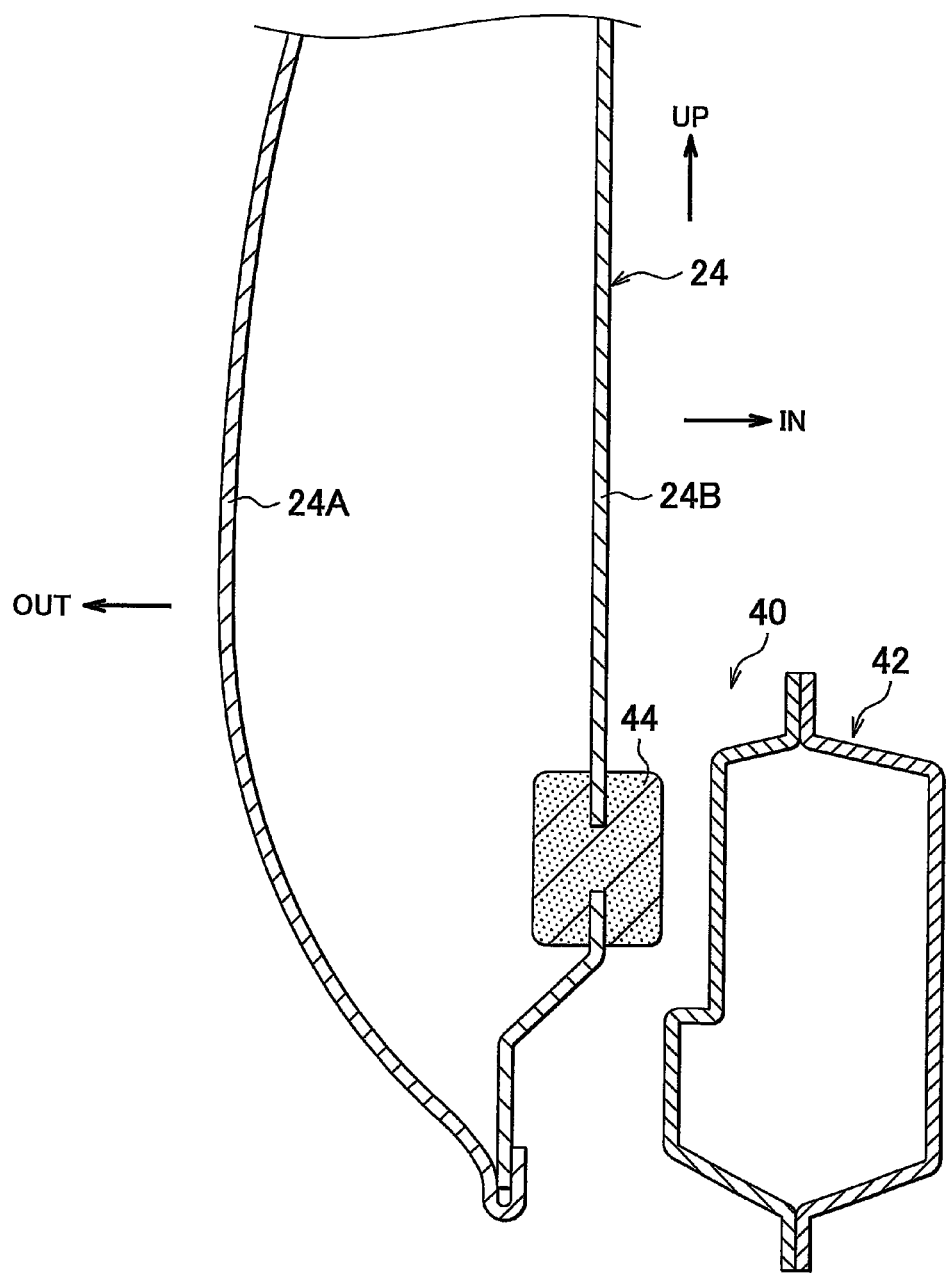
FIG. 10 is a sectional diagram showing a second modification of the two-stage load transmitting structure, which is a constituent element of the side impact detection system according to the first embodiment of the invention.

FIG. 10 shows a two-stage load transmitting structure 40 according to a second modification. The two-stage load transmitting structure 40 is constructed by providing a first load transmitting member 44 in a lower portion of the inner panel 24B, which is a constituent element of the side door 24, in such a manner that the first load transmitting member 44 protrudes on the side facing a rocker 42, which is a vehicle body frame member. The first load transmitting member 44 is a cushioning member (energy absorbing (EA) material) made of a foam material, such as polyurethane foam, for example. The two-stage load transmitting structure 40 is configured so that when a side impact on the side door 24 occurs, load is transmitted from the first load transmitting member 44 through the rocker 42 in the first-stage load transmission, and after the first load transmitting member 44 is compressed and the stroke Sp is consumed, load is directly transmitted from the impact body through the rocker 42 in the second-stage load transmission. The two-stage load transmitting structure 40 according to this modification is configured to effect the two-stage load transmission as shown in FIG. 2A. The side impact detection system 10 provided with the two-stage load transmitting structure 40 also brings about operations and effects similar to those achieved by the side impact detection system 10 provided with the two-stage load transmitting structure 22.

FIG. 11 shows a two-stage load transmitting structure 45 according to a third modification. The two-stage load transmitting structure 45 is formed by the shape of an impact beam 46. Specifically, the impact beam 46 includes: an outer wall 46A facing the outer panel 24A; an upper wall 46B and a lower wall 46C extending inward in the vehicle width direction, from upper and lower edges, with respect to the vehicle, of the outer wall 46A respectively; and a pair of upper and lower flange portions 46D extending in the vertical direction, with respect to the vehicle, from inner edges, with respect to the vehicle width direction, of the upper and lower walls 46B and 46C. The impact beam 46 is fixed to the side door 24 at the upper and lower flange portions 46D. As shown in FIG. 11B, the upper and lower walls 46B and 46C extending in the vehicle width direction, are provided with a plurality of cut-away portions 48 along the longitudinal direction of the impact beam 46. The plurality of cut-away portions 48 are elements of a weakened portion of each of the upper wall 46B and the lower wall 46C. In this modification, the upper and lower flange portions 46D and the part of the upper and lower walls 46B and 46C that are farther inward than the cut-away portions 48 with respect to the vehicle width direction may be regarded as the impact beam body that has the strength and stiffness equivalent to those of the impact beam 26 or the like.

The two-stage load transmitting structure 45 is configured so that when a side impact on the side door 24 occurs, load is transmitted from the outer wall 46A through the upper wall 46B, the lower wall 46C, and the upper and lower flange portions 46D (impact beam body) in the first-stage load transmission, and after the upper and lower walls 46B and 46C buckle at the portions around the cut-away portions 48 and the stroke Sp is consumed, load is directly transmitted from the impact body through the upper and lower flange portions 46D (impact beam body) in the second-stage load transmission. The two-stage load transmitting structure 45 according to this modification is configured to effect the two-stage load transmission as shown in FIG. 2A. The side impact detection system 10 provided with the two-stage load transmitting structure 45 also brings about operations and effects similar to those achieved by the side impact detection system 10 provided with the two-stage load transmitting structure 22.

Figure 12:
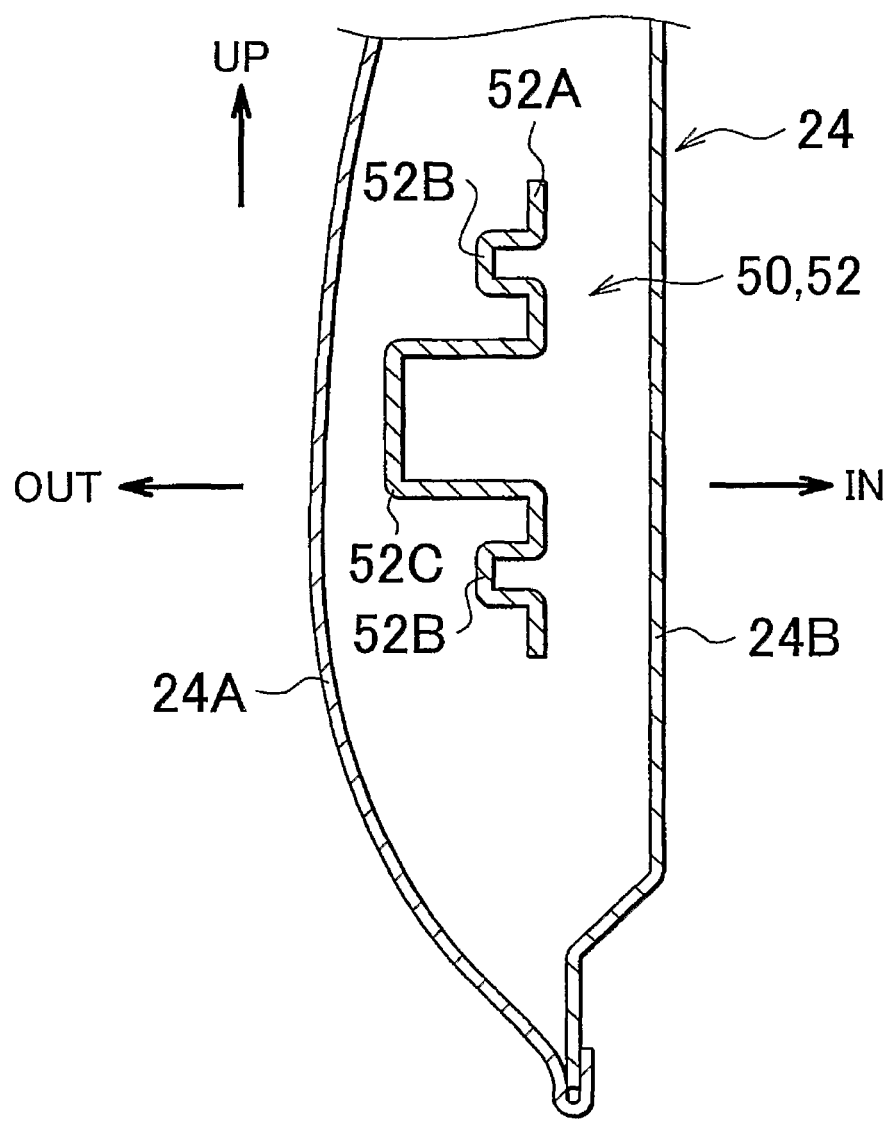
FIG. 12 is a sectional diagram showing a fourth modification of the two-stage load transmitting structure, which is a constituent element of the side impact detection system according to the first embodiment of the invention.

FIG. 12 shows a two-stage load transmitting structure 50 according to a fourth modification. The two-stage load transmitting structure 50 is formed by the shape of an impact beam 52. Specifically, the impact beam 52 is formed so that a pair of upper and lower protrusions 52B protrude outward in the vehicle width direction, from upper and lower edges, with respect to the vehicle, of a base portion 52A that is fixed to the side door 24, and a first load transmitting protrusion 52C protrudes from between the upper and lower protrusions 52B in the base portion 52A to the position farther outward than the protrusions 52B with respect to the vehicle width direction. The base portion 52A is fixed to the side door 24 at the upper and lower end portions of the base portion 52A, and the sections of the base portion 52A between the first load transmitting protrusion 52C and the pair of protrusions 52B are free from the side door 24. In this modification, the base portions 52A and the pair of protrusions 52B may be regarded as the impact beam body that has the strength and stiffness equivalent to those of the impact beam 26 or the like.

The two-stage load transmitting structure 50 is configured so that when a side impact on the side door 24 occurs, load is transmitted from the first load transmitting protrusion 52C through the base portion 52A (impact beam body) in the first-stage load transmission, and after the sections of the base portion 52A between the first load transmitting protrusion 52C and the upper and lower protrusions 52B are stretched and the stroke Sp is consumed, load is directly transmitted from the impact body through the upper and lower protrusions 52B (impact beam body) in the second-stage load transmission. The two-stage load transmitting structure 50 according to this modification is configured to effect the two-stage load transmission as shown in FIG. 2A. The side impact detection system 10 provided with the two-stage load transmitting structure 50 also brings about operations and effects similar to those achieved by the side impact detection system 10 provided with the two-stage load transmitting structure 22.

Figure 13:
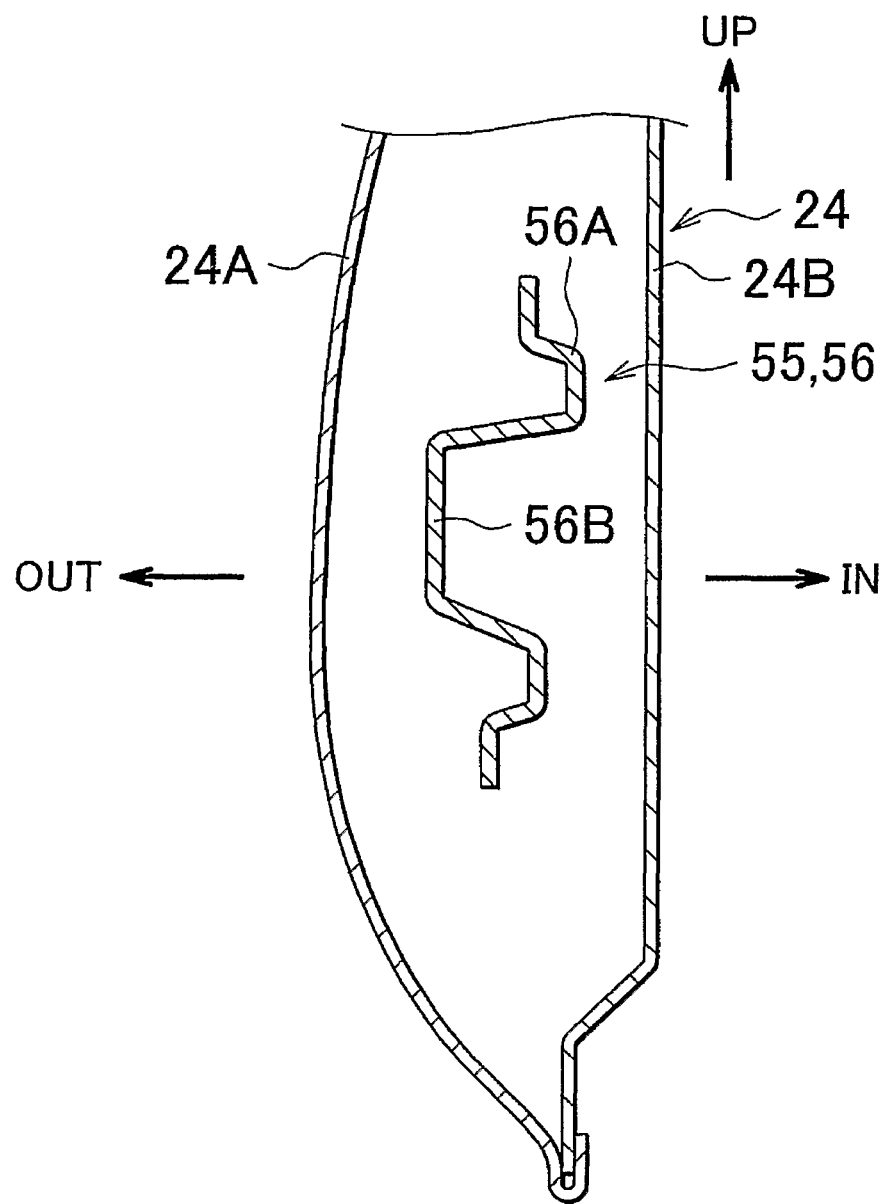
FIG. 13 is a sectional diagram showing a fifth modification of the two-stage load transmitting structure, which is a constituent element of the side impact detection system according to the first embodiment of the invention.

FIG. 13 shows a two-stage load transmitting structure 55 according to a fifth modification. The two-stage load transmitting structure 55 is formed by the shape of an impact beam 56. Specifically, the impact beam 56 is formed so that a first load transmitting protrusion 56B protrudes outward in the vehicle width direction, from a center portion, with respect to the vertical direction of the vehicle, of a base portion 56A that is fixed to the side door 24. The base portion 56A is fixed to the side door 24 at the upper and lower end portions of the base portion 56A, and the sections of the base portion 56A between the first load transmitting protrusion 56B and the portions of the base portion 56A fixed to the side body 24 are free from the side door 24. In this modification, the base portion 56A may be regarded as the impact beam body that has the strength and stiffness equivalent to those of the impact beam 26 or the like.

The two-stage load transmitting structure 55 is configured so that when a side impact on the side door 24 occurs, load is transmitted from the first load transmitting protrusion 56B through the base portion 56A (impact beam body) in the first-stage load transmission, and after the sections of the base portion 56A between the first load transmitting protrusion 56B and the portions of the base portion 56A fixed to the side body 24 are stretched and the stroke Sp is consumed, load is directly transmitted from the impact body through the base portion 56A (impact beam body) in the second-stage load transmission. The two-stage load transmitting structure 55 according to this modification is configured to effect the two-stage load transmission as shown in FIG. 2A. The side impact detection system 10 provided with the two-stage load transmitting structure 55 also brings about operations and effects similar to those achieved by the side impact detection system 10 provided with the two-stage load transmitting structure 22.

Figure 14:
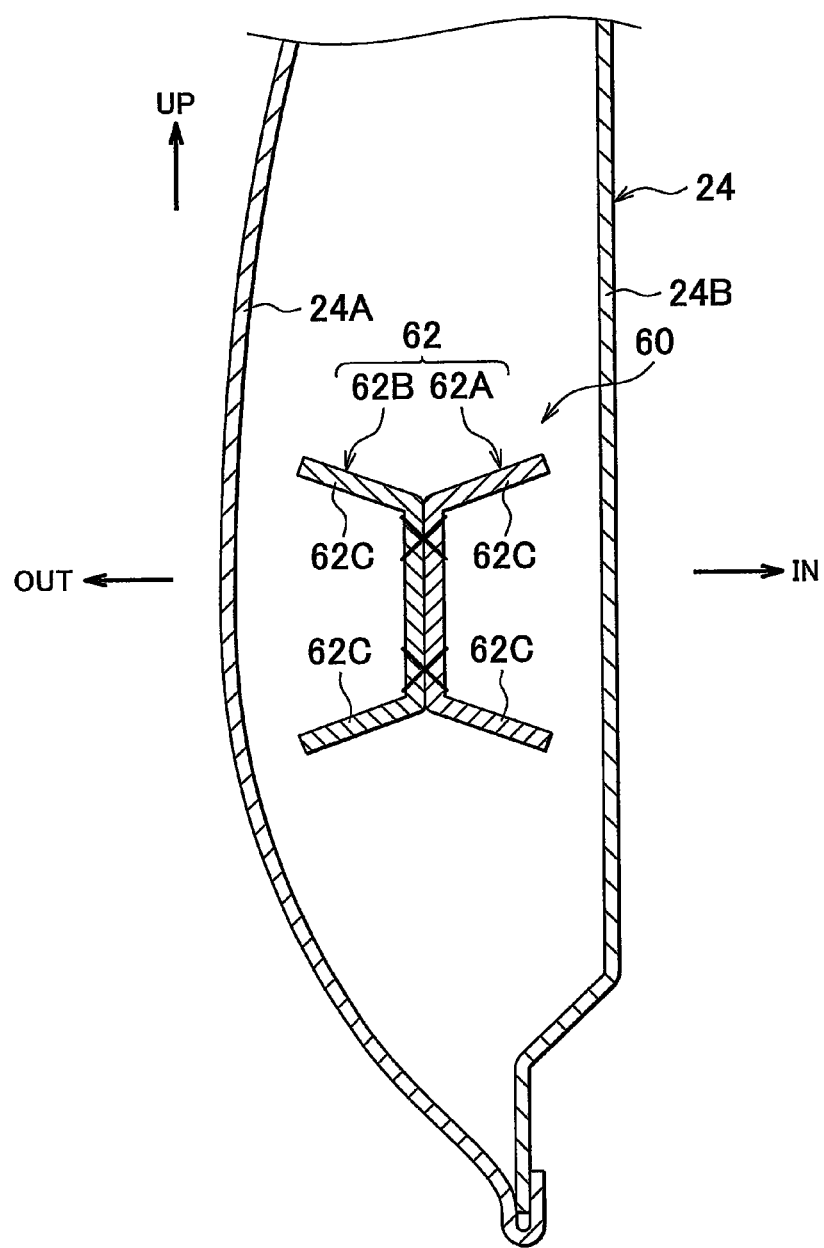
FIG. 14 is a sectional diagram showing a sixth modification of the two-stage load transmitting structure, which is a constituent element of the side impact detection system according to the first embodiment of the invention.

FIG. 14 shows a two-stage load transmitting structure 60 according to a sixth modification. The two-stage load transmitting structure 60 is formed by the shape (structure) of an impact beam 62. Specifically, the impact beam 62 is formed by joining an inner beam 62A, which has a shape whose cross section opens inward in the vehicle width direction, and an outer beam 62B, which has a shape whose cross section opens outward in the vehicle width direction. The inner beam 62A is formed so that the opening width increases toward the inner side in the vehicle width direction. At the same time, the inner beam 62A is supported so as to be able to transmit load to the side door 24 (or to the vehicle body through the side door 24) at the open edges on the inner side with respect to the vehicle width direction. The outer beam 62B is formed so that the opening width increases toward the outer side in the vehicle width direction. Thus, respective inclined walls 62C, extending in the vehicle width direction, of the inner beam 62A and the outer beam 62B function as plate springs, and the impact beam 62 has strength and stiffness equivalent to the impact beam 26 or the like when the impact beam 62 is deformed enough that the inclined walls 62C are aligned with the vertical direction.

The two-stage load transmitting structure 60 is configured so that when a side impact on the side door 24 occurs, load is soft-elastically transmitted to the side door 24 while the inclined walls 62C of the inner beam 62A and the outer beam 62B are deformed to be increased in vertical distance therebetween in the first-stage load transmission, and after the stroke Sp is consumed through the deformation, load is hard-elastically (rigidly) transmitted from the impact body through the impact beam 62 after the deformation, in the second-stage load transmission. The two-stage load transmitting structure 60 according to this modification is configured to effect the two-stage load transmission as shown in FIG. 2B. The side impact detection system 10 provided with the two-stage load transmitting structure 60 also brings about operations and effects similar to those achieved by the side impact detection system 10 provided with the two-stage load transmitting structure 22.

Although description is omitted, for the two-stage load transmitting structure, which serves as a load transmitting structure according to the invention, various configurations other than those described above may be adopted.

Next, other embodiments of the invention will be described. Parts and portions basically the same as those of the above first embodiment or other configurations described above are designated by the same reference numerals as those of the above first embodiment or other configurations described above, and description thereof is omitted.

(Second Embodiment)

Figure 20:
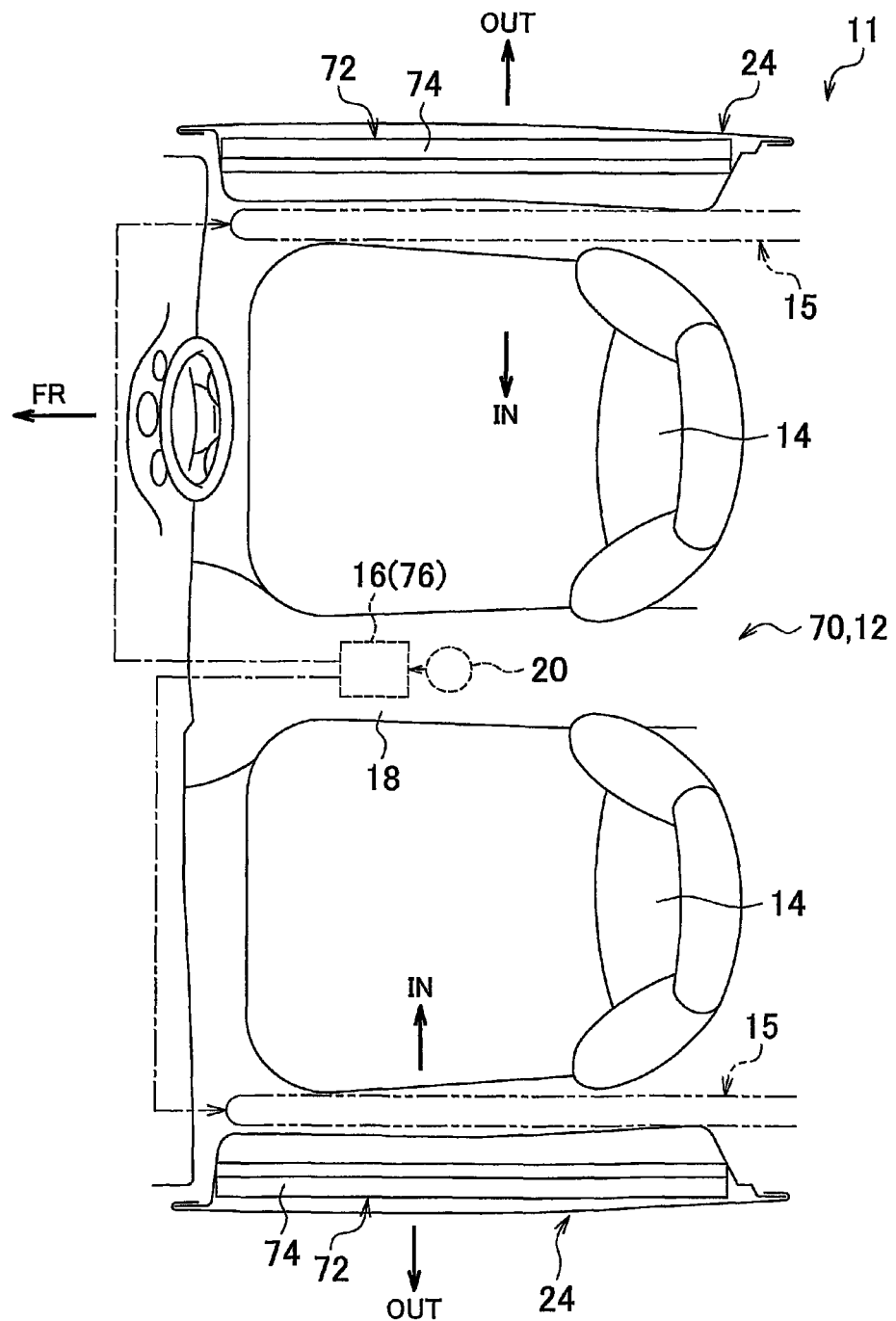
FIG. 20 is a plan view schematically showing part of an automobile to which an anti-side impact occupant protection system according to the second embodiment of the invention is applied.

FIG. 20 shows a front portion of an automobile 11 in which a side impact detection system 70 according to a second embodiment of the invention is used, in a schematic plan view. As shown in this figure, the side impact detection system 70 differs from the side impact detection system 10 in that the side impact detection system 70 includes a two-stage load transmitting structure 72, which serves as the load transmitting structure, instead of the two-stage load transmitting structure 22.

Figure 17A:
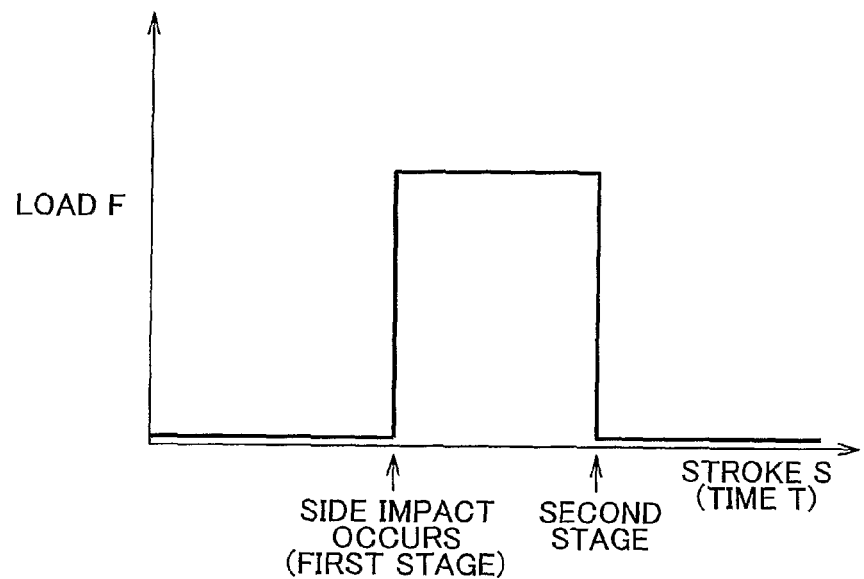
FIG. 17A is a diagram showing a first mode of load transfer characteristic of the two-stage load transmitting structure, which is a constituent element of the side impact detection system according to the second embodiment of the invention.
Figure 17B:
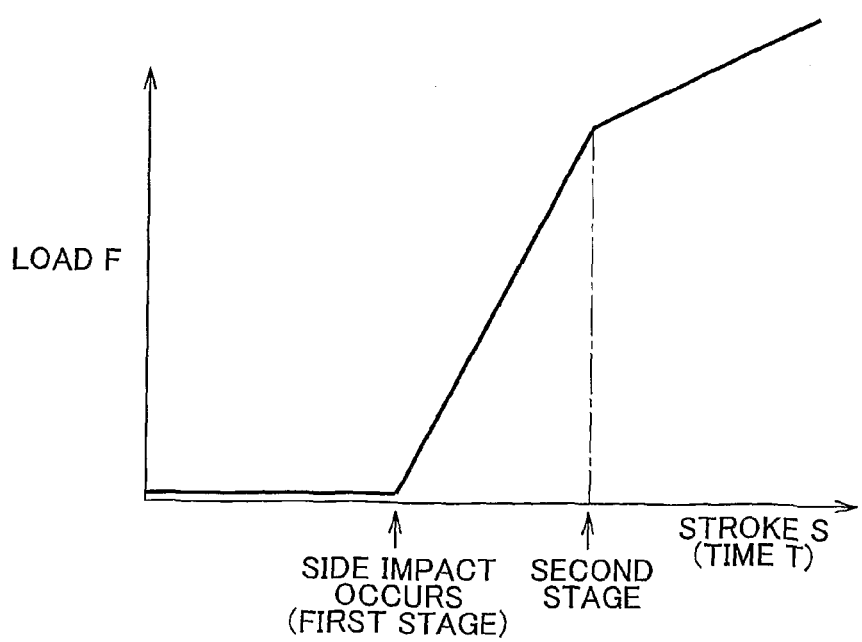
FIG. 17B is a diagram showing a second mode of the load transfer characteristic of the two-stage load transmitting structure, which is a constituent element of the side impact detection system according to the second embodiment of the invention.

The side impact detection system 72 transmits, in two stages, load caused by a side impact to the side impact-detecting G sensor 20 disposed in the floor tunnel 18. The two-stage load transmitting structure 72 according to the second embodiment may be configured so that, as shown in FIG. 17A, the first-stage load rises upon a side impact and then the second-stage load drops, or as shown in FIG. 17B, the first-stage load increases after a side impact and then the rate of change in the load is reduced in the second-stage input. A specific description will be given below.

As shown in FIG. 15A, the two-stage load transmitting structure 72 is formed by the shape (structure) of an impact beam 74 of the side door 24. The impact beam 74 includes: an outer wall 74A positioned at the outer end with respect to the vehicle width direction; a pair of upper and lower inclined walls 74B extending from respective upper and lower edges, with respect to the vehicle, of the outer wall 74A, the pair of upper and lower inclined walls inclined so that the distance between the upper and lower inclined walls increases inward in the vehicle width direction; a pair of inner walls 74C extending from respective inner edges, with respect to the vehicle width direction, of the pair of inclined walls 74B, on the sides close to or facing each other, along the vertical direction of the vehicle; and a pair of flanges 74D extending, from respective ends of the pair of inner walls 74C, inward in the vehicle width direction and joined together. The impact beam 74 is supported so as to transmit load to the side door 24 (or to the vehicle body through the side door 24) at the pair of the inner walls 74C. The pair of flanges 74D are joined by spot welding or the like so that the joint is released (disconnected) as shown in FIG. 15B when a predetermined load is applied in the vertical direction with respect to the vehicle.

Figure 16A:
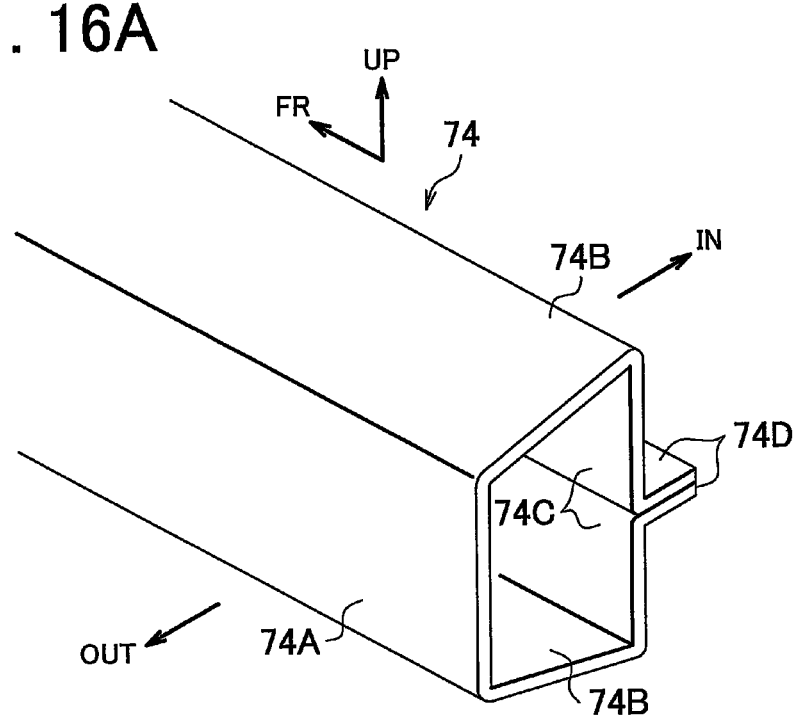
FIG. 16A is a perspective view showing an impact beam, which is a constituent element of the side impact detection system according to the second embodiment of the invention, before a side impact.
Figure 16B:
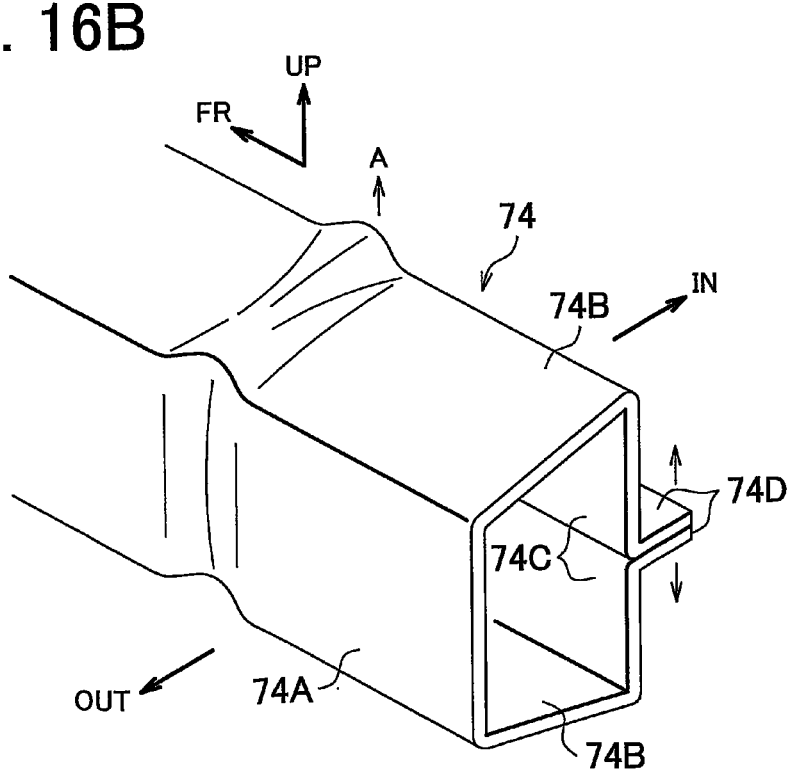
FIG. 16B is a perspective view showing an impact beam, which is a constituent element of the side impact detection system according to the second embodiment of the invention, at the time of the side impact.

The two-stage load transmitting structure 72 is configured so that when a side impact on the side door 24 occurs, load is transmitted to the vehicle body through the impact beam 74, which is a structure with a closed cross section shown also in FIG. 16A, and when the pair of inclined walls 74B are deformed to be increased in distance between the inner edges thereof with respect to the vehicle width direction as shown in FIG. 16B by the load applied to the outer wall 74A inward in the vehicle width direction and the joint between the pair of flanges 74D is disconnected as shown in FIG. 15B, load is transmitted to the vehicle body through the impact beam 74, which is a structure with a closed cross section, in the second-stage load transmission. The two-stage load transmitting structure 72 is configured to effect the two-stage load transmission as shown in FIG. 17B. FIG. 16B illustrates the case of a side impact with a pole.

In the side impact detection system 70, the material for the two-stage load transmitting structure 72, the dimensions thereof, the shape thereof, etc. are determined depending on the transfer characteristic H of the vehicle body of the automobile 11 or the characteristics of the low-pass filter 30 that is a constituent element of the controller 16 so that, when a side impact at a predetermined impact speed Vp occurs, there is a predetermined time lag $\Delta T/2$ ($\approx 2.5$ (msec)) between when the first-stage load increase starts and when the second-stage reduction in the rate of change in load starts (the disconnection of the joint between the pair of flanges 74D).

Thus, the side impact detection system 70 is set so that, when a side impact at the impact speed Vp occurs, there is a phase difference corresponding to half a cycle of the vibration, between the acceleration caused by the first-stage load transmission and the acceleration caused by the second-stage load transmission. Specifically, the side impact detection system 70 is designed so that the first local minimum peak, or trough, of the acceleration caused by the second-stage load transmission (reduction in the rate of change in load) substantially coincides with the first local minimum peak, or trough, of the acceleration caused by the first-stage load transmission (increase in the load). In this way, in the side impact detection system 70, the first local minimum peak P3 of the acceleration $\alpha$ swings to the negative side as shown in FIG. 18.

In the side impact detection system 70, a CPU 76 (see FIG. 20) provided instead of the CPU 32 is a constituent element of the controller 16. In the CPU 76, a negative acceleration is set as a threshold value $\alpha t$. Thus, in the CPU 76, it is the necessary condition for detection of the occurrence of a side impact that the CPU 76 receives from the side impact-detecting G sensor 20 a signal corresponding to the fact that the acceleration $\alpha$ falls below the threshold value $\alpha t$ (the absolute value of the acceleration $\alpha$ exceeds the absolute value of the threshold value $\alpha t$ on the negative side). Hereinafter, the comparison between a negative acceleration $\alpha$ and the threshold value $\alpha t$ is the comparison between the absolute values thereof, and the description will be made simply in the following form, for example: "the acceleration $\alpha$ exceeds the threshold value $\alpha t$."

In the CPU 76, in addition to the condition that the acceleration $\alpha$ exceeds the threshold value $\alpha t$, the condition that the time from when the impact force is input to when the acceleration $\alpha$ exceeds the threshold value $\alpha t$ is within the predetermined time is a sufficient condition for detection of the occurrence of a side impact. Specifically, the side impact detection system 70 with $\Delta T \approx 5$ msec as described above, is configured so that, for example, when time T that elapses from when the impact force is input to when the acceleration $\alpha$ exceeds the threshold value $\alpha t$ exceeds a reference time Tt (7.5 msec in this embodiment), it is determined that the acceleration is caused by another reason than a conceivable side impact and the side impact air bag system 15 is not activated, in consideration of the fact that the time from when an impact occurs to when the first local minimum peak P3 occurs is approximately 5 msec. A condition that an occupant sits on the seat 14, for example, may be added to the necessary condition for activating the side impact air bag system 15.

Figure 19:
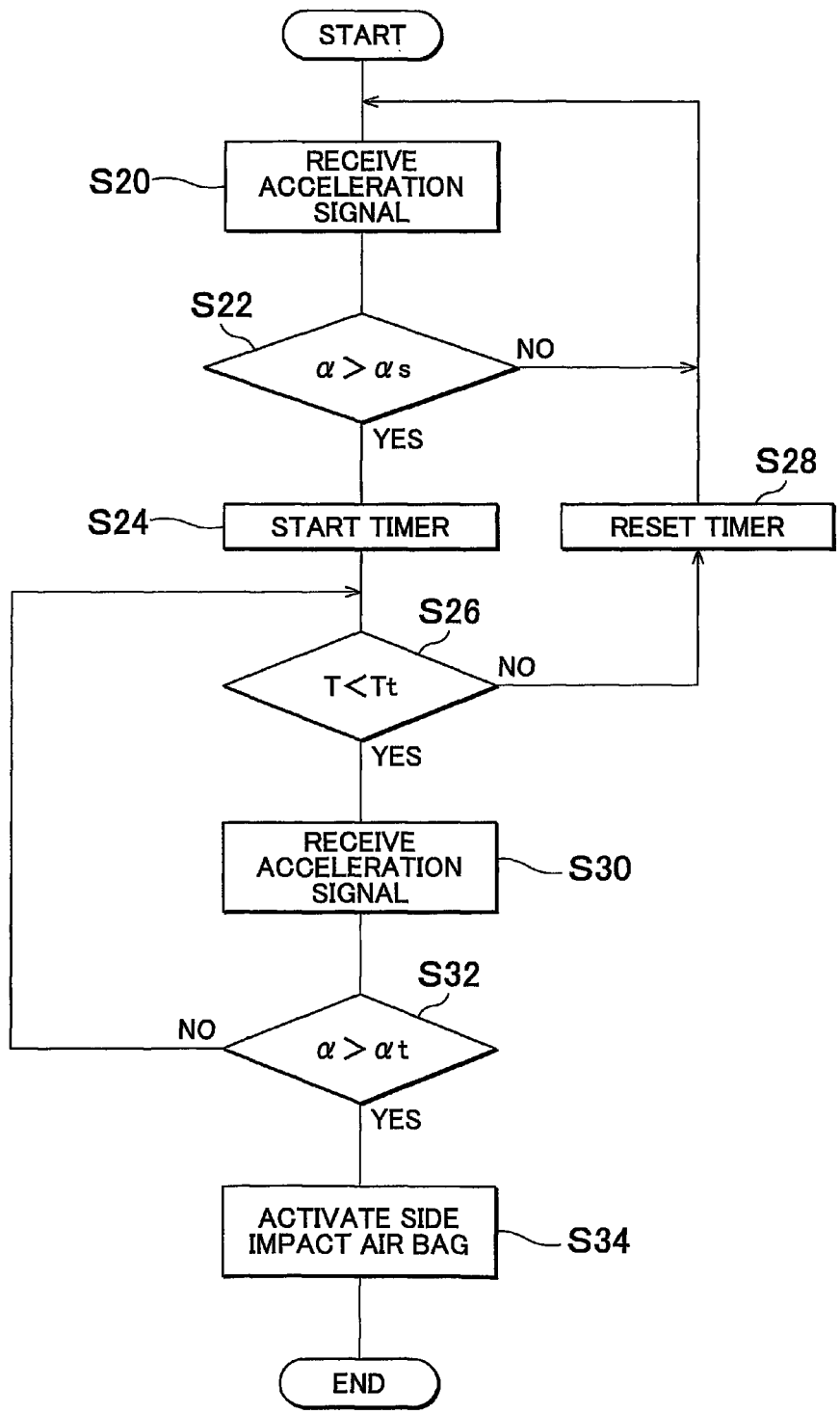
FIG. 19 is a flow chart showing a modification of the process flow of control performed by a controller, which is a constituent element of the side impact detection system according to the second embodiment of the invention.

Next, operations of the second embodiment will be described with reference to a flow chart shown in FIG. 19.

In the side impact detection system 70 configured as described above, the CPU 76 reads in a signal from the side impact-detecting G sensor 20 in step S20 and proceeds to step S22. In step S22, based on the signal from the side impact-detecting G sensor 20, the CPU 76 determines whether there has been an input of an impact force (first-stage input). Specifically, a threshold value of the input impact force is as (see FIG. 18), and when the acceleration $\alpha$ corresponding to the signal from the side impact-detecting G sensor 20 exceeds the threshold value $\alpha s$ ($\alpha > \alpha s$), it is determined that there has been an input of an impact force. When the CPU 76 determines that there is no input of an impact force, the CPU 76 returns to step S20, and when it is determined that there has been an input of an impact force, the CPU 76 proceeds to step S24 to start a built-in timer.

Then, the CPU 76 proceeds to step S26 to determine whether an elapsed time T that has elapsed since the input of the impact force is longer than the reference time Tt. When it is determined that the elapsed time T is longer than the reference time Tt, the CPU 76 resets the timer in step S28 and returns to step S20. On the other hand, when it is determined in step S26 that the elapsed time T that elapses since the input of an impact force is not longer than the reference time Tt, the CPU 76 proceeds to step S30 to read in the signal from the side impact-detecting G sensor 20.

Next, the CPU 76 proceeds to step S32 to determine whether the acceleration a corresponding to the signal from the side impact-detecting G sensor 20 exceeds the threshold value $\alpha t$. When the CPU 76 determines that the acceleration $\alpha$ does not exceed the threshold value $\alpha t$, the CPU 76 returns to step S26. On the other hand, when the CPU 76 determines that the acceleration $\alpha$ exceeds the threshold value $\alpha t$, the CPU 76 proceeds to step S34 to activate the side impact air bag system 15. Specifically, when the CPU 76 determines that a side impact has occurred, the CPU 76 activates the side impact air bag system 15. In this way, an occupant(s) of the automobile 11 is protected against a side impact.

Because the side impact detection system 10 includes the two-stage load transmitting structure 72, when a side impact at a speed near the set impact speed Vp occurs, the acceleration $\alpha$ detected by the side impact-detecting G sensor 20 exhibits a negative acceleration as shown in FIG. 18. It is possible to detect a side impact (the side impact for which the side impact air bag system 15 should be activated) based on whether the acceleration $\alpha$ exceeds the threshold value $\alpha t$ on the negative side.

As described in connection with the first embodiment, the time T during which load caused by closing the side door 24 is applied is $T \approx 28$ msec, and this can be regarded as a single stage load input. Even when a time period occurs during which the acceleration $\alpha$ is negative (exceeds the threshold value $\alpha t$) due to the load that drops after $T \approx 28$ msec has elapsed, such a time period occurs after the reference time Tt has elapsed, and therefore, the side impact detection system 70 does not erroneously detect this load as a side impact. Similarly, in the case where a side impact at such a low speed that the activation of the side impact air bag device 15 is not required, that is, a light impact occurs, even when a time period occurs during which the acceleration $\alpha$ is negative due to the superposition of the second-stage acceleration, such a time period occurs after the reference time Tt has elapsed, and therefore, the side impact air bag system 15 is not activated. In other words, the side impact detection system 70 can differentiate a light impact.

As described above, the side impact detection system 70 is provided with the two-stage load transmitting structure 72 that transmits only the load caused by a side impact to the side impact-detecting G sensor 20 in two stages having the time lag $\Delta T/2$, so that the acceleration $\alpha$ that acts on the side impact-detecting G sensor 20 does not exceed the threshold value $\alpha t$ in the case of a simple, one stage load input, such as that caused by closing a door, and it is possible to selectively detect a side impact. Specifically, the side impact detection system 70 can distinguish, or differentiate, a side impact on laterally one side of the vehicle from door closing or the like with the use of a single side impact-detecting G sensor 20.

Specifically, in the side impact detection system 70, the two-stage load transmitting structure 72 is designed so that the first local minimum peak of the acceleration caused by the second-stage load transmission (reduction in the rate of change in load) substantially coincides with the first local minimum peak of the acceleration caused by the first-stage load transmission (increase in the load), so that it is possible to detect a side impact in a shorter time as compared to the side impact detection system 10 by half a cycle (approximately 2.5 msec).

(Modification of Two-Stage Load Transmitting Structure)

The above-described second embodiment shows an example in which the two-stage load transmitting structure 72 is provided in the side door 24 by making the impact beam 74 have a structure such that the impact beam 74 is changed from the structure with a closed cross section into a structure with an open cross section by a predetermined load. The invention, however, is not limited to this embodiment, and various modifications may be used as shown in FIGS. 21 to 23, for example.

FIG. 21A shows a two-stage load transmitting structure 80 according to a first modification. The two-stage load transmitting structure 80 is formed by the shape (structure) of an impact beam 82 of the side door 24. The impact beam 82 is a structure with a closed cross section formed by an inner panel 82A fixed to the side door 24 at the inner side with respect to the vehicle width direction, and an outer panel 82B joined with the inner panel 82A. In this embodiment, the flange of the outer panel 82B that is formed to have a substantially hat-shaped cross section that opens inward with respect to the vehicle width direction is joined with the flat inner panel 82A, whereby the closed cross section is formed. The impact beam 82 has an inner wall 82C extending, near the centroid (not shown) of the cross section of the impact beam 82, along vertical direction with respect to the vehicle.

In the two-stage load transmitting structure 80, when a side impact on the side door 24 occurs, as shown in FIG. 21B, load is transmitted to the vehicle body through the impact beam 82, which is a structure with a closed cross section formed by the inner panel 82A and the outer panel 82B, in the first-stage load transmission. When this occurs, a tensile load due to a bend of the impact beam 82 is applied to the inner panel 82A, and a compression load due to the bend of the impact beam 82 is mainly applied to an outer portion, with respect to the vehicle width direction, of the outer panel 82B. When outer part, with respect to the vehicle width direction, of a pair of upper and lower horizontal walls 82D, extending in the vehicle width direction, of the outer panel 82B that receives the compression load buckle as shown in FIG. 21C, load is transmitted by a structure with a closed cross section, which is formed by the inner panel 82A, inner portions, with respect to the vehicle width direction, of the pair of horizontal walls 82D, and the inner wall 82C, in the second-stage load transmission. When this occurs, the cross section (section module) is reduced as compared to that of the original structure with the closed cross section and therefore, the transmitted load is reduced. The two-stage load transmitting structure 80 according to this modification is configured to effect the two-stage load transmission as shown in FIG. 17B. The side impact detection system 70 provided with the two-stage load transmitting structure 80 also brings about operations and effects similar to those achieved by the side impact detection system 70 provided with the two-stage load transmitting structure 72.

Figure 22:
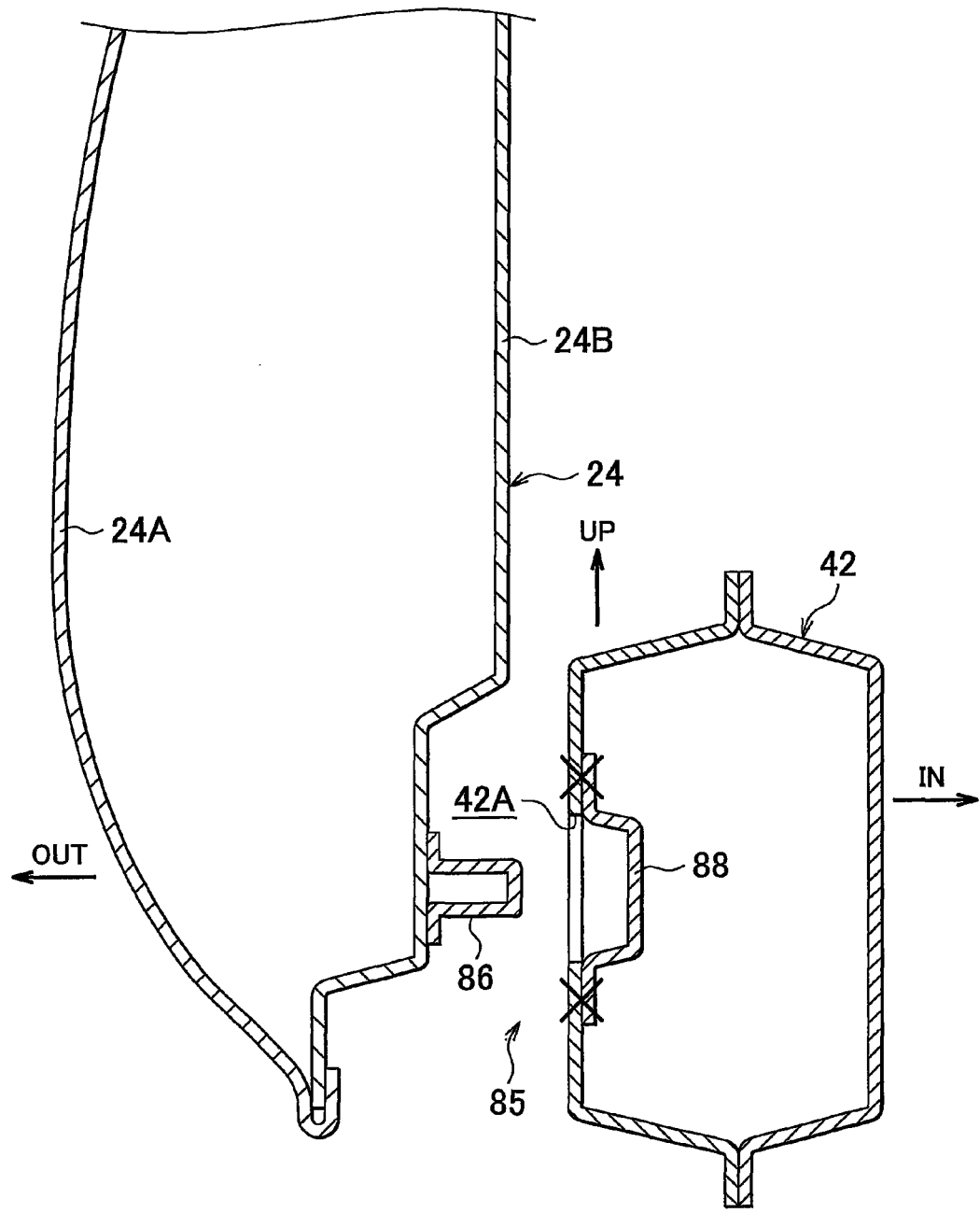
FIG. 22 is a sectional diagram showing a second modification of the two-stage load transmitting structure, which is a constituent element of the side impact detection system according to the second embodiment of the invention.
Figure 23:
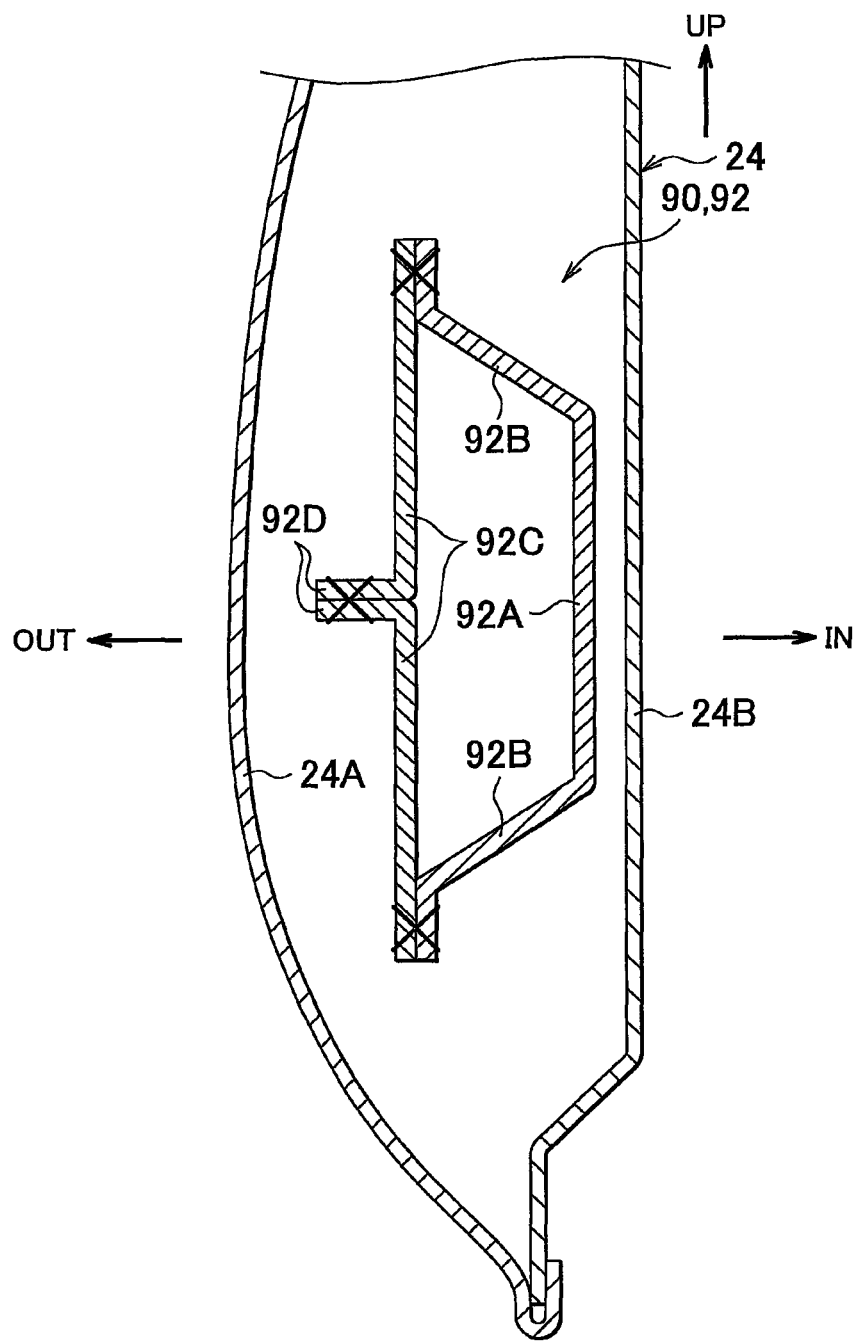
FIG. 23 is a sectional diagram showing a third modification of the two-stage load transmitting structure, which is a constituent element of the side impact detection system according to the second embodiment of the invention.

FIG. 22 shows a two-stage load transmitting structure 85 according to a second modification. The two-stage load transmitting structure 85 includes: a protrusion 86 provided on a lower end portion of the inner panel 24B, which is a constituent element of the side door 24, so as to protrude toward the rocker 42; and a receiving plate 88 joined with the rocker 42 so as to close a cut-out hole 42A formed in the rocker 42. The receiving plate 88 is designed so that the joint between the receiving plate 88 and the rocker 42 is released (disconnected) by a load higher than a predetermined value. In the two-stage load transmitting structure 85, when a side impact on the side door 24 occurs, load is transmitted from the side door 24 through the protrusion 86, the receiving plate 88, and the rocker 42 in the first-stage load transmission, and, when the joint between the receiving plate 88 and the rocker 42 is disconnected, the load drops, which serves as the second-stage load transmission. The two-stage load transmitting structure 85 according to this modification is configured to effect the two-stage load transmission as shown in FIG. 17A. The side impact detection system 70 provided with the two-stage load transmitting structure 80 also brings about operations and effects similar to those achieved by the side impact detection system 70 provided with the two-stage load transmitting structure 72.

FIG. 23 shows a two-stage load transmitting structure 90 according to a third modification. As shown in this figure, the two-stage load transmitting structure 90 includes, as a main part, an impact beam 92 that is substantially inverse to the impact beam 74 in the lateral direction.

Specifically, the impact beam 92 is a structure with a closed cross section having: an inner wall 92A; a pair of upper and lower inclined walls 92B obliquely extending outward from upper and lower edges, with respect to the vehicle, of the inner wall 92A so that the vertical distance between the inclined walls 92B increases toward the outer side in the vehicle width direction; a pair of outer walls 92C extending from outer edges, with respect to the vehicle width direction, of the pair of inclined walls 92B, on the sides close to or facing each other, along the vertical direction with respect to the vehicle; and a pair of flanges 92D extending from respective ends of the pair of outer walls 92C inward in the vehicle width direction and joined together. The impact beam 92 is supported so that load is transmitted to the side door 24 (or to the vehicle body through the side door 24) at the inner wall 92A. The pair of flanges 92D are joined with each other by spot welding or the like so that the joint is released (disconnected) when a predetermined load is applied in the vertical direction with respect to the vehicle. In the impact beam 92 according to the modification, the pair of inclined walls 92B are joined with the respective corresponding outer walls 92C, and the joints between the inclined walls 92B and the outer walls 92C are stronger than the joint between the pair of flanges 92D against the load applied in the vertical direction with respect to the vehicle at the time of a side impact. Each of the pair of inclined walls 92B and the corresponding outer wall 92C may be integrally formed as in the case of the two-stage load transmitting structure 72.

The two-stage load transmitting structure 90 is configured so that when a side impact on the side door 24 occurs, load is transmitted to the vehicle body through the impact beam 92, which is a structure with a closed cross section, and when the pair of inclined walls 92B are deformed to be increased in distance between the outer edges thereof with respect to the vehicle width direction and the joint between the pair of flanges 92D are disconnected by the load applied to the pair of outer walls 92C inward with respect to the vehicle width direction, load is transmitted to the vehicle body through the impact beam 92, which is a structure with a closed cross section, in the second-stage load transmission. The two-stage load transmitting structure 80 according to this modification is configured to effect the two-stage load transmission as shown in FIG. 17B. The side impact detection system 70 provided with the two-stage load transmitting structure 90 also brings about operations and effects similar to those achieved by the side impact detection system 70 provided with the two-stage load transmitting structure 72.

Although not explained, various configurations other than those described above may be adopted as the two-stage load transmitting structure, which functions as the load transmitting structure according to the invention.

Third Embodiment

Figure 24:
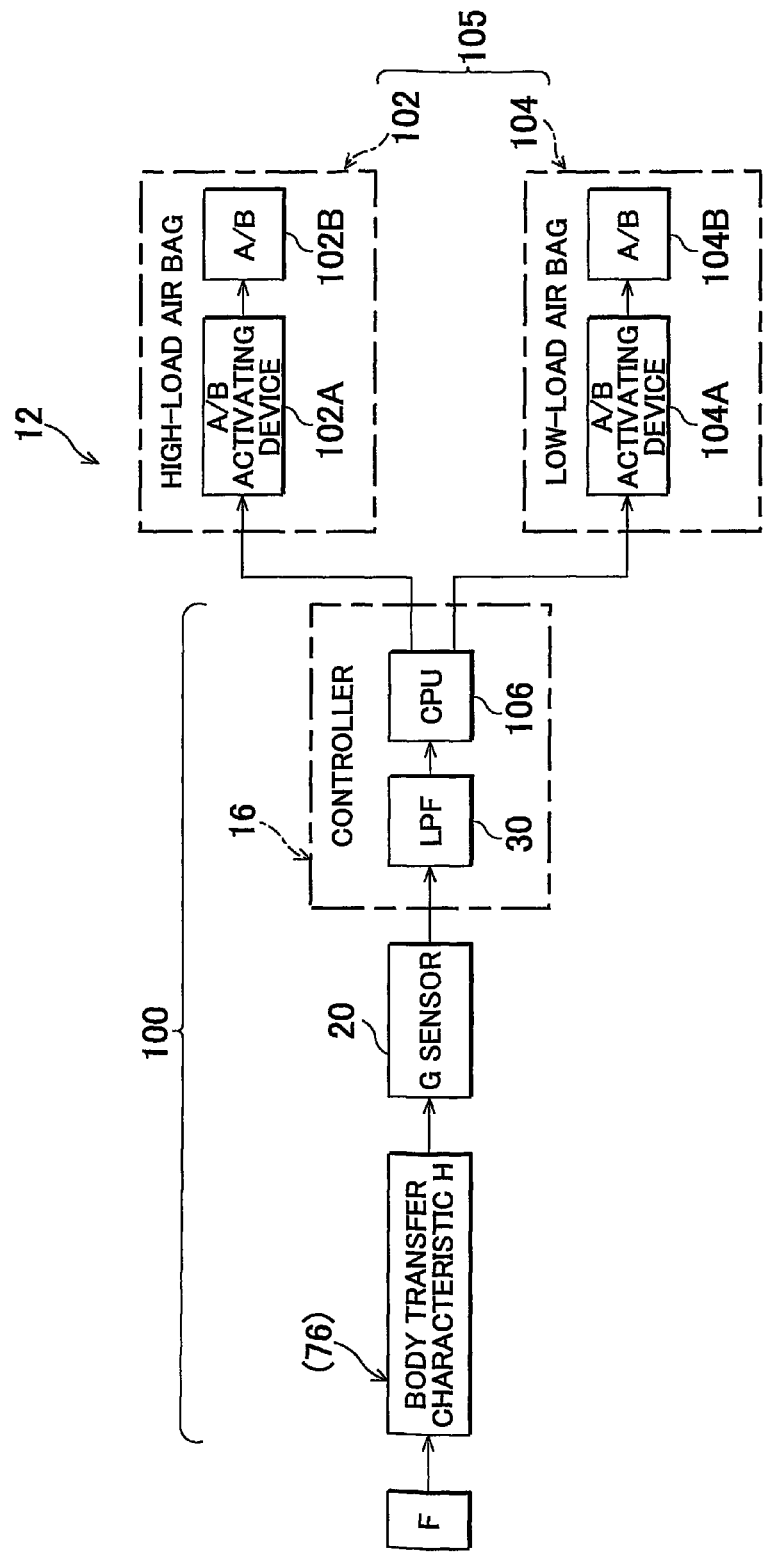
FIG. 24 is a block diagram showing an anti-side impact occupant protection system to which a side impact detection system according to a third embodiment of the invention is applied.

FIG. 24 shows a side impact detection system 100 and an anti-side impact occupant protection system 12, for protecting an occupant(s), including the side impact detection system 100 according to a third embodiment of the invention, in a block diagram corresponding to FIG. 3. As shown in FIG. 24, the side impact detection system 100 differs from the side impact detection system 70 according to the second embodiment in that the side impact detection system 100 includes: a side impact air bag device 105, which functions as the occupant protection device, having a high-load air bag device 102 and a low-load air bag device 104; and a CPU 106 which functions as the impact determination section and the controller, instead of the side air bag device 15 and the CPU 32. Specifically, although not shown in the figures, the side impact detection system 100 includes the two-stage load transmitting structure 72 or one of the two-stage load transmitting structures 80, 85, and 90 according to the modifications, as the load transmitting structure of the invention.

The high-load air bag device 102 of the side impact air bag system 105 is designed to effectively protect an occupant(s) when a side impact at a relatively high speed occurs. The low-load air bag device 104 is designed to effectively protect an occupant(s) when a side impact at a relatively low speed occurs. For example, the high-load air bag device 102 and the low-load air bag device 104 may be such that inflators 102A and 104A, and air bags 102B and 104B are both separately provided as shown in FIG. 24. Alternatively, the high-load air bag device 102 and the low-load air bag device 104 may be such that there is a common air bag for high-load use and low-load use (one of the air bags 102B and 104B) and the inflators 102A and 104A for high-load use and low-load use, respectively, are separately provided.

The CPU 106 is configured to determine the occurrence of a side impact (whether one of the high-load air bag device 102 and the low-load air bag device 104 should be activated) and the mode of the side impact (whether the impact speed requires the activation of the high-load air bag device 102 or the activation of the low-load air bag device 104). A specific description will be given below.

Figure 26:
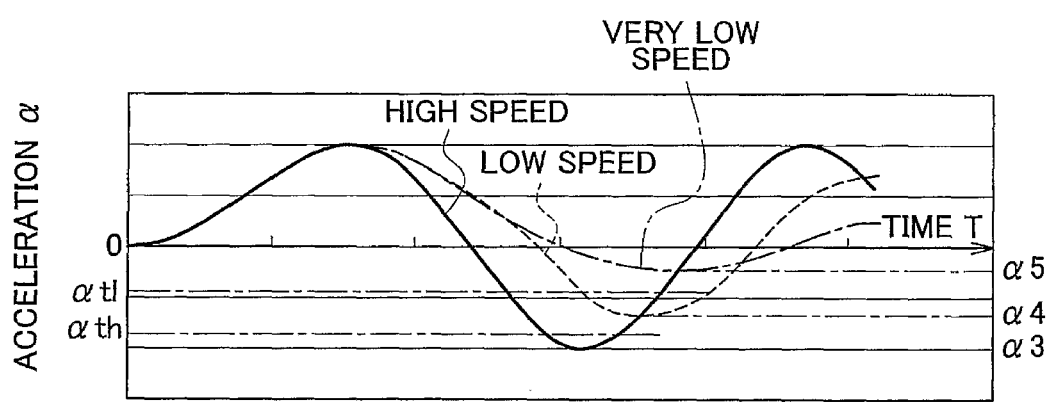
FIG. 26 is a diagram showing a relation between impact speed and acceleration detected by a side impact-detecting G sensor in the side impact detection system according to the third embodiment of the invention.

In the CPU 106, as shown in FIG. 26, a plurality of threshold values at are set. Specifically, a threshold value $\alpha$th used for determining whether the high-load air bag device 102 should be activated and a threshold value $\alpha$tl used for determining whether the low-load air bag device 104 should be activated are set. The threshold values $\alpha$th and $\alpha$tl are both negative acceleration, and $\alpha$th<$\alpha$tl. In other words, the absolute value of the threshold value $\alpha$th is greater than the absolute value of the threshold value $\alpha$tl. In the following explanation, with regard to the comparison between the acceleration $\alpha$, the threshold values $\alpha$th and $\alpha$tl, the absolute values thereof are compared and the description will be made simply in the following form, for example: "the acceleration $\alpha$ exceeds the threshold value $\alpha$th".

Figure 27A:
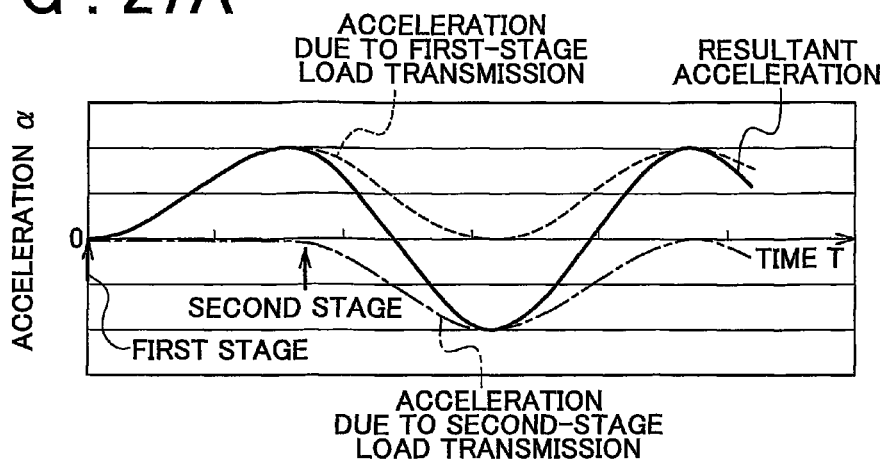
FIG. 27A is a diagram showing acceleration detected by the side impact-detecting G sensor, depending on the impact speed, in the side impact detection system according to the third embodiment of the invention in the case of a high speed impact.
Figure 27B:
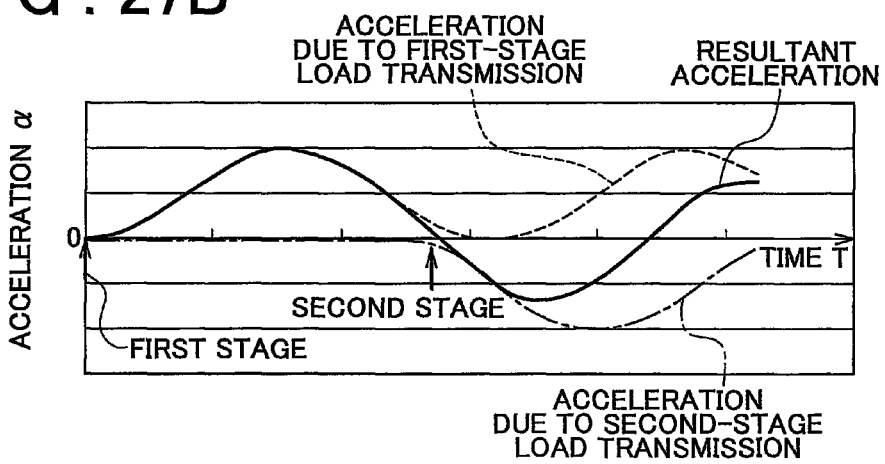
FIG. 27B is a diagram showing acceleration detected by the side impact-detecting G sensor, depending on the impact speed, in the side impact detection system according to the third embodiment of the invention in the case of a low speed impact.
Figure 27C:
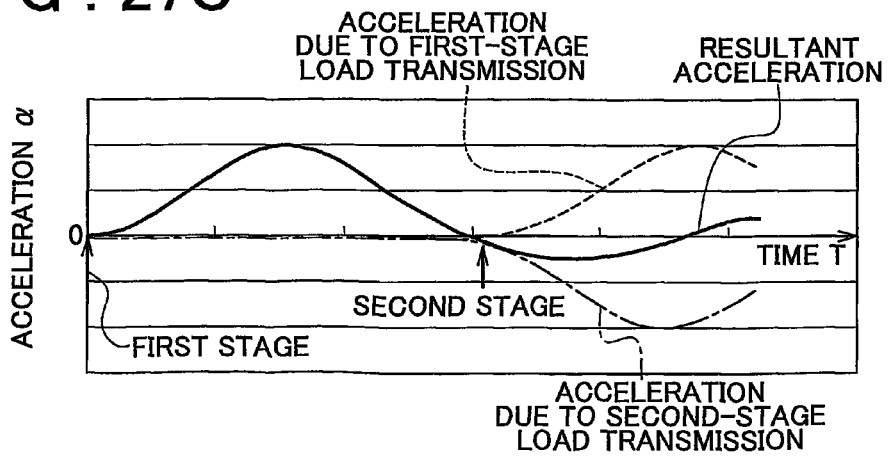
FIG. 27C is a diagram showing acceleration detected by the side impact-detecting G sensor, depending on the impact speed, in the side impact detection system according to the third embodiment of the invention in the case of a very low speed impact.

A supplementary explanation of how these threshold values $\alpha$th and $\alpha$tl are set will be given below. When the time interval between the first-stage load input (rise) and the second-stage load input (drop or reduction in the rate of change) is $\Delta T/2$, that is, when the impact speed is Vp, as shown in FIG. 27A, in the acceleration $\alpha$ expressed by the solid line (the output signal from the side impact-detecting G sensor 20), the first local minimum peak of the acceleration (see the chain line) caused by the second-stage load transmission coincides with the first local minimum peak of the acceleration (see the broken line) caused by the first-stage load transmission, which causes the maximum amplitude on the negative side. On the other hand, when the impact speed is lower than Vp, the time interval between the first-stage load input and the second-stage load input becomes longer, and as shown in FIGS. 27B and 27C, the phase of the acceleration, caused by the second-stage load input, that is expressed by the chain line is shifted relative to the phase of the acceleration, caused by the first-stage load input, that is expressed by the broken line, and therefore, the peak of the acceleration $\alpha$ on the negative side is reduced in height as compared to the peak when the impact speed is Vp.

In the side impact detection system 100 according to this embodiment, the impact speed Vp is set to the highest credible side impact speed and the makeup of the two-stage load transmitting structures 72, 80, 85, and 90 (the material, dimensions, shape, etc. of the impact beams 74, 82, 86, 92) is determined in accordance with the impact speed Vp.

In the CPU 106, the threshold value $\alpha$th is set so that the threshold value $\alpha$th is smaller than the acceleration $\alpha$3 at the local minimum peak caused when a side impact at a high speed (a speed near the impact speed Vp) as expressed by the solid line in FIG. 26 occurs, and that the threshold value $\alpha$th is greater than the acceleration $\alpha$4 at the local minimum peak caused when a side impact at a low speed expressed by the broken line occurs. The threshold value $\alpha$tl is set so that the threshold value $\alpha$tl is smaller than the acceleration $\alpha$4 at the local minimum peak described above and greater than the acceleration $\alpha$5 at the local minimum peak caused when a side impact at a very low speed as expressed by the chain line occurs.

In the CPU 106, it is the necessary condition for activating the high-load air bag device 102 that a signal indicating the fact that the acceleration $\alpha$ exceeds the threshold value $\alpha$th is received from the side impact-detecting G sensor 20 based on the signal from the side impact-detecting G sensor 20. In the CPU 106, it is the necessary condition for activating the low-load air bag device 104 that a signal indicating the fact that the acceleration $\alpha$ has a value between the threshold values $\alpha$th and $\alpha$tl ($\alpha$tl<$\alpha$<$\alpha$th) is received from the side impact-detecting G sensor 20.

The other components of the side impact detection system 100 are the same as the corresponding components of the side impact detection system 70 according to the second embodiment. Thus, the side impact detection system 100 brings about effects basically similar to those achieved by the side impact detection system 70 according to the second embodiment by virtue of operations similar to those of the side impact detection system 70.

Figure 25:
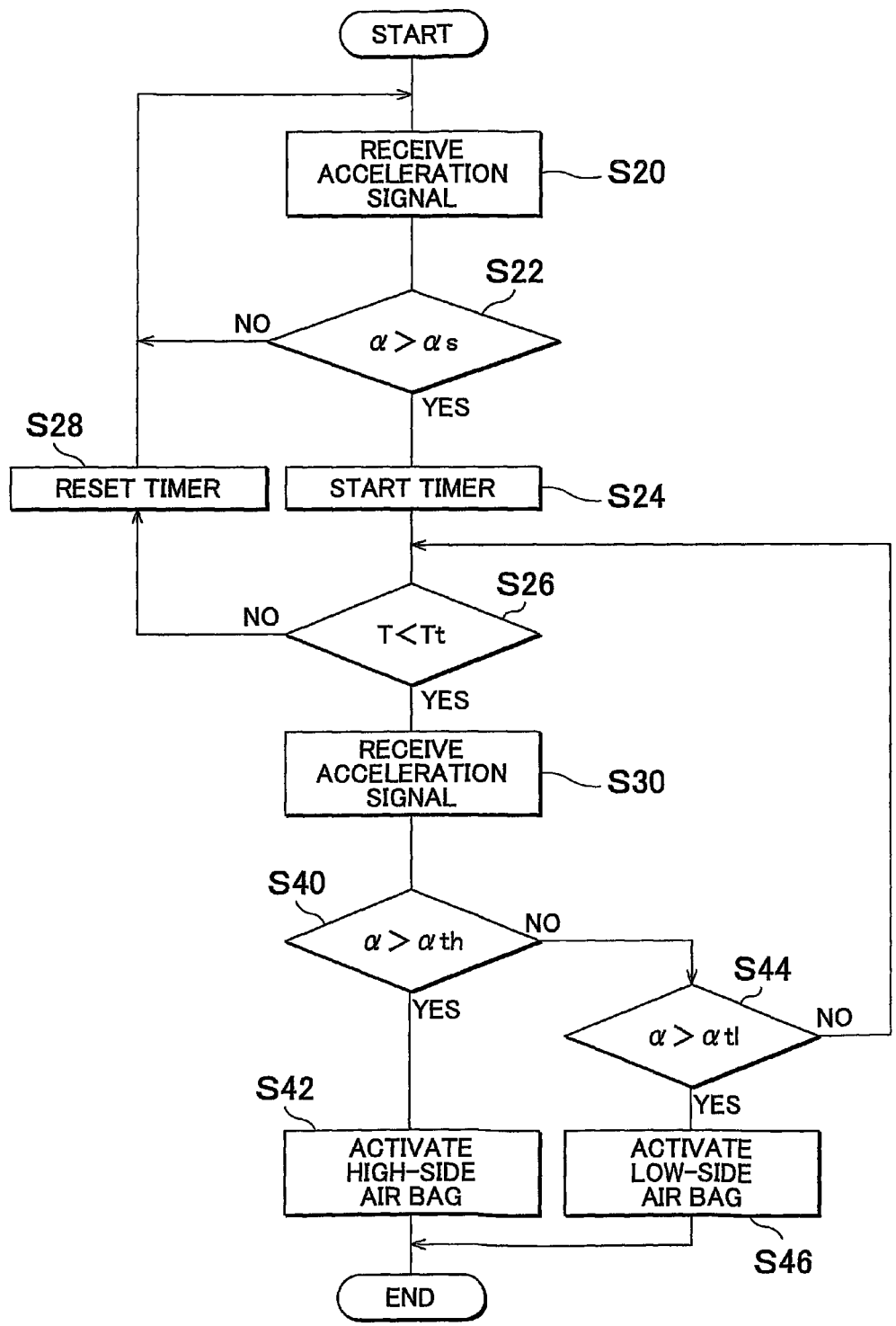
FIG. 25 is a flow chart showing a modification of a process flow of control performed by a controller, which is a constituent element of the side impact detection system according to the third embodiment of the invention.

Operations of the third embodiment, mainly the part different from the operations of the second embodiment, will be described with reference to the flow chart shown in FIG. 25.

In the side impact detection system 100 with the above-described configuration, the CPU 106 reads in the signal from the side impact-detecting G sensor 20 in step S30 and then proceeds to step S40 to determine whether the acceleration $\alpha$ corresponding to the signal from the side impact-detecting G sensor 20 exceeds $\alpha$th. When it is determined that the acceleration $\alpha$ exceeds $\alpha$th, the CPU 106 proceeds to step S42 to activate the high-load air bag device 102. In this way, with the anti-side impact occupant protection system 12 to which the side impact detection system 100 is applied, an occupant(s) is properly protected against a high-speed side impact.

On the other hand, when it is determined in step S40 that the acceleration $\alpha$ does not exceed $\alpha$th, the CPU 106 proceeds to step S44 to determine whether the acceleration $\alpha$ exceeds $\alpha$tl. When it is determined that the acceleration $\alpha$ exceeds $\alpha$tl, the CPU 106 proceeds to step S46 to activate the low-load air bag device 104. In this way, with the anti-side impact occupant protection system 12 to which the side impact detection system 100 is applied, an occupant(s) is properly protected against a low-speed side impact.

On the other hand, when it is determined in step S44 that the acceleration $\alpha$ does not exceed a$\alpha$tl, the CPU 106 returns to step S26.

In the anti-side impact occupant protection system 12 to which the side impact detection system 100 is applied, the CPU 106 of the side impact detection system 100 controls the mode of activation of the side impact air bag system 105 based on the two threshold values $\alpha$th and $\alpha$tl so that the mode of protection of the occupant(s) is selected in accordance with the impact speed of the side impact. Thus, the occupant(s) is properly protected in accordance with the impact speed. Specifically, at the time of a high-speed side impact, the high-load air bag device 102 is activated to properly protect the occupant(s), and at the time of a low-speed side impact, the low-load air bag device 104 is activated to properly protect the occupant(s).

In the third embodiment, examples are shown in which the side impact detection system 100 is constructed using one of the two-stage load transmitting structures 72, 80, 85, and 95 in which the transmitted load drops or the rate of change in the load is reduced in the second stage. However, the invention is not limited to these examples and the side impact detection system 100 may be constructed using one of the two-stage load transmitting structures 22, 35, 40, 45, 50, 55, and 60 in which the transmitted load rises or the rate of change in the load is raised in the second stage. In this case, the threshold values $\alpha$th and $\alpha$tl are positive accelerations greater than the accelerational $\alpha$1 the peak P1.

The third embodiment shows an example in which the high-load air bag device 102 or the low-load air bag device 104 of the side impact air bag system 105 is selectively deployed, whereby the mode of protection of the occupant(s) is changed depending on the impact speed. The invention, however, is not limited to the embodiment, and the mode of protection of the occupant(s) may be changed by activating both of a side air bag and a curtain air bag at the time of a high-speed side impact and activating one of the side air bag and the curtain air bag at the time of a low-speed side impact.

In addition, the occupant protection device is not limited to one of various air bag devices, and an air belt system in which an expanding portion is provided for the webbing of a seat belt may be adopted as (part of) the occupant protection system against a side impact.

While in the above description of the first to third embodiments and their modifications, examples are shown in which the side impact-detecting G sensor 20 is provided in the floor tunnel 18, the invention is not limited to this. For example, the side impact-detecting G sensor 20 may be provided in each of the right and left side doors 24 (impact beams 26 therein, for example).

While in the above description of the first to third embodiments and their modifications, examples are shown in which the invention is applied to the side impact detection systems 10, 70, and 100 for detecting a side impact, the invention is not limited to these examples. For example, the invention may be applied to a rear impact detection system for detecting a rear impact of the automobile 11, or the like.

While in the above description of the first to third embodiments and their modifications, examples are shown in which the occurrence of a side impact and the impact speed are determined by comparing the acceleration $\alpha$ with the threshold values $\alpha$t, $\alpha$th and $\alpha$tl, the invention is not limited to this. For example, the occurrence of a side impact and the impact speed may be determined by comparing the rate of change with time in the acceleration (jerk) with a predetermined threshold value. Needless to say, the process flow of the side impact detection in the invention is not limited to those shown in FIGS. 6, 8, 19, and 20, and the invention may be implemented in various modifications.

Fourth Embodiment

A side impact detection system 410 that functions as the impact detection structure according to a fourth embodiment of the invention will be described with reference to FIGS. 1, 2A, 2B, 4A, 4B, 15A, 15B, 17A, 17B, 28 to 31. The impact detection structure according to the embodiment is obtained by combining the impact detection structures of the first and second embodiments so that it is possible to determine the side on which the impact occurs with the use of a single acceleration sensor. Thus, in the following description, the points on which the third embodiment differs from the first and second embodiments will be mainly described. In the drawings, the arrows RH, and LH indicate the right side that is one side in the vehicle width direction, and the left side that is the other side in the vehicle width direction, respectively.

(Schematic Configuration of Side Impact Protection System)

Figure 28:
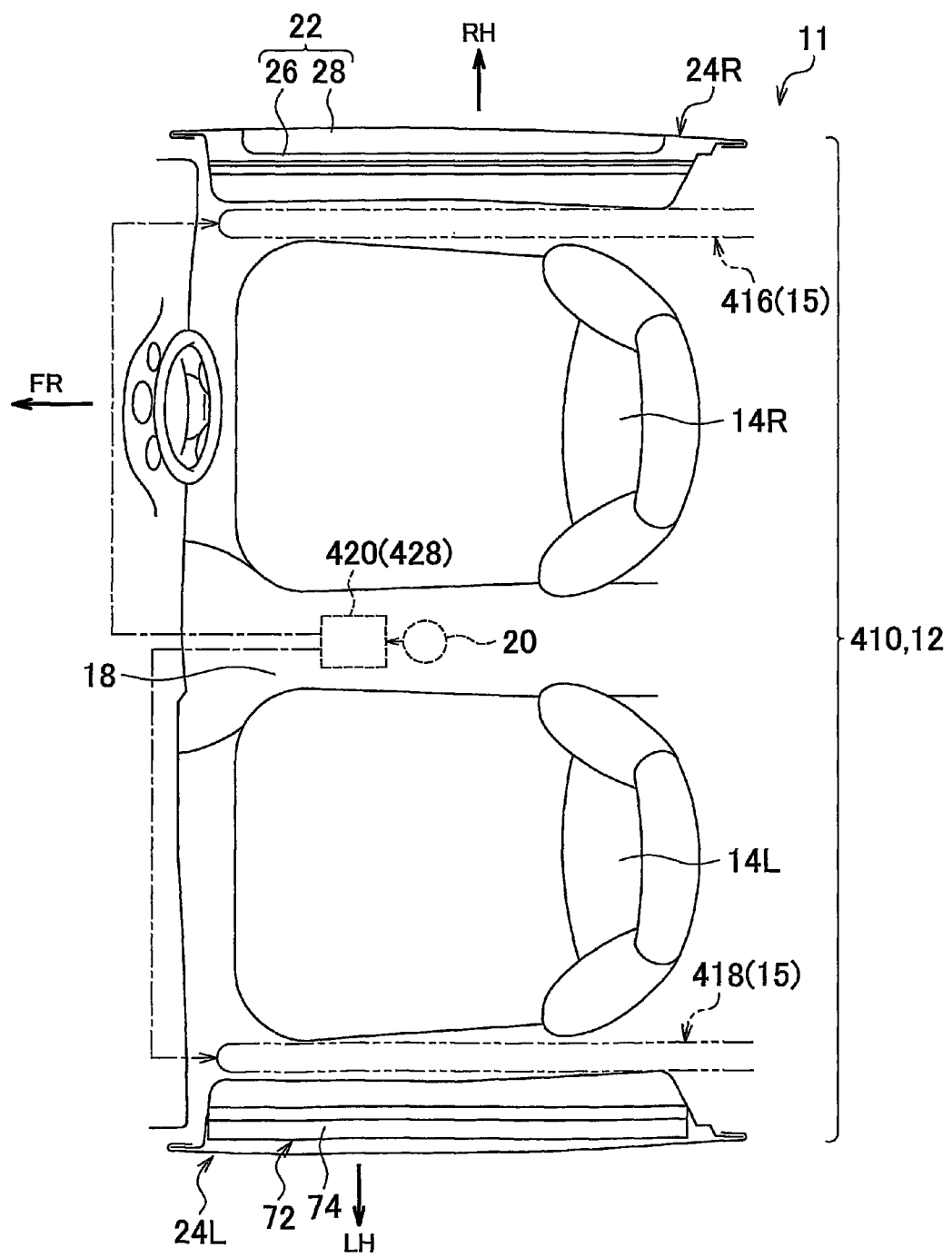
FIG. 28 is a plan view schematically showing part of an automobile to which an anti-side impact occupant protection system according to a fourth embodiment of the invention is applied.

FIG. 28 shows a schematic plan view of a front portion of the automobile 11. As shown in FIG. 28, the anti-side impact occupant protection system 12 includes a side impact air bag device 15 arranged on the outer sides of right and left seats 14R and 14L with respect to the vehicle width direction. The side impact air bag system 15 includes a right-seat air bag device 416, which serves as the first occupant protection device, and a left-seat air bag device 418, which serves as the second occupant protection device.

The right-seat air bag device 416 is designed to protect an occupant by activating an air bag activating device 416A (see FIG. 29), such as an inflator, to deploy an air bag 416B on the outer side, with respect to the vehicle width direction, of the occupant on the seat 14R when a side impact of the automobile 11 on the right side occurs. The left-seat air bag device 418 is designed to protect an occupant by activating an air bag activating device 418A, such as an inflator, to deploy an air bag 418B on the outer side, with respect to the vehicle width direction, of the occupant on the seat 14L when a side impact of the automobile 11 on the left side occurs.

A curtain air bag, a side air bag, a combination thereof, for example, can be used as the right-seat air bag system 416 and the left-seat air bag device 418 constituting the side impact air bag device 15.

The activation of the side impact air bag device 15 is controlled by a controller (ECU) 420, which serves as the impact determination section and the controller. The controller 420 is disposed in a center area, with respect to the vehicle width direction, of the vehicle body of the automobile 11, such as the floor tunnel 18, and systematically controls the activation of other air bags, such as front impact air bags and rear impact air bags, and a seat belt device, in this embodiment.

The controller 420 is a constituent element of part of the side impact detection system 410 including a side impact-detecting G sensor 20, which functions as an acceleration sensor, and the controller 420 controls the activation of the side impact air bag device 15 in accordance with the signal from the side impact-detecting G sensor 20. The side impact-detecting G sensor 20 is disposed in the center area, with respect to vehicle width direction, of the automobile 11, such as the floor tunnel 18, for example. The side impact-detecting G sensor 20 may be incorporated in the controller 420, for example.

As shown in FIG. 29, the controller 420 includes: as main components, a low-pass filter 426 that cuts the high-frequency components of the signal from the side impact-detecting G sensor 20; and a CPU 428 that determines whether the activation of the right-seat air bag device 416 and the left-seat air bag device 418 should be performed based on the signal that has passed through the low-pass filter 426. The detection of a side impact and the determination as to whether the activation of the right-seat air bag device 416 and the left-seat air bag device 418 should be performed, which are made by the CPU, will be described later along with the configuration of the side impact detection system 410.

(Configuration of Side Impact Detection System)

The side impact detection system 410 has a two-stage load transmitting structure 22, which functions as the first two-stage load transmitting portion that transmits, in two stages, load caused by a side impact on the left side of the vehicle body to the side impact-detecting G sensor 20 disposed in the floor tunnel 18. The two-stage load transmitting structure 22 may be configured so that, as shown in FIG. 2A, the first-stage load rises upon a side impact and then the second-stage load further rises, or as shown in FIG. 2B, the first-stage load gradually increases after a side impact and then the rate of change in the load is raised by the second-stage input.

As shown in FIG. 28, the two-stage load transmitting structure 22 is provided for the right side door 24R located on the outer side, with respect to the vehicle width direction, of the right seat 14R. Specifically, as shown in FIG. 1, the two-stage load transmitting structure 22 is constructed by providing the first load transmitting member 28 on the outer side, with respect to the vehicle width direction, of the impact beam 26 that is a constituent element of the right side door 24R. The first load transmitting member 28 is formed in a block shape using a foam material, such as polyurethane foam, for example. The first load transmitting member 28 is configured to secure a predetermined interval (stroke Sp (not shown) not including the section through which the first load transmitting member 28 freely moves until brought into contact with the impact beam 26) between the outer panel 24A (impact body), which is a constituent element of the right side door 24R, and the impact beam 26.

Thus, the side impact detection system 410 is set so that there is a phase difference corresponding to one cycle of the vibration with the frequency Fp between the acceleration caused by the first-stage load transmission and the acceleration caused by the second-stage load transmission when a side impact at the impact speed Vp on the right side of the vehicle body occurs. Specifically, the side impact detection system 410 is designed so that the first local maximum peak of the acceleration caused by the second-stage load transmission substantially coincides with the second local maximum peak of the acceleration caused by the first-stage load transmission in the case of a right side impact. In other words, the second peak of the acceleration $\alpha$ is amplified as shown in FIG. 30A.

The side impact detection system 410 includes the two-stage load transmitting structure 72, which serves as the second load transmitting structure. The side impact detection system 72 transmits, in two stages, load caused by a side impact on the left side of the vehicle body to the side impact-detecting G sensor 20 disposed in the floor tunnel 18. The two-stage load transmitting structure 72 may be configured so that, as shown in FIG. 17A, the first-stage load rises upon a side impact and then the second-stage load drops, or as shown in FIG. 17B, the first-stage load increases after a side impact and then the rate of change in the load is reduced in the second-stage input. A specific description will be given below.

As shown in FIG. 15A, the two-stage load transmitting structure 72 is formed by the shape (structure) of the impact beam 74 that is a constituent element of the left side door 24L located on the outer side, with respect to the vehicle width direction, of the left seat 14L. The impact beam 74 includes: an outer wall 74A positioned at the outer end with respect to the vehicle width direction; a pair of upper and lower inclined walls 74B extending from respective upper and lower edges, with respect to the vehicle, of the outer wall 74A, the pair of upper and lower inclined walls inclined so that the distance between the upper and lower inclined walls increases inward in the vehicle width direction; a pair of inner walls 74C extending from respective inner edges, with respect to the vehicle width direction, of the pair of inclined walls 74B, on the sides close to or facing each other, along the vertical direction of the vehicle; and a pair of flanges 74D extending, from respective ends of the pair of inner walls 74C, inward in the vehicle width direction and joined together. The impact beam 74 is supported so as to transmit load to the left side door 24L (or to the vehicle body through the side door 24) at the pair of the inner walls 74C. The pair of flanges 74D are joined by spot welding or the like so that the joint is released (disconnected) as shown in FIG. 15B when a predetermined load is applied in the vertical direction with respect to the vehicle.

The two-stage load transmitting structure 72 is configured so that when a side impact on the left side door 24L occurs, load is transmitted to the vehicle body through the impact beam 74, which is a structure with a closed cross section, in the first-stage load transmission, and when the pair of inclined walls 74B are deformed to be increased in distance between the inner edges thereof with respect to the vehicle width direction as shown by the arrow A in FIG. 15B by the load applied to the outer wall 74A inward in the vehicle width direction and the joint between the pair of flanges 74D are disconnected, load is transmitted to the vehicle body through the impact beam 74, which is a structure with a closed cross section, in the second-stage load transmission. The two-stage load transmitting structure 72 is configured to effect the two-stage load transmission as shown in FIG. 17B.

In the side impact detection system 410, the material for the two-stage load transmitting structure 72, the dimensions thereof, the shape thereof, etc. are determined depending on the transfer characteristic H of the vehicle body of the automobile 11 or the characteristics of the low-pass filter 426 that is a constituent element of the controller 420 so that, when a side impact at a predetermined impact speed Vp occurs, there is a predetermined time lag $\Delta T/2$ ($\approx 2.5$ (msec)) between when the first-stage load increase starts and when the second-stage reduction in the rate of change in load starts (the disconnection of the joint between the pair of flanges 74D). Specifically, in the side impact detection system 410, the body transfer characteristic H is symmetrical and the low-pass filter 426 is used for the right and left devices, and therefore the peak frequency Fp is the same for the right and left devices. On the other hand, the predetermined time lag (time from the start of the first-stage load transmission to the start of the second-stage load transmission) differs on the right and left sides for the same impact speed Vp.

Thus, the side impact detection system 410 is set so that, when a side impact at the impact speed Vp on the right side of the vehicle body occurs, there is a phase difference corresponding to half a cycle of the vibration, between the acceleration caused by the first-stage load transmission and the acceleration caused by the second-stage load transmission. Specifically, the side impact detection system 410 is designed so that, in the case of the right side impact, the first local minimum peak of the acceleration caused by the second-stage load transmission (reduction in the rate of change in load) substantially coincides with the first local minimum peak of the acceleration caused by the first-stage load transmission (increase). In this way, in the side impact detection system 410, the first local minimum peak P3 of the acceleration $\alpha$ swings to the negative side as shown in FIG. 30B.

In the side impact detection system 410 described above, as shown in FIG. 29, the load F caused by a side impact is transmitted to the side impact-detecting G sensor 20 through the vehicle body (transfer characteristic H) including the two-stage load transmitting structure 22 or the two-stage load transmitting structure 72, the output signal from the side impact-detecting G sensor 20 is input to the CPU 428 through the low-pass filter 426 of the controller 420. In addition, in the side impact detection system 410, the CPU 428 makes a determination as to the occurrence of a side impact and the side (right or left) on which the side impact has occurred. Thus, the CPU 428 (controller 420) functions as the impact determination section of the invention as described above.

The following is a supplementary explanation concerning the determination of the occurrence of an impact made by the CPU 428. When load is transmitted through the two-stage load transmitting structure 22 to the side impact-detecting G sensor 20 in two stages having the time lag $\Delta T$, the first local maximum peak of the acceleration caused by the second-stage load transmission substantially coincides with the second local maximum peak of the acceleration caused by the first-stage load transmission as described above. Thus, in the output signal (acceleration $\alpha$) from the side impact-detecting G sensor 20, the second peak P2 is higher than the first peak P1 on the positive side as shown in FIG. 30A.

In the CPU 428, the acceleration value between the value of the first peak P1 and the value of the second peak P2 that are presumed to occur in the case of the impact speed Vp is set as a threshold value $\alpha$tp. In addition, $\alpha$tp is set so as to be higher than the acceleration caused by the maximum credible load due to closing the right side, door 24R. Thus, in the CPU 428, it is the necessary condition for detection of the occurrence of a left side impact that the CPU 428 receives from the side impact-detecting G sensor 20 a signal corresponding to the fact that the acceleration $\alpha$ exceeds the threshold value $\alpha$tp.

When load is transmitted through the two-stage load transmitting structure 72 to the side impact-detecting G sensor 20 in two stages having the time lag $\Delta T/2$, the first local minimum peak of the acceleration caused by the second-stage load transmission (reduction in the rate of change in load) substantially coincides with the first local minimum peak of the acceleration caused by the first-stage load transmission (increase in the load) as described above. Thus, the output signal (acceleration $\alpha$) from the side impact detection system 20 has the first local minimum peak P3 on the negative side as shown in FIG. 30B.

In the CPU 428, a negative acceleration is set as a threshold value $\alpha$tm. Thus, in the CPU 428, it is the necessary condition for detection of the occurrence of a right side impact that the CPU 428 receives from the side impact-detecting G sensor 20 a signal corresponding to the fact that the acceleration $\alpha$ falls below the threshold value atm (the absolute value of the acceleration $\alpha$tm exceeds the absolute value of the threshold value $\alpha$ on the negative side).

In the CPU 428, in addition to the condition that the acceleration $\alpha$ falls below the threshold value $\alpha$tm, the condition that the time from when the impact force is input to when the acceleration $\alpha$ falls below the threshold value $\alpha$tm is within the predetermined time is a sufficient condition for detection of the occurrence of a right side impact. Specifically, the side impact detection system 410, in which $\Delta T \approx 5$ msec as described above, is configured so that, for example, when time T that elapses from when the impact force is input to when the acceleration $\alpha$ exceeds the threshold value $\alpha$t exceeds a reference time Tt (10 msec in this embodiment), it is determined that no conceivable right side impact has occurred (the negative acceleration is caused by another reason), in consideration of the fact that the time from when an impact occurs to when the first local minimum peak P3 occurs is approximately 5 msec.

In addition, in the anti-side impact occupant protection system 12 to which the side impact detection system 410 is applied, the CPU 428, which serves as the controller, activates the left-seat air bag device 418 when the CPU 428 determines that the acceleration $\alpha$ exceeds the threshold value $\alpha$tp, based on the signal from the side impact-detecting G sensor 20. Meanwhile, the CPU 428 is designed to activate the right-seat air bag system 416 when the CPU 428 determines that the acceleration $\alpha$ falls below the threshold value $\alpha$tm within the reference time Tt, based on the signal from the side impact-detecting G sensor 20. The condition that the time T that elapses from when the impact force is input to when the acceleration $\alpha$ exceeds the threshold value $\alpha$tp, may be added for the left-seat air bag device 418. A condition that an occupant sits on the seats 14R, 14L, for example, may be added to the necessary condition for activating the right-seat air bag device 416 and the left-seat air bag device 418.

Figure 31:
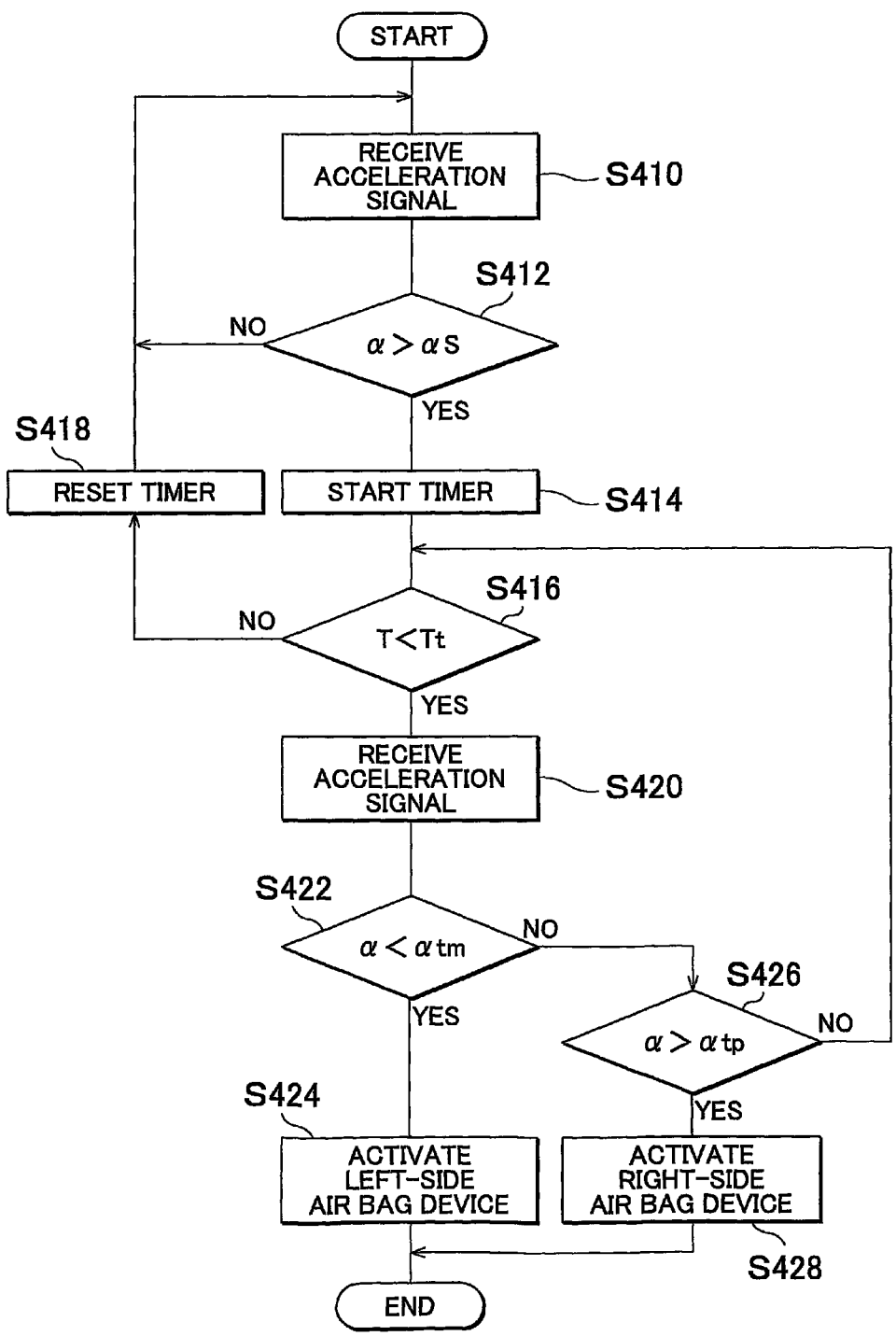
FIG. 31 is a flow chart showing a process flow of control performed by a controller, which is a constituent element of the side impact detection system according to the fourth embodiment of the invention.

Next, operations of the fourth embodiment will be described with reference to a flow chart shown in FIG. 31.

In the side impact detection system 410 configured as described above, the CPU 428 reads in a signal from the side impact-detecting G sensor 20 in step S410 and proceeds to step S412. In step S412, based on the signal from the side impact-detecting G sensor 20, the CPU 428 determines whether there has been an input of an impact force (first-stage input). Specifically, a threshold value of the input impact force is $\alpha$s (see FIG. 30), and when the acceleration $\alpha$ corresponding to the signal from the side impact-detecting G sensor 20 exceeds the threshold value $\alpha$s ($\alpha > \alpha$s), it is determined that there has been an input of an impact force. When the CPU 428 determines that there is no input of an impact force, the CPU 428 returns to step S410, and when it is determined that there has been an input of an impact force, the CPU 428 proceeds to step S414 to start a built-in timer.

Then, the CPU 428 proceeds to step S416 to determine whether an elapsed time T that has elapsed since the input of the impact force is longer than the reference time Tt. When it is determined that the elapsed time T exceeds the reference time Tt, the CPU 428 resets the timer in step S418 and returns to step S410. On the other hand, when it is determined in step S416 that the elapsed time T that elapses since the input of an impact force does not exceed the reference time Tt, the CPU 428 proceeds to step S420 to read in the signal from the side impact-detecting G sensor 20.

Next, the CPU 428 proceeds to step S422 to determine whether the acceleration α corresponding to the signal from the side impact-detecting G sensor 20 falls below the threshold value αt. On the other hand, when the CPU 428 determines that the acceleration α falls below the threshold value αtm, the CPU 428 proceeds to step S424 to activate the left-seat air bag device 418. Specifically, when the CPU 428 determines that a side impact on the left side of the vehicle body (left side door 24L) has occurred, the CPU 428 activates the left-seat air bag device 418. In this way, an occupant(s) on the seat 14L of the automobile 11 is protected against a side impact.

The CPU 428 that has determined in step S422 that the acceleration α does not falls below the threshold value αtm, proceeds to step S426 and determines whether the acceleration α corresponding to the signal from the side impact-detecting G sensor 20 exceeds the threshold value αtp. On the other hand, when the CPU 428 determines that the acceleration α exceeds the threshold value αtp, the CPU 428 proceeds to step S428 to activate the right-seat air bag device 416. Specifically, when the CPU 428 determines that a side impact on the right side of the vehicle body (right side door 24R) has occurred, the CPU 428 activates the right-seat air bag device 416. In this way, an occupant(s) on the seat 14R of the automobile 11 is protected against a side impact.

When the CPU 428 determines in step S426 that the acceleration α does not exceed the threshold value αtp, the CPU 428 returns to step S416 and repeats the determination of the occurrence of an impact until the reference time Tt corresponding to the first-stage load input has elapsed. After the reference time Tt has elapsed, the CPU 428 returns to step S410.

Because the side impact detection system 410 is provided with the separate two-stage load transmitting structures 22 and 72 that are disposed on the respective sides with respect to the vehicle width direction, it is possible to make the acceleration caused by the right side impact (that is, the manner in which the acceleration varies with time) and the acceleration caused by the left side impact (that is, the manner in which the acceleration varies with time) different from each other. Thus, in the side impact detection system 410, by setting different threshold values for the right side impact and the left side impact, the CPU 428 can determine whether the occurred side impact is a right side impact or a left side impact, based on the signal from the single, side impact-detecting G sensor 20.

In particular, the side impact detection system 410 includes: the two-stage load transmitting structure 22 in which the second-stage load transmission further rises relative to the first-stage load transmission; and the two-stage load transmitting structure 72 in which the rate of change in load of the second-stage load transmission is reduced relative to the rate of change in load of the first-stage load transmission, so that it is possible to set the threshold values that are used to differentiate between the right side impact and the left side impact to a positive value and a negative value. In this way, it is possible to effectively suppress the erroneous detection of the side on which the side impact has occurred.

The side impact detection system 410 includes the two-stage load transmitting structure 22 and the two-stage load transmitting structure 72 for transmitting the impact load to the side impact-detecting G sensor 20, and therefore can detect the occurrence of a side impact while distinguishing the side impact from closing of the right and left side doors 24R and 24L, for example, based on the signal from the single, side impact-detecting G sensor 20.

For example, in the case of closing the right side door 24R, when it is assumed that the mass m of the right side door 24R is 20 kg, the door closing speed Vd is 50 km/h (≈14 m/s), and the load Fd caused when the right side door 24R is closed is 10 kN, the momentum conservation law, $m \times Vd = \int (Fd \times T) dt$, gives T≈28 msec. The time T is sufficiently long relative to the time of T≈7.5 msec that is the time interval between the start of the impact and the occurrence of the second peak P2 when the impact speed is Vp in the side impact detection system 410 with ΔT≈5 msec as described above, and therefore, such application of load can be regarded as one stage load input. Thus, closing the right side door 24R does not cause the second peak P2 that is higher than the first peak P1. In addition, in the case of closing the door, the load drops after the time of T≈28 msec has elapsed, and the acceleration higher than αtp does not occur.

In the side impact detection system 410 provided with the two-stage load transmitting structure 22, when a side impact on the right side at a speed near the set impact speed Vp occurs, the acceleration detected by the side impact-detecting G sensor 20 exhibits the second peak P2 higher than the first peak P1 as shown in FIG. 30A. It is possible to detect a side impact based on whether the acceleration α exceeds the threshold value αtp on the way to the second peak P2. As described above, the side impact detection system 410 is provided with the two-stage load transmitting structure 22 that transmits only the load that is caused by a side impact to the side impact-detecting G sensor 20 in two stages having the predetermined time lag ΔT, so that the acceleration α that acts on the side impact-detecting G sensor 20 does not exceed the threshold value αtp in the case of a simple, one stage load input, such as that caused by closing a door, and it is possible to selectively detect a side impact.

Specifically, the side impact detection system 410 can distinguish, or differentiate, a side impact on the right side from door closing or the like with the use of a single, side impact-detecting G sensor 20. On the other hand, when the side impact speed is significantly lower than the predetermined impact speed Vp, that is, in the case of a light impact, the peak of the acceleration caused by the load transmitted in the second stage is significantly apart from the second peak of the acceleration caused by the load transmitted in the first stage, and the second peak P2 does not exceed αtp, so that it is possible to distinguish a light impact from the side impact that requires the activation of the right-seat air bag system 416.

Meanwhile, in the side impact detection system 410 provided with the two-stage load transmitting structure 72, when a side impact near the set impact speed Vp occurs, the acceleration α detected by the side impact-detecting G sensor 20 exhibits negative acceleration as shown in FIG. 30B, and it is therefore possible to distinguish the side impact from closing of the left side door 24L based on whether the acceleration α falls below the threshold value αtm on the negative side.

As described, the time T during which load caused by closing the left side door 24L is applied is T≈28 msec as in the case of the right side door 24R, and this can be regarded as a single stage load input. Even when a time period occurs during which the acceleration α is negative (exceeds the threshold value αtm) due to the load, the rate of change in which is reduced after T≈28 msec has elapsed, such a time period occurs after the reference time Tt has elapsed, and therefore, the side impact detection system 410 does not erroneously detect this load as a right side impact. Similarly, in the case where a side impact at such a low speed that the activation of the side impact air bag device 15 is not required, that is, a light impact occurs, even when a time period occurs during which the acceleration α is negative due to the superposition of the second-stage acceleration, such a time period occurs after the reference time Tt has elapsed, and therefore, the side impact air bag system 15 is not activated. Specifically, the side impact detection system 410 can distinguish a light impact from the side impact that requires the activation of the left-seat air bag system 418.

(Modification of Impact Determination Method)

The above-described fourth embodiment shows an example in which the occurrence of a side impact and the side, with respect to the vehicle width direction, on which the side impact occurs can be determined based on the output signal from the single, side impact-detecting G sensor 20. The invention, however, is not limited to this embodiment, and a function of determining the side impact speed may be added using the configuration of the third embodiment.

The side impact detection system 410 provided with the CPU 428 according to the modification can determine the side impact speed in addition to the occurrence of a side impact and the side, with respect to the vehicle width direction, on which the side impact occurs.

The side impact detection system 410 provided with the low-pass filter 426 according to such a modification may be configured such that the right-seat air bag device 416 and the left-seat air bag device 418 have a high-load air bag device and a low-load air bag device, respectively, and may be controlled so that when a high-speed side impact is detected, the high-load air bag device is activated and when a low-speed side impact is detected, the low-load air bag device is activated. The side impact detection system 410 may be constructed so that the high-load air bag device and the low-load air bag device are provided separately from each other or alternatively, two inflators for a common air bag device that are different in gas-feed amount (speed) are provided. The mode of protection of the occupant(s) may be changed by activating both of a side air bag and a curtain air bag at the time of a high-speed side impact and activating one of the side air bag and the curtain air bag at the time of a low-speed side impact.

The above-described fourth embodiment and its modification show examples in which the invention is applied to the side impact detection system 410 that detects right side impact and a left side impact while distinguishing between the right side impact and the left side impact. The invention, however, is not limited to the examples, and the invention may be applied to the side impact detection system that detects a front impact and a rear impact while distinguishing between the front impact and the rear impact of the automobile 11, for example.

The above-described fourth embodiment and its modification show examples in which the occurrence of a side impact and the side on which the side impact has occurred are both detected based on the signal from the single, side impact-detecting G sensor 20. The invention, however, is not limited to the examples, and an acceleration sensor used to detect the occurrence of a side impact and the side impact-detecting G sensor 20 used to detect the side on which the side impact has occurred may be provided, for example. Specifically, a configuration may be adopted in which the side impact-detecting G sensor 20 of the invention is used instead of the satellite sensors that are provided in the side doors 24R, 24L, respectively.

The above-described fourth embodiment and its modification show examples of control schemes in which one of the right-seat air bag device 416 and the left-seat air bag device 418 is activated. The invention, however, is not limited to the examples, and the CPU 428 may perform control in which after one of the right-seat air bag device 416 and the left-seat air bag device 418 is activated, it is determined whether the other thereof should be activated. Needless to say, the process flow of the side impact detection in the invention is not limited to that shown in FIG. 31, and the invention may be implemented in various modifications.

The above-described fourth embodiment and its modification show examples in which the CPU 428 determines whether a right side impact has occurred (whether the right side impact air bag device 416 should be activated) based on whether the acceleration α exceeds the threshold value αtp. The invention, however, is not limited to the examples, and for example, the CPU 32 may be configured to determine whether a side impact has occurred based on whether the difference ($\alpha 2-\alpha 1$) between the acceleration $\alpha 2$ on the way to the second peak P2 and the acceleration $\alpha 1$ at the first peak P1 exceeds a threshold value $\Delta\alpha t$.

The above-described fourth embodiment and its modification show examples in which the occurrence of a side impact, the side on which the side impact has occurred, and the impact speed are determined by comparing the acceleration α with the threshold values αtp and αtm, or the like. The invention, however, is not limited to the examples, and for example, the occurrence of a side impact, the side on which the side impact has occurred, and the impact speed may be determined by comparing the rate of change with time in the acceleration (jerk) with a predetermined threshold value.

The above-described fourth embodiment and its modification show examples in which the occupant protection devices are various air bag devices. The invention, however, is not limited to the examples, and for example, an air belt system in which an expanding portion is provided for the webbing of a seat belt may be adopted as (part of) the occupant protection system against a side impact, for example.

The above-described fourth embodiment and its modification show examples in which the two-stage load transmitting structures 22, 72 are used that are different in the direction of change in the load transmitted in the second-stage load transmission relative to the load transmitted in the first-stage load transmission. The invention, however, is not limited to the examples, and it suffices that the mode of the transmission of load in the second-stage load transmission differs from the mode of the transmission of load in the first-stage load transmission. Thus, for example, the two-stage load transmitting structures that are the same in the direction of change in the load transmitted in the second-stage load transmission relative to the load transmitted in the first-stage load transmission. In this case, a configuration may be adopted in which different peak frequencies Fp are set by varying the characteristics of the transfer characteristic H of the body and/or the characteristics of the low-pass filter 426 between the right and left sides so that the side on which the side impact has occurred can be determined. Needless to say, the sides on which the above-described two-stage load transmitting structures 22, 72 are disposed may be reversed.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An impact detection structure comprising:
    an acceleration detection portion for detecting acceleration; and
    a two-stage load transmitting portion that transmits load caused by an impact at a predetermined speed to the acceleration detection portion in two stages having a predetermined time lag in such a manner that the load transmitted or a rate of change in the load differs between a first-stage load transmission and a second-stage load transmission,
    wherein the two-stage load transmitting portion is constructed so that, in the second-stage load transmission to the acceleration detection portion, the load transmitted or the rate of change in the load increases relative to the load transmitted or the rate of change in the load in the first-stage load transmission to the acceleration detection portion, and
    wherein the two-stage load transmitting portion is constructed so that when the impact at the predetermined speed occurs, a first local maximum peak of a time variation curve of acceleration caused by the load transmitted by the second-stage load transmission substantially coincides with a second local maximum peak of a time variation curve of acceleration caused by the load transmitted by the first-stage load transmission.

2. The impact detection structure according to claim 1, wherein the two-stage load transmitting portion includes a deformed portion that is deformed while transmitting the load through a predetermined stroke when the impact occurs.

3. The impact detection structure according to claim 2, wherein the deformed portion includes an elastic member.

4. The impact detection structure according to claim 2, wherein the deformed portion includes a weakened portion.

5. The impact detection structure according to claim 2, further comprising:
    a first load-transmitting member; and
    a second load-transmitting member that faces the first load-transmitting member with the deformed portion interposed therebetween,
    wherein after the impact occurs, the first load-transmitting member transmits the load to the second load-transmitting member through the deformed portion and when the predetermined stroke of the deformed portion is consumed, starts directly transmitting the load to the second load-transmitting member.

6. The impact detection structure according to claim 5, wherein the first load-transmitting member or the second load-transmitting member has the deformed portion.

7. The impact detection structure according to claim 1, wherein the acceleration detection portion has a single acceleration sensor that outputs a signal indicative of acceleration, and the impact detection structure further comprises an impact determination section that determines at least one of occurrence of an impact and an impact speed based on the signal output from the acceleration sensor after start of the second-stage load transmission.

8. The impact detection structure according to claim 7, wherein the two-stage load transmitting portion transmits the load caused by a side impact to the acceleration detection portion, and the impact determination section determines at least one of occurrence of the side impact and a side impact speed based on the signal output from the acceleration sensor after the start of the second-stage load transmission.

9. An occupant protection system comprising:
    an occupant protection device capable of varying a mode of protection for an occupant;
    the impact detection structure according to claim 7 configured so that the impact determination section determines the occurrence of the impact and the impact speed; and
    a controller that, when the impact determination section determines that the impact has occurred, activates the occupant protection device so as to effect the mode of protection of the occupant according to the impact speed determined by the impact determination section.

10. An impact detection structure comprising:
    an acceleration detection portion for detecting acceleration; and
    a two-stage load transmitting portion that transmits load caused by an impact at a predetermined speed to the acceleration detection portion in two stages having a predetermined time lag in such a manner that the load transmitted or a rate of change in the load differs between a first-stage load transmission and a second-stage load transmission,
    wherein the two-stage load transmitting portion is constructed so that, in the second stage load transmission to the acceleration detection portion, the load transmitted or the rate of change in the load is reduced relative to the load transmitted or the rate of change in the load in the first-stage load transmission to the acceleration detection portion.

11. The impact detection structure according to claim 10, wherein the two-stage load transmitting portion has a joint portion, wherein when the impact occurs and the load exceeds a predetermined value after the first-stage load transmission is started, the joint portion is disconnected by the load, thereby reducing the load transmitted or the rate of change in the load.

12. The impact detection structure according to claim 10, wherein the two-stage load transmitting portion has a buckling portion, wherein when the impact occurs and the load exceeds a predetermined value after the first-stage load transmission is started, the buckling portion buckles due to the load, thereby reducing the load transmitted or the rate of change in the load.

13. The impact detection structure according to claim 10, wherein
    the two-stage load transmitting portion is constructed so that when the impact at the predetermined speed occurs, a first local minimum peak of a time variation curve of acceleration caused by the load transmitted by the second-stage load transmission substantially coincides with a first local minimum peak of a time variation curve of acceleration caused by the load transmitted by the first-stage load transmission.

14. The impact detection structure according to claim 10, wherein the acceleration detection portion has a single acceleration sensor that outputs a signal indicative of acceleration, and the impact detection structure further comprises an impact determination section that determines at least one of occurrence of an impact and an impact speed based on the signal output from the acceleration sensor after start of the second-stage load transmission.

15. The impact detection structure according to claim 14, wherein the two-stage load transmitting portion transmits the load caused by a side impact to the acceleration detection portion, and the impact determination section determines at least one of occurrence of the side impact and a side impact speed based on the signal output from the acceleration sensor after the start of the second-stage load transmission.

16. An occupant protection system comprising:
an occupant protection device capable of varying a mode of protection for an occupant;
the impact detection structure according to claim 14 configured so that the impact determination section determines the occurrence of the impact and the impact speed; and
a controller that, when the impact determination section determines that the impact has occurred, activates the occupant protection device so as to effect the mode of protection of the occupant according to the impact speed determined by the impact determination section.

17. An impact detection system comprising:
an acceleration sensor, provided on a vehicle body, that detects acceleration;
a first two-stage load transmitting portion that transmits, to the acceleration sensor, load caused by an impact at a first predetermined speed on one side with respect to the acceleration sensor in two stages having a first predetermined time lag in such a manner that the load or a rate of change in the load differs between a first-stage load transmission and a second-stage load transmission;
a second two-stage load transmitting portion that transmits, to the acceleration sensor, load caused by an impact at a second predetermined speed on the other side with respect to the acceleration sensor in two stages having a second predetermined time lag in such a manner that the load transmitted or a rate of change in the load differs between a first-stage load transmission and a second-stage load transmission and that a manner, in which the load transmitted or the rate of change in the load in the second-stage load transmission is changed from the load transmitted or the rate of change in the load in the first-stage load transmission in the second two-stage load transmitting portion, differs from a manner, in which the load transmitted or the rate of change in the load in the second-stage load transmission is changed from the load transmitted or the rate of change in the load in the first-stage load transmission in the first two-stage load transmitting portion; and
an impact determination section that determines on which side the impact has occurred with respect to the acceleration sensor based on a signal from the acceleration sensor.

18. The impact detection system according to claim 17, wherein
the first two-stage load transmitting portion is constructed so that, in the second-stage load transmission to the acceleration sensor, the load transmitted or the rate of change in the load is increased relative to the load transmitted or the rate of change in the load in the first-stage load transmission, and
the second two-stage load transmitting portion is constructed so that, in the second-stage load transmission to the acceleration sensor, the load transmitted or the rate of change in the load is reduced relative to the load transmitted or the rate of change in the load in the first-stage load transmission to the acceleration sensor.

19. The impact detection system according to claim 18, wherein the first two-stage load transmitting portion includes a deformed portion that is deformed while transmitting the load through a predetermined stroke when the impact occurs.

20. The impact detection system according to claim 18, wherein the deformed portion includes an elastic member.

21. The impact detection system according to claim 19, wherein the deformed portion includes a weakened portion.

22. The impact detection system according to claim 19, wherein the first two-stage load transmitting portion further includes:
a first load-transmitting member; and
a second load-transmitting member that faces the first load-transmitting member with the deformed portion interposed therebetween,
wherein after the impact occurs, the first load-transmitting member transmits the load to the second load-transmitting member through the deformed portion and when the predetermined stroke of the deformed portion is consumed, starts directly transmitting the load to the second load-transmitting member.

23. The impact detection system according to claim 22, wherein the first load-transmitting member or the second load-transmitting member has the deformed portion.

24. The impact detection system according to claim 18, wherein the second two-stage load transmitting portion has a joint portion, wherein when the impact occurs and the load exceeds a predetermined value after the first-stage load transmission is started, the joint portion is disconnected by the load, thereby reducing the load transmitted or the rate of change in the load.

25. The impact detection system according to claim 18, wherein the second two-stage load transmitting portion has a buckling portion, wherein when the impact occurs and the load exceeds a predetermined value after the first-stage load transmission is started, the buckling portion buckles due to the load, thereby reducing the load transmitted or the rate of change in the load.

26. The impact detection system according to claim 18, wherein
the first two-stage load transmitting portion is constructed so that when the impact at the first predetermined speed occurs, a first local maximum peak of a time variation curve of acceleration caused by the load transmitted by the second-stage load transmission substantially coincides with a second local maximum peak of a time variation curve of acceleration caused by the load transmitted by the first-stage load transmission, and
the second two-stage load transmitting portion is constructed so that when the impact at the second predetermined speed occurs, a first local minimum peak of a time variation curve of acceleration caused by the load transmitted by the second-stage load transmission substantially coincides with a first local minimum peak of a time variation curve of acceleration caused by the load transmitted by the first-stage load transmission.

27. The impact detection system according to claim 17, wherein:
the acceleration sensor is disposed in a center area, with respect to a vehicle width direction, of the vehicle body;
the first two-stage load transmitting portion is constructed so that the load caused by a side impact on one side, with respect to the vehicle width direction, of the vehicle body is transmitted to the acceleration sensor in two stages; and
the second two-stage load transmitting portion is constructed so that the load caused by a side impact on the other side, with respect to the vehicle width direction, of the vehicle body is transmitted to the acceleration sensor in two stages.

28. The impact detection system according to claim 17, wherein the impact determination section determines occurrence of the impact on the one side or on said the other side with respect to the acceleration sensor based on the signal from the acceleration sensor.

29. An occupant protection system comprising:
the impact detection system according to claim 17;
a first occupant protection device for protecting the occupant against the impact on the one side with respect to the acceleration sensor;
a second occupant protection device for protecting the occupant against the impact on said the other side with respect to the acceleration sensor; and
a controller that when occurrence of the impact is detected, activates one of the first and second occupant protection devices that protects the occupant on the side, on which the impact has occurred, determined by the impact determination section.

\* \* \* \* \*